(12) United States Patent
Vandike et al.

(10) Patent No.: US 12,069,978 B2
(45) Date of Patent: Aug. 27, 2024

(54) PREDICTIVE ENVIRONMENTAL CHARACTERISTIC MAP GENERATION AND CONTROL SYSTEM

(71) Applicant: Deere & Company, Moline, IL (US)

(72) Inventors: Nathan R. Vandike, Geneseo, IL (US); Bhanu Kiran Reddy Palla, Bettendorf, IA (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 389 days.

(21) Appl. No.: 17/666,963

(22) Filed: Feb. 8, 2022

(65) Prior Publication Data

US 2022/0167547 A1 Jun. 2, 2022

Related U.S. Application Data

(63) Continuation-in-part of application No. 17/066,442, filed on Oct. 8, 2020, now Pat. No. 11,589,509, which is a continuation-in-part of application No. 16/783,511, filed on Feb. 6, 2020, now Pat. No. 11,641,800, and a continuation-in-part of application No. 16/783,475, filed on Feb. 6, 2020, now Pat. No.
(Continued)

(51) Int. Cl.
*A01B 79/00* (2006.01)
*A01G 25/16* (2006.01)
*G05B 13/04* (2006.01)

(52) U.S. Cl.
CPC .......... *A01B 79/005* (2013.01); *A01G 25/167* (2013.01); *G05B 13/048* (2013.01)

(58) Field of Classification Search
CPC ... A01B 79/005; A01G 25/167; G05B 13/048

USPC .......................................................... 701/50
See application file for complete search history.

(56) References Cited

U.S. PATENT DOCUMENTS 3,568,157 A 3/1971 Downing et al.
3,580,257 A 5/1971 Teague
(Continued)

FOREIGN PATENT DOCUMENTS

AR 108898 A1 10/2018
AU 20100224431 A1 4/2011
(Continued)

OTHER PUBLICATIONS

Martin et al., "Breakage Susceptibility and Harness of Corn Kernels of Various Sizes and Shapes", May 1987, 10 pages.
(Continued)

*Primary Examiner* — Tuan C To
(74) *Attorney, Agent, or Firm* — Kelly, Holt & Christenson; Joseph R. Kelly

(57) ABSTRACT

An information map is obtained by an agricultural system. The information map maps values of a topographic characteristic to different geographic locations in a field. An in-situ sensor detects values of an environmental characteristic as an agricultural work machine moves through the field. A predictive map generator generates a predictive map that predicts the environmental characteristic at different locations in the field based on a relationship between the values of the topographic characteristic and the values of the environmental characteristic detected by the in-situ sensor. The predictive map can be output and used in automated machine control.

20 Claims, 13 Drawing Sheets

Related U.S. Application Data 11,957,072, and a continuation-in-part of application No. 16/380,531, filed on Apr. 10, 2019, now Pat. No. 11,079,725, and a continuation-in-part of application No. 16/171,978, filed on Oct. 26, 2018, now Pat. No. 11,240,961.

(56) References Cited

U.S. PATENT DOCUMENTS

| | | |
|---|---|---|
| 3,599,543 A | 8/1971 | Norman |
| 3,775,019 A | 11/1973 | Natsuume |
| 3,856,754 A | 12/1974 | Habermeier et al. |
| 4,129,573 A | 12/1978 | Bellus et al. |
| 4,166,735 A | 9/1979 | Pilgram et al. |
| 4,183,742 A | 1/1980 | Beck et al. |
| 4,268,679 A | 5/1981 | Lavanish |
| 4,349,377 A | 9/1982 | Duerr et al. |
| 4,360,677 A | 11/1982 | Doweyko et al. |
| 4,435,203 A | 3/1984 | Funaki et al. |
| 4,493,726 A | 1/1985 | Burdeska et al. |
| 4,527,241 A | 7/1985 | Sheehan et al. |
| 4,566,901 A | 1/1986 | Martin et al. |
| 4,584,013 A | 4/1986 | Brunner |
| 4,687,505 A | 8/1987 | Sylling et al. |
| 4,857,101 A | 8/1989 | Musco et al. |
| 4,911,751 A | 3/1990 | Nyffeler et al. |
| 5,059,154 A | 10/1991 | Reyenga |
| 5,089,043 A | 2/1992 | Hayase et al. |
| 5,246,164 A | 9/1993 | McCann et al. |
| 5,246,915 A | 9/1993 | Lutz et al. |
| 5,250,690 A | 10/1993 | Turner et al. |
| 5,296,702 A | 3/1994 | Beck et al. |
| 5,300,477 A | 4/1994 | Tice |
| 5,416,061 A | 5/1995 | Hewett et al. |
| 5,477,459 A | 12/1995 | Clegg et al. |
| 5,488,817 A | 2/1996 | Paquet et al. |
| 5,563,112 A | 10/1996 | Barnes, III |
| 5,585,626 A | 12/1996 | Beck et al. |
| 5,586,033 A | 12/1996 | Hall |
| 5,592,606 A | 1/1997 | Myers |
| 5,606,821 A | 3/1997 | Sadjadi et al. |
| 5,666,793 A | 9/1997 | Bottinger |
| 5,712,782 A | 1/1998 | Weigelt et al. |
| 5,721,679 A | 2/1998 | Monson |
| 5,767,373 A | 6/1998 | Ward et al. |
| 5,771,169 A | 6/1998 | Wendte |
| 5,789,741 A | 8/1998 | Kinter et al. |
| 5,809,440 A | 9/1998 | Beck et al. |
| 5,841,282 A | 11/1998 | Christy et al. |
| 5,849,665 A | 12/1998 | Gut et al. |
| 5,878,821 A | 3/1999 | Flenker et al. |
| 5,899,950 A | 5/1999 | Milender et al. |
| 5,902,343 A | 5/1999 | Hale et al. |
| 5,915,492 A | 6/1999 | Yates et al. |
| 5,957,304 A | 9/1999 | Dawson |
| 5,974,348 A | 10/1999 | Rocks |
| 5,978,723 A | 11/1999 | Hale et al. |
| 5,991,687 A | 11/1999 | Hale et al. |
| 5,991,694 A | 11/1999 | Gudat et al. |
| 5,995,859 A | 11/1999 | Takahashi |
| 5,995,894 A | 11/1999 | Wendte |
| 5,995,895 A | 11/1999 | Watt et al. |
| 6,004,076 A | 12/1999 | Cook et al. |
| 6,016,713 A | 1/2000 | Hale |
| 6,029,106 A | 2/2000 | Hale et al. |
| 6,041,582 A | 3/2000 | Tiede et al. |
| 6,073,070 A | 6/2000 | Diekhans |
| 6,073,428 A | 6/2000 | Diekhans |
| 6,085,135 A | 7/2000 | Steckel |
| 6,119,442 A | 9/2000 | Hale |
| 6,119,531 A | 9/2000 | Wendte et al. |
| 6,128,574 A | 10/2000 | Diekhans |
| 6,141,614 A | 10/2000 | Janzen et al. |
| 6,178,253 B1 | 1/2001 | Hendrickson et al. |
| 6,185,990 B1 | 2/2001 | Missotten et al. |
| 6,188,942 B1 | 2/2001 | Corcoran et al. |
| 6,199,000 B1 | 3/2001 | Keller et al. |
| 6,204,856 B1 | 3/2001 | Wood et al. |
| 6,205,381 B1 | 3/2001 | Motz et al. |
| 6,205,384 B1 | 3/2001 | Diekhans |
| 6,216,071 B1 | 4/2001 | Motz |
| 6,236,924 B1 | 5/2001 | Motz et al. |
| 6,272,819 B1 | 8/2001 | Wendte et al. |
| 6,327,569 B1 | 12/2001 | Reep |
| 6,374,173 B1 | 4/2002 | Ehlbeck |
| 6,380,745 B1 | 4/2002 | Anderson et al. |
| 6,431,790 B1 | 8/2002 | Anderegg et al. |
| 6,451,733 B1 | 9/2002 | Pidskalny et al. |
| 6,505,146 B1 | 1/2003 | Blackmer |
| 6,505,998 B1 | 1/2003 | Bullivant |
| 6,539,102 B1 | 3/2003 | Anderson et al. |
| 6,549,849 B2 | 4/2003 | Lange et al. |
| 6,584,390 B2 | 6/2003 | Beck |
| 6,591,145 B1 | 7/2003 | Hoskinson et al. |
| 6,591,591 B2 | 7/2003 | Coers et al. |
| 6,592,453 B2 | 7/2003 | Coers et al. |
| 6,604,432 B1 | 8/2003 | Hamblen et al. |
| 6,681,551 B1 | 1/2004 | Sheidler et al. |
| 6,682,416 B2 | 1/2004 | Behnke et al. |
| 6,687,616 B1 | 2/2004 | Peterson et al. |
| 6,729,189 B2 | 5/2004 | Paakkinen |
| 6,735,568 B1 | 5/2004 | Buckwalter et al. |
| 6,834,550 B2 | 12/2004 | Upadhyaya et al. |
| 6,838,564 B2 | 1/2005 | Edmunds et al. |
| 6,846,128 B2 | 1/2005 | Sick |
| 6,932,554 B2 | 8/2005 | Isfort et al. |
| 6,999,877 B1 | 2/2006 | Dyer et al. |
| 7,073,374 B2 | 7/2006 | Berkman |
| 7,167,797 B2 | 1/2007 | Faivre et al. |
| 7,167,800 B2 | 1/2007 | Faivre et al. |
| 7,184,892 B1 | 2/2007 | Dyer et al. |
| 7,191,062 B2 | 3/2007 | Chi et al. |
| 7,194,965 B2 | 3/2007 | Hickey et al. |
| 7,211,994 B1 | 5/2007 | Mergen et al. |
| 7,248,968 B2 | 7/2007 | Reid |
| 7,255,016 B2 | 8/2007 | Burton |
| 7,261,632 B2 | 8/2007 | Pirro et al. |
| 7,302,837 B2 | 12/2007 | Wendte |
| 7,308,326 B2 | 12/2007 | Maertens et al. |
| 7,313,478 B1 | 12/2007 | Anderson et al. |
| 7,318,010 B2 | 1/2008 | Anderson |
| 7,347,168 B2 | 3/2008 | Reckels et al. |
| 7,408,145 B2 | 8/2008 | Holland |
| 7,480,564 B2 | 1/2009 | Metzler et al. |
| 7,483,791 B2 | 1/2009 | Anderegg et al. |
| 7,537,519 B2 | 5/2009 | Huster et al. |
| 7,540,129 B2 | 6/2009 | Kormann |
| 7,557,066 B2 | 7/2009 | Hills et al. |
| 7,628,059 B1 | 12/2009 | Scherbring |
| 7,687,435 B2 | 3/2010 | Witschel et al. |
| 7,703,036 B2 | 4/2010 | Satterfield et al. |
| 7,725,233 B2 | 5/2010 | Hendrickson et al. |
| 7,733,416 B2 | 6/2010 | Gal |
| 7,756,624 B2 | 7/2010 | Diekhans et al. |
| 7,798,894 B2 | 9/2010 | Isfort |
| 7,827,042 B2 | 11/2010 | Jung et al. |
| 7,915,200 B2 | 3/2011 | Epp et al. |
| 7,945,364 B2 | 5/2011 | Schricker et al. |
| 7,993,188 B2 | 8/2011 | Ritter |
| 8,024,074 B2 | 9/2011 | Stelford et al. |
| 8,060,283 B2 | 11/2011 | Mott et al. |
| 8,107,681 B2 | 1/2012 | Gaal |
| 8,145,393 B2 | 3/2012 | Foster et al. |
| 8,147,176 B2 | 4/2012 | Coers et al. |
| 8,152,610 B2 | 4/2012 | Harrington |
| 8,190,335 B2 | 5/2012 | Vik et al. |
| 8,195,342 B2 | 6/2012 | Anderson |
| 8,195,358 B2 | 6/2012 | Anderson |
| 8,213,964 B2 | 7/2012 | Fitzner et al. |
| 8,224,500 B2 | 7/2012 | Anderson |
| 8,252,723 B2 | 8/2012 | Jakobi et al. |
| 8,254,351 B2 | 8/2012 | Fitzner et al. |
| 8,321,365 B2 | 11/2012 | Anderson |
| 8,329,717 B2 | 12/2012 | Minn et al. |

(56) References Cited

U.S. PATENT DOCUMENTS

| | | | |
|---|---|---|---|
| 8,332,105 B2 | 12/2012 | Laux | |
| 8,338,332 B1 | 12/2012 | Hacker et al. | |
| 8,340,862 B2 | 12/2012 | Baumgarten et al. | |
| 8,407,157 B2 | 3/2013 | Anderson | |
| 8,428,829 B2 | 4/2013 | Brunnert et al. | |
| 8,478,493 B2 | 7/2013 | Anderson | |
| 8,488,865 B2 | 7/2013 | Hausmann et al. | |
| 8,494,727 B2 | 7/2013 | Green et al. | |
| 8,527,157 B2 | 9/2013 | Imhof et al. | |
| 8,544,397 B2 | 10/2013 | Bassett | |
| 8,577,561 B2 | 11/2013 | Green et al. | |
| 8,606,454 B2 | 12/2013 | Wang et al. | |
| 8,626,406 B2 | 1/2014 | Schleicher et al. | |
| 8,635,903 B2 | 1/2014 | Hanson et al. | |
| 8,649,940 B2 | 2/2014 | Bonefas | |
| 8,656,693 B2 | 2/2014 | Madsen et al. | |
| 8,662,972 B2 | 3/2014 | Behnke et al. | |
| 8,671,760 B2 | 3/2014 | Wallrath et al. | |
| 8,677,724 B2 | 3/2014 | Chaney et al. | |
| 8,738,238 B2 | 5/2014 | Rekow | |
| 8,738,244 B2 | 5/2014 | Lenz | |
| 8,755,976 B2 | 6/2014 | Peters et al. | |
| 8,781,692 B2 | 7/2014 | Kormann | |
| 8,789,563 B2 | 7/2014 | Wenzel | |
| 8,814,640 B2 | 8/2014 | Behnke et al. | |
| 8,843,269 B2 | 9/2014 | Anderson et al. | |
| 8,868,304 B2 | 10/2014 | Bonefas | |
| 8,909,389 B2 | 12/2014 | Meyer | |
| D721,740 S | 1/2015 | Schmaltz et al. | |
| 8,942,860 B2 | 1/2015 | Morselli | |
| 8,962,523 B2 | 2/2015 | Rosinger et al. | |
| 9,002,591 B2 | 4/2015 | Wang et al. | |
| 9,008,918 B2 | 4/2015 | Missotten et al. | |
| 9,009,087 B1 | 4/2015 | Mewes et al. | |
| 9,011,222 B2 | 4/2015 | Johnson et al. | |
| 9,014,901 B2 | 4/2015 | Wang et al. | |
| 9,043,096 B2 | 5/2015 | Zielke et al. | |
| 9,043,129 B2 | 5/2015 | Bonefas et al. | |
| 9,066,465 B2 | 6/2015 | Hendrickson et al. | |
| 9,072,227 B2 | 7/2015 | Wenzel | |
| 9,095,090 B2 | 8/2015 | Casper et al. | |
| 9,098,386 B1 * | 8/2015 | Boydell | G01C 21/3484 |
| 9,119,342 B2 | 9/2015 | Bonefas | |
| 9,127,428 B2 | 9/2015 | Meier | |
| 9,131,644 B2 | 9/2015 | Osborne | |
| 9,152,938 B2 | 10/2015 | Lang et al. | |
| 9,173,339 B2 | 11/2015 | Sauder et al. | |
| 9,179,599 B2 | 11/2015 | Bischoff | |
| 9,188,518 B2 | 11/2015 | Snyder et al. | |
| 9,188,986 B2 | 11/2015 | Baumann | |
| 9,226,449 B2 | 1/2016 | Bischoff | |
| 9,234,317 B2 | 1/2016 | Chi | |
| 9,235,214 B2 | 1/2016 | Anderson | |
| 9,301,447 B2 | 4/2016 | Kormann | |
| 9,301,466 B2 | 4/2016 | Kelly | |
| 9,313,951 B2 | 4/2016 | Herman et al. | |
| 9,326,443 B2 | 5/2016 | Zametzer et al. | |
| 9,326,444 B2 | 5/2016 | Bonefas | |
| 9,392,746 B2 | 7/2016 | Darr et al. | |
| 9,405,039 B2 | 8/2016 | Anderson | |
| 9,410,840 B2 | 8/2016 | Acheson et al. | |
| 9,439,342 B2 | 9/2016 | Pasquier | |
| 9,457,971 B2 | 10/2016 | Bonefas et al. | |
| 9,463,939 B2 | 10/2016 | Bonefas et al. | |
| 9,485,905 B2 | 11/2016 | Jung et al. | |
| 9,489,576 B2 | 11/2016 | Johnson et al. | |
| 9,497,898 B2 | 11/2016 | Dillon | |
| 9,510,508 B2 | 12/2016 | Jung | |
| 9,511,633 B2 | 12/2016 | Anderson et al. | |
| 9,511,958 B2 | 12/2016 | Bonefas | |
| 9,516,812 B2 | 12/2016 | Baumgarten et al. | |
| 9,521,805 B2 | 12/2016 | Muench et al. | |
| 9,522,791 B2 | 12/2016 | Bonefas et al. | |
| 9,522,792 B2 | 12/2016 | Bonefas et al. | |
| 9,523,180 B2 | 12/2016 | Deines | |
| 9,529,364 B2 | 12/2016 | Foster et al. | |
| 9,532,504 B2 | 1/2017 | Herman et al. | |
| 9,538,714 B2 | 1/2017 | Anderson | |
| 9,563,492 B2 | 2/2017 | Bell et al. | |
| 9,563,848 B1 | 2/2017 | Hunt | |
| 9,563,852 B1 | 2/2017 | Wiles et al. | |
| 9,578,808 B2 | 2/2017 | Dybro et al. | |
| 9,629,308 B2 | 4/2017 | Schøler et al. | |
| 9,631,964 B2 | 4/2017 | Gelinske et al. | |
| 9,642,305 B2 | 5/2017 | Nykamp et al. | |
| 9,648,807 B2 | 5/2017 | Escher et al. | |
| 9,675,008 B1 | 6/2017 | Rusciolelli et al. | |
| 9,681,605 B2 | 6/2017 | Noonan et al. | |
| 9,694,712 B2 | 7/2017 | Healy | |
| 9,696,162 B2 | 7/2017 | Anderson | |
| 9,699,967 B2 | 7/2017 | Palla et al. | |
| 9,714,856 B2 | 7/2017 | Myers | |
| 9,717,178 B1 | 8/2017 | Sauder et al. | |
| 9,721,181 B2 | 8/2017 | Guan et al. | |
| 9,723,790 B2 | 8/2017 | Berry et al. | |
| 9,740,208 B2 | 8/2017 | Sugumaran et al. | |
| 9,767,521 B2 | 9/2017 | Stuber et al. | |
| 9,807,934 B2 | 11/2017 | Rusciolelli et al. | |
| 9,807,940 B2 | 11/2017 | Roell et al. | |
| 9,810,679 B2 | 11/2017 | Kimmel | |
| 9,829,364 B2 | 11/2017 | Wilson et al. | |
| 9,848,528 B2 | 12/2017 | Werner et al. | |
| 9,856,609 B2 | 1/2018 | Dehmel | |
| 9,856,612 B2 | 1/2018 | Oetken | |
| 9,861,040 B2 | 1/2018 | Bonefas | |
| 9,872,433 B2 | 1/2018 | Acheson et al. | |
| 9,903,077 B2 | 2/2018 | Rio | |
| 9,903,979 B2 | 2/2018 | Dybro et al. | |
| 9,904,963 B2 | 2/2018 | Rupp et al. | |
| 9,915,952 B2 | 3/2018 | Dollinger et al. | |
| 9,922,405 B2 | 3/2018 | Sauder et al. | |
| 9,924,636 B2 | 3/2018 | Lisouski et al. | |
| 9,928,584 B2 | 3/2018 | Jens et al. | |
| 9,933,787 B2 | 4/2018 | Story | |
| 9,974,226 B2 | 5/2018 | Rupp et al. | |
| 9,982,397 B2 | 5/2018 | Korb et al. | |
| 9,984,455 B1 | 5/2018 | Fox et al. | |
| 9,992,931 B2 | 6/2018 | Bonefas et al. | |
| 9,992,932 B2 | 6/2018 | Bonefas et al. | |
| 10,004,176 B2 | 6/2018 | Mayerle | |
| 10,015,928 B2 | 7/2018 | Nykamp et al. | |
| 10,019,018 B2 | 7/2018 | Hulin | |
| 10,019,790 B2 | 7/2018 | Bonefas et al. | |
| 10,025,983 B2 | 7/2018 | Guan et al. | |
| 10,028,435 B2 | 7/2018 | Anderson et al. | |
| 10,028,451 B2 | 7/2018 | Rowan et al. | |
| 10,034,427 B2 | 7/2018 | Krause et al. | |
| 10,039,231 B2 | 8/2018 | Anderson et al. | |
| 10,064,331 B2 | 9/2018 | Bradley | |
| 10,064,335 B2 | 9/2018 | Byttebier et al. | |
| 10,078,890 B1 | 9/2018 | Tagestad et al. | |
| 10,085,372 B2 | 10/2018 | Noyer et al. | |
| 10,091,925 B2 | 10/2018 | Aharoni et al. | |
| 10,126,153 B2 | 11/2018 | Bischoff et al. | |
| 10,129,528 B2 | 11/2018 | Bonefas et al. | |
| 10,143,132 B2 | 12/2018 | Inoue et al. | |
| 10,152,035 B2 | 12/2018 | Reid et al. | |
| 10,154,624 B2 | 12/2018 | Guan et al. | |
| 10,165,725 B2 | 1/2019 | Sugumaran et al. | |
| 10,178,823 B2 | 1/2019 | Kovach et al. | |
| 10,183,667 B2 | 1/2019 | Anderson et al. | |
| 10,188,037 B2 | 1/2019 | Bruns et al. | |
| 10,201,121 B1 | 2/2019 | Wilson | |
| 10,209,179 B2 | 2/2019 | Hollstein | |
| 10,231,371 B2 | 3/2019 | Dillon | |
| 10,254,147 B2 | 4/2019 | Vermue et al. | |
| 10,254,765 B2 | 4/2019 | Rekow | |
| 10,255,670 B1 | 4/2019 | Wu et al. | |
| 10,275,550 B2 | 4/2019 | Lee | |
| 10,295,703 B2 | 5/2019 | Dybro et al. | |
| 10,310,455 B2 | 6/2019 | Blank et al. | |
| 10,314,232 B2 | 6/2019 | Isaac et al. | |
| 10,315,655 B2 | 6/2019 | Blank et al. | |
| 10,317,272 B2 | 6/2019 | Bhavsar et al. | |

(56) References Cited

U.S. PATENT DOCUMENTS

| | | |
|---|---|---|
| 10,351,364 B2 | 7/2019 | Green et al. |
| 10,368,488 B2 | 8/2019 | Becker et al. |
| 10,398,084 B2 | 9/2019 | Ray et al. |
| 10,408,545 B2 | 9/2019 | Blank et al. |
| 10,412,889 B2 | 9/2019 | Palla et al. |
| 10,426,086 B2 | 10/2019 | Van de Wege et al. |
| 10,437,243 B2 | 10/2019 | Blank et al. |
| 10,462,603 B1 | 10/2019 | Tippery et al. |
| 10,477,756 B1 | 11/2019 | Richt et al. |
| 10,485,178 B2 | 11/2019 | Mayerle |
| 10,521,526 B2 | 12/2019 | Haaland et al. |
| 10,537,061 B2 | 1/2020 | Farley et al. |
| 10,568,316 B2 | 2/2020 | Gall et al. |
| 10,631,462 B2 | 4/2020 | Bonefas |
| 10,677,637 B1 | 6/2020 | Von Muenster |
| 10,681,872 B2 | 6/2020 | Viaene et al. |
| 10,703,277 B1 | 7/2020 | Schroeder |
| 10,729,067 B2 | 8/2020 | Hammer et al. |
| 10,740,703 B2 * | 8/2020 | Story .................. G06Q 10/047 |
| 10,745,868 B2 * | 8/2020 | Laugwitz .............. E01C 19/282 |
| 10,760,946 B2 | 9/2020 | Meier et al. |
| 10,809,118 B1 | 10/2020 | Von Muenster |
| 10,830,634 B2 | 11/2020 | Blank et al. |
| 10,866,109 B2 | 12/2020 | Madsen et al. |
| 10,890,922 B2 * | 1/2021 | Ramm ................. G05D 1/0295 |
| 10,909,368 B2 * | 2/2021 | Guo ....................... G06V 20/17 |
| 10,912,249 B1 | 2/2021 | Wilson |
| 11,079,725 B2 | 8/2021 | Palla et al. |
| 11,252,485 B2 | 2/2022 | Celicourt |
| 11,850,553 B2 | 5/2023 | Palla et al. |
| 2002/0011061 A1 | 1/2002 | Lucand et al. |
| 2002/0083695 A1 | 7/2002 | Behnke et al. |
| 2002/0091458 A1 | 7/2002 | Moore |
| 2002/0099471 A1 | 7/2002 | Benneweis |
| 2002/0133309 A1 | 9/2002 | Hardt |
| 2002/0173893 A1 | 11/2002 | Blackmore et al. |
| 2002/0193928 A1 | 12/2002 | Beck |
| 2002/0193929 A1 | 12/2002 | Beck |
| 2002/0198654 A1 | 12/2002 | Lange et al. |
| 2003/0004630 A1 | 1/2003 | Beck |
| 2003/0014171 A1 | 1/2003 | Ma et al. |
| 2003/0015351 A1 | 1/2003 | Goldman et al. |
| 2003/0024450 A1 | 2/2003 | Juptner |
| 2003/0060245 A1 | 3/2003 | Coers et al. |
| 2003/0069680 A1 | 4/2003 | Cohen et al. |
| 2003/0075145 A1 | 4/2003 | Sheidler et al. |
| 2003/0174207 A1 | 9/2003 | Alexia et al. |
| 2003/0182144 A1 | 9/2003 | Pickett et al. |
| 2003/0187560 A1 | 10/2003 | Keller et al. |
| 2003/0216158 A1 | 11/2003 | Bischoff |
| 2003/0229432 A1 | 12/2003 | Ho et al. |
| 2003/0229433 A1 | 12/2003 | van den Berg et al. |
| 2003/0229435 A1 | 12/2003 | Van der Lely |
| 2004/0004544 A1 | 1/2004 | William Knutson |
| 2004/0054457 A1 | 3/2004 | Kormann |
| 2004/0073468 A1 | 4/2004 | Vyas et al. |
| 2004/0141641 A1 | 7/2004 | McDonald et al. |
| 2004/0193348 A1 | 9/2004 | Gray et al. |
| 2005/0059445 A1 | 3/2005 | Niermann et al. |
| 2005/0066738 A1 | 3/2005 | Moore |
| 2005/0149235 A1 | 7/2005 | Seal et al. |
| 2005/0150202 A1 | 7/2005 | Quick |
| 2005/0197175 A1 | 9/2005 | Anderson |
| 2005/0241285 A1 | 11/2005 | Maertens et al. |
| 2005/0283314 A1 | 12/2005 | Hall |
| 2005/0284119 A1 | 12/2005 | Brunnert |
| 2006/0014489 A1 | 1/2006 | Fitzner et al. |
| 2006/0014643 A1 | 1/2006 | Hacker et al. |
| 2006/0047377 A1 | 3/2006 | Ferguson et al. |
| 2006/0058896 A1 | 3/2006 | Pokorny et al. |
| 2006/0074560 A1 | 4/2006 | Dyer et al. |
| 2006/0155449 A1 | 7/2006 | Dammann |
| 2006/0162631 A1 | 7/2006 | Hickey et al. |
| 2006/0196158 A1 | 9/2006 | Faivre et al. |
| 2006/0200334 A1 | 9/2006 | Faivre et al. |
| 2007/0005209 A1 | 1/2007 | Fitzner et al. |
| 2007/0021948 A1 | 1/2007 | Anderson |
| 2007/0056258 A1 | 3/2007 | Behnke |
| 2007/0068238 A1 | 3/2007 | Wendte |
| 2007/0073700 A1 | 3/2007 | Wippersteg et al. |
| 2007/0089390 A1 | 4/2007 | Hendrickson et al. |
| 2007/0135190 A1 | 6/2007 | Diekhans et al. |
| 2007/0185749 A1 | 8/2007 | Anderson et al. |
| 2007/0199903 A1 | 8/2007 | Denny |
| 2007/0208510 A1 | 9/2007 | Anderson et al. |
| 2007/0233348 A1 | 10/2007 | Diekhans et al. |
| 2007/0233374 A1 | 10/2007 | Diekhans et al. |
| 2007/0239337 A1 | 10/2007 | Anderson |
| 2007/0282523 A1 | 12/2007 | Diekhans et al. |
| 2007/0298744 A1 | 12/2007 | Fitzner et al. |
| 2008/0030320 A1 | 2/2008 | Wilcox et al. |
| 2008/0098035 A1 | 4/2008 | Wippersteg et al. |
| 2008/0140431 A1 | 6/2008 | Anderson et al. |
| 2008/0177449 A1 | 7/2008 | Pickett et al. |
| 2008/0248843 A1 | 10/2008 | Birrell et al. |
| 2008/0268927 A1 | 10/2008 | Farley et al. |
| 2008/0269052 A1 | 10/2008 | Rosinger et al. |
| 2008/0289308 A1 | 11/2008 | Brubaker |
| 2008/0312085 A1 | 12/2008 | Kordes et al. |
| 2009/0044505 A1 | 2/2009 | Huster et al. |
| 2009/0074243 A1 | 3/2009 | Missotten et al. |
| 2009/0143941 A1 | 6/2009 | Tarasinski et al. |
| 2009/0192654 A1 | 7/2009 | Wendte et al. |
| 2009/0216410 A1 | 8/2009 | Allen et al. |
| 2009/0226036 A1 | 9/2009 | Gaal |
| 2009/0259483 A1 | 10/2009 | Hendrickson et al. |
| 2009/0265098 A1 | 10/2009 | Dix |
| 2009/0306835 A1 | 12/2009 | Ellermann et al. |
| 2009/0311084 A1 | 12/2009 | Coers et al. |
| 2009/0312919 A1 | 12/2009 | Foster et al. |
| 2009/0312920 A1 | 12/2009 | Boenig et al. |
| 2009/0325658 A1 | 12/2009 | Phelan et al. |
| 2010/0036696 A1 | 2/2010 | Lang et al. |
| 2010/0042297 A1 | 2/2010 | Foster et al. |
| 2010/0063626 A1 | 3/2010 | Anderson |
| 2010/0063648 A1 | 3/2010 | Anderson |
| 2010/0063651 A1 | 3/2010 | Anderson |
| 2010/0063664 A1 | 3/2010 | Anderson |
| 2010/0063954 A1 | 3/2010 | Anderson |
| 2010/0070145 A1 | 3/2010 | Foster et al. |
| 2010/0071329 A1 | 3/2010 | Hindryckx et al. |
| 2010/0094481 A1 | 4/2010 | Anderson |
| 2010/0121541 A1 | 5/2010 | Behnke et al. |
| 2010/0137373 A1 | 6/2010 | Hungenberg et al. |
| 2010/0145572 A1 | 6/2010 | Steckel et al. |
| 2010/0152270 A1 | 6/2010 | Suty-Heinze et al. |
| 2010/0152943 A1 | 6/2010 | Matthews |
| 2010/0217474 A1 | 8/2010 | Baumgarten et al. |
| 2010/0268562 A1 | 10/2010 | Anderson |
| 2010/0268679 A1 | 10/2010 | Anderson |
| 2010/0285964 A1 | 11/2010 | Waldraff et al. |
| 2010/0317517 A1 | 12/2010 | Rosinger et al. |
| 2010/0319941 A1 | 12/2010 | Peterson |
| 2010/0332051 A1 | 12/2010 | Kormann |
| 2011/0056178 A1 | 3/2011 | Sauerwein et al. |
| 2011/0059782 A1 | 3/2011 | Harrington |
| 2011/0072773 A1 | 3/2011 | Schroeder et al. |
| 2011/0084851 A1 | 4/2011 | Peterson et al. |
| 2011/0086684 A1 | 4/2011 | Luellen et al. |
| 2011/0160961 A1 | 6/2011 | Wollenhaupt et al. |
| 2011/0213531 A1 | 9/2011 | Farley et al. |
| 2011/0224873 A1 | 9/2011 | Reeve et al. |
| 2011/0227745 A1 | 9/2011 | Kikuchi et al. |
| 2011/0257850 A1 | 10/2011 | Reeve et al. |
| 2011/0270494 A1 | 11/2011 | Imhof et al. |
| 2011/0270495 A1 | 11/2011 | Knapp |
| 2011/0295460 A1 | 12/2011 | Hunt et al. |
| 2011/0307149 A1 | 12/2011 | Pighi et al. |
| 2012/0004813 A1 | 1/2012 | Baumgarten et al. |
| 2012/0029732 A1 | 2/2012 | Meyer |
| 2012/0087771 A1 | 4/2012 | Wenzel |
| 2012/0096827 A1 | 4/2012 | Chaney et al. |
| 2012/0143642 A1 | 6/2012 | O'Neil |
| 2012/0215378 A1 | 8/2012 | Sprock et al. |

(56) References Cited

U.S. PATENT DOCUMENTS

| | | |
|---|---|---|
| 2012/0215379 A1 | 8/2012 | Sprock et al. |
| 2012/0253611 A1 | 10/2012 | Zielke et al. |
| 2012/0263560 A1 | 10/2012 | Diekhans et al. |
| 2012/0265412 A1 | 10/2012 | Diekhans et al. |
| 2012/0271489 A1 | 10/2012 | Roberts et al. |
| 2012/0323452 A1 | 12/2012 | Green et al. |
| 2013/0019580 A1 | 1/2013 | Anderson et al. |
| 2013/0022430 A1 | 1/2013 | Anderson et al. |
| 2013/0046419 A1 | 2/2013 | Anderson et al. |
| 2013/0046439 A1 | 2/2013 | Anderson et al. |
| 2013/0046525 A1 | 2/2013 | Ali et al. |
| 2013/0103269 A1 | 4/2013 | Meyer Zu Hellgen et al. |
| 2013/0124239 A1 | 5/2013 | Rosa et al. |
| 2013/0126399 A1 | 5/2013 | Wolff |
| 2013/0184944 A1 | 7/2013 | Missotten et al. |
| 2013/0185104 A1 | 7/2013 | Klavins |
| 2013/0197767 A1 | 8/2013 | Lenz |
| 2013/0205733 A1 | 8/2013 | Peters et al. |
| 2013/0210505 A1 | 8/2013 | Bischoff |
| 2013/0231823 A1 | 9/2013 | Wang et al. |
| 2013/0319941 A1 | 12/2013 | Schneider |
| 2013/0325242 A1 | 12/2013 | Cavender-Bares et al. |
| 2013/0332003 A1 | 12/2013 | Murray et al. |
| 2014/0002489 A1 | 1/2014 | Sauder et al. |
| 2014/0019017 A1 | 1/2014 | Wilken et al. |
| 2014/0021598 A1 | 1/2014 | Sutardja |
| 2014/0050364 A1 | 2/2014 | Brueckner et al. |
| 2014/0067745 A1 | 3/2014 | Avey |
| 2014/0121882 A1 | 5/2014 | Gilmore et al. |
| 2014/0129048 A1 | 5/2014 | Baumgarten et al. |
| 2014/0172222 A1 | 6/2014 | Nickel |
| 2014/0172224 A1 | 6/2014 | Matthews et al. |
| 2014/0172225 A1 | 6/2014 | Matthews et al. |
| 2014/0208870 A1 | 7/2014 | Quaderer et al. |
| 2014/0215984 A1 | 8/2014 | Bischoff |
| 2014/0230391 A1 | 8/2014 | Hendrickson et al. |
| 2014/0230392 A1 | 8/2014 | Dybro et al. |
| 2014/0236381 A1 | 8/2014 | Anderson et al. |
| 2014/0236431 A1 | 8/2014 | Hendrickson et al. |
| 2014/0257911 A1 | 9/2014 | Anderson |
| 2014/0262547 A1 | 9/2014 | Acheson et al. |
| 2014/0277960 A1 | 9/2014 | Blank et al. |
| 2014/0297242 A1 | 10/2014 | Sauder et al. |
| 2014/0303814 A1 | 10/2014 | Burema et al. |
| 2014/0324272 A1 | 10/2014 | Madsen et al. |
| 2014/0331631 A1 | 11/2014 | Sauder et al. |
| 2014/0338298 A1 | 11/2014 | Jung et al. |
| 2014/0350802 A1 | 11/2014 | Biggerstaff et al. |
| 2014/0360148 A1 | 12/2014 | Wienker et al. |
| 2014/0379228 A1 | 12/2014 | Batcheller et al. |
| 2015/0049088 A1 | 2/2015 | Snyder et al. |
| 2015/0088785 A1 | 3/2015 | Chi |
| 2015/0095830 A1 | 4/2015 | Massoumi et al. |
| 2015/0101519 A1 | 4/2015 | Blackwell et al. |
| 2015/0105984 A1 | 4/2015 | Birrell et al. |
| 2015/0124054 A1 | 5/2015 | Darr et al. |
| 2015/0168187 A1 | 6/2015 | Myers |
| 2015/0211199 A1 | 7/2015 | Corcoran et al. |
| 2015/0230403 A1 | 8/2015 | Jung et al. |
| 2015/0240939 A1 | 8/2015 | Ge |
| 2015/0242799 A1 | 8/2015 | Seki et al. |
| 2015/0243114 A1 | 8/2015 | Tanabe et al. |
| 2015/0254800 A1 | 9/2015 | Johnson et al. |
| 2015/0264863 A1 | 9/2015 | Muench et al. |
| 2015/0276794 A1 | 10/2015 | Pistrol et al. |
| 2015/0278640 A1 | 10/2015 | Johnson et al. |
| 2015/0285647 A1 | 10/2015 | Meyer zu Helligen et al. |
| 2015/0293029 A1 | 10/2015 | Acheson et al. |
| 2015/0302305 A1 | 10/2015 | Rupp et al. |
| 2015/0305238 A1 | 10/2015 | Klausmann et al. |
| 2015/0305239 A1 | 10/2015 | Jung |
| 2015/0327440 A1 | 11/2015 | Dybro et al. |
| 2015/0351320 A1 | 12/2015 | Takahara et al. |
| 2015/0370935 A1 | 12/2015 | Starr |
| 2015/0373902 A1 | 12/2015 | Pasquier |
| 2015/0373913 A1 | 12/2015 | Berry et al. |
| 2015/0379785 A1 | 12/2015 | Brown, Jr. et al. |
| 2016/0025531 A1 | 1/2016 | Bischoff et al. |
| 2016/0029558 A1 | 2/2016 | Dybro et al. |
| 2016/0052525 A1 | 2/2016 | Tuncer et al. |
| 2016/0057922 A1 | 3/2016 | Freiberg et al. |
| 2016/0066505 A1 | 3/2016 | Bakke et al. |
| 2016/0073573 A1 | 3/2016 | Ethington et al. |
| 2016/0078375 A1 | 3/2016 | Ethington et al. |
| 2016/0078391 A1 | 3/2016 | Blank et al. |
| 2016/0078570 A1 | 3/2016 | Ethington et al. |
| 2016/0088794 A1 | 3/2016 | Baumgarten et al. |
| 2016/0106038 A1 | 4/2016 | Boyd et al. |
| 2016/0084813 A1 | 5/2016 | Anderson et al. |
| 2016/0146611 A1 | 5/2016 | Matthews et al. |
| 2016/0147962 A1 | 5/2016 | Vollmar et al. |
| 2016/0202227 A1 | 7/2016 | Mathur et al. |
| 2016/0203657 A1 | 7/2016 | Bell et al. |
| 2016/0205918 A1 | 7/2016 | Chan et al. |
| 2016/0212939 A1 | 7/2016 | Ouchida et al. |
| 2016/0215994 A1 | 7/2016 | Mewes et al. |
| 2016/0232621 A1 | 8/2016 | Ethington et al. |
| 2016/0247075 A1 | 8/2016 | Mewes et al. |
| 2016/0247082 A1 | 8/2016 | Stehling |
| 2016/0260021 A1 | 9/2016 | Marek |
| 2016/0285416 A1 | 9/2016 | Tiwari et al. |
| 2016/0286720 A1 | 10/2016 | Heitmann et al. |
| 2016/0286721 A1 | 10/2016 | Heitmann et al. |
| 2016/0286722 A1 | 10/2016 | Heitmann et al. |
| 2016/0309656 A1 | 10/2016 | Wilken et al. |
| 2016/0327535 A1 | 11/2016 | Cotton et al. |
| 2016/0330906 A1 | 11/2016 | Acheson et al. |
| 2016/0338267 A1 | 11/2016 | Anderson et al. |
| 2016/0342915 A1 | 11/2016 | Humphrey |
| 2016/0345485 A1 | 12/2016 | Acheson et al. |
| 2016/0360697 A1 | 12/2016 | Diaz |
| 2017/0013773 A1 | 1/2017 | Kirk et al. |
| 2017/0031365 A1 | 2/2017 | Sugumaran et al. |
| 2017/0034997 A1 | 2/2017 | Mayerle |
| 2017/0049045 A1 | 2/2017 | Wilken et al. |
| 2017/0055433 A1 | 3/2017 | Jamison |
| 2017/0082442 A1 | 3/2017 | Anderson |
| 2017/0083024 A1 | 3/2017 | Reijersen Van Buuren |
| 2017/0086381 A1 | 3/2017 | Roell et al. |
| 2017/0089741 A1 | 3/2017 | Takahashi et al. |
| 2017/0089742 A1 | 3/2017 | Bruns et al. |
| 2017/0090068 A1 | 3/2017 | Xiang et al. |
| 2017/0105331 A1 | 4/2017 | Herlitzius et al. |
| 2017/0105335 A1 | 4/2017 | Xu et al. |
| 2017/0112049 A1 | 4/2017 | Weisberg et al. |
| 2017/0112061 A1 | 4/2017 | Meyer |
| 2017/0115862 A1 | 4/2017 | Stratton et al. |
| 2017/0118915 A1 | 5/2017 | Middelberg et al. |
| 2017/0124463 A1 | 5/2017 | Chen et al. |
| 2017/0127606 A1 | 5/2017 | Horton |
| 2017/0160916 A1 | 6/2017 | Baumgarten et al. |
| 2017/0161627 A1 | 6/2017 | Xu et al. |
| 2017/0185086 A1 | 6/2017 | Sauder et al. |
| 2017/0188515 A1 | 7/2017 | Baumgarten et al. |
| 2017/0192431 A1 | 7/2017 | Foster et al. |
| 2017/0208742 A1 | 7/2017 | Ingibergsson et al. |
| 2017/0213141 A1 | 7/2017 | Xu et al. |
| 2017/0215330 A1 | 8/2017 | Missotten et al. |
| 2017/0223947 A1 | 8/2017 | Gall et al. |
| 2017/0227969 A1 | 8/2017 | Murray et al. |
| 2017/0235471 A1 | 8/2017 | Scholer et al. |
| 2017/0245434 A1 | 8/2017 | Jung et al. |
| 2017/0251600 A1 | 9/2017 | Anderson et al. |
| 2017/0270446 A1 | 9/2017 | Starr et al. |
| 2017/0270616 A1 | 9/2017 | Basso |
| 2017/0316692 A1 | 11/2017 | Rusciolelli et al. |
| 2017/0318743 A1 | 11/2017 | Sauder et al. |
| 2017/0322550 A1 | 11/2017 | Yokoyama |
| 2017/0332551 A1 | 11/2017 | Todd et al. |
| 2017/0336787 A1 | 11/2017 | Pichlmaier et al. |
| 2017/0370765 A1 | 12/2017 | Meier et al. |
| 2018/0000011 A1 | 1/2018 | Schleusner et al. |
| 2018/0014452 A1 | 1/2018 | Starr |
| 2018/0022559 A1 | 1/2018 | Knutson |

(56) References Cited

U.S. PATENT DOCUMENTS

| | | |
|---|---|---|
| 2018/0024549 A1 | 1/2018 | Hurd |
| 2018/0035622 A1 | 2/2018 | Gresch et al. |
| 2018/0054955 A1 | 3/2018 | Oliver |
| 2018/0060975 A1 | 3/2018 | Hassanzadeh |
| 2018/0070534 A1 | 3/2018 | Mayerle |
| 2018/0077865 A1 | 3/2018 | Gallmeier |
| 2018/0084709 A1 | 3/2018 | Wieckhorst et al. |
| 2018/0084722 A1* | 3/2018 | Wieckhorst ......... B60W 40/064 |
| 2018/0092301 A1 | 4/2018 | Vandike et al. |
| 2018/0092302 A1 | 4/2018 | Vandike et al. |
| 2018/0108123 A1 | 4/2018 | Baurer et al. |
| 2018/0120133 A1 | 5/2018 | Blank et al. |
| 2018/0121821 A1 | 5/2018 | Parsons et al. |
| 2018/0124992 A1 | 5/2018 | Koch et al. |
| 2018/0128933 A1 | 5/2018 | Koch et al. |
| 2018/0129879 A1 | 5/2018 | Achtelik et al. |
| 2018/0132422 A1 | 5/2018 | Hassanzadeh et al. |
| 2018/0136664 A1 | 5/2018 | Tomita et al. |
| 2018/0146612 A1 | 5/2018 | Sauder et al. |
| 2018/0146624 A1 | 5/2018 | Chen et al. |
| 2018/0153084 A1 | 6/2018 | Calleija et al. |
| 2018/0177125 A1 | 6/2018 | Takahara et al. |
| 2018/0177136 A1 | 6/2018 | Reimann et al. |
| 2018/0181893 A1 | 6/2018 | Basso |
| 2018/0196438 A1 | 7/2018 | Newlin et al. |
| 2018/0196441 A1 | 7/2018 | Muench et al. |
| 2018/0211156 A1 | 7/2018 | Guan et al. |
| 2018/0232674 A1 | 8/2018 | Bilde |
| 2018/0242523 A1 | 8/2018 | Kirchbeck et al. |
| 2018/0249641 A1 | 9/2018 | Lewis et al. |
| 2018/0257657 A1 | 9/2018 | Blank et al. |
| 2018/0271015 A1 | 9/2018 | Redden et al. |
| 2018/0279599 A1 | 10/2018 | Struve |
| 2018/0295771 A1 | 10/2018 | Peters |
| 2018/0310474 A1 | 11/2018 | Posselius et al. |
| 2018/0317381 A1 | 11/2018 | Bassett |
| 2018/0317385 A1 | 11/2018 | Wellensiek et al. |
| 2018/0325012 A1 | 11/2018 | Ferrari et al. |
| 2018/0325014 A1 | 11/2018 | Debbaut |
| 2018/0325015 A1 | 11/2018 | Wolters et al. |
| 2018/0332767 A1 | 11/2018 | Muench et al. |
| 2018/0338422 A1 | 11/2018 | Brubaker |
| 2018/0340845 A1 | 11/2018 | Rhodes et al. |
| 2018/0359917 A1 | 12/2018 | Blank et al. |
| 2018/0359919 A1 | 12/2018 | Blank et al. |
| 2018/0364726 A1 | 12/2018 | Foster et al. |
| 2018/0368318 A1 | 12/2018 | Isaac et al. |
| 2019/0021226 A1 | 1/2019 | Dima et al. |
| 2019/0025175 A1 | 1/2019 | Laugwitz |
| 2019/0041813 A1 | 2/2019 | Horn et al. |
| 2019/0050948 A1 | 2/2019 | Perry et al. |
| 2019/0057460 A1 | 2/2019 | Sakaguchi et al. |
| 2019/0066234 A1 | 2/2019 | Bedoya et al. |
| 2019/0069470 A1 | 3/2019 | Pfeiffer et al. |
| 2019/0075727 A1 | 3/2019 | Duke et al. |
| 2019/0085785 A1 | 3/2019 | Abolt |
| 2019/0090423 A1 | 3/2019 | Escher et al. |
| 2019/0098825 A1 | 4/2019 | Neitemeier et al. |
| 2019/0104722 A1 | 4/2019 | Slaughter et al. |
| 2019/0108413 A1 | 4/2019 | Chen et al. |
| 2019/0114847 A1 | 4/2019 | Wagner et al. |
| 2019/0124819 A1 | 5/2019 | Madsen et al. |
| 2019/0129430 A1 | 5/2019 | Madsen et al. |
| 2019/0136491 A1 | 5/2019 | Martin et al. |
| 2019/0138962 A1 | 5/2019 | Ehlmann et al. |
| 2019/0147094 A1 | 5/2019 | Zhan et al. |
| 2019/0147249 A1 | 5/2019 | Kiepe et al. |
| 2019/0150357 A1 | 5/2019 | Wu et al. |
| 2019/0156255 A1 | 5/2019 | Carroll |
| 2019/0174667 A1 | 6/2019 | Gresch et al. |
| 2019/0183047 A1 | 6/2019 | Dybro et al. |
| 2019/0200522 A1 | 7/2019 | Hansen et al. |
| 2019/0230855 A1 | 8/2019 | Reed et al. |
| 2019/0239416 A1 | 8/2019 | Green et al. |
| 2019/0259108 A1* | 8/2019 | Bongartz ............... A01G 31/02 |
| 2019/0261550 A1 | 8/2019 | Damme et al. |
| 2019/0261559 A1 | 8/2019 | Heitmann et al. |
| 2019/0261560 A1 | 8/2019 | Jelenkovic |
| 2019/0313570 A1 | 10/2019 | Owechko |
| 2019/0327889 A1 | 10/2019 | Borgstadt |
| 2019/0327892 A1 | 10/2019 | Fries et al. |
| 2019/0335662 A1 | 11/2019 | Good et al. |
| 2019/0335674 A1 | 11/2019 | Basso |
| 2019/0343035 A1 | 11/2019 | Smith et al. |
| 2019/0343043 A1 | 11/2019 | Bormann et al. |
| 2019/0343044 A1 | 11/2019 | Bormann et al. |
| 2019/0343048 A1 | 11/2019 | Farley et al. |
| 2019/0351765 A1 | 11/2019 | Rabusic |
| 2019/0354081 A1 | 11/2019 | Blank et al. |
| 2019/0364733 A1 | 12/2019 | Laugen et al. |
| 2019/0364734 A1 | 12/2019 | Kriebel et al. |
| 2020/0000006 A1 | 1/2020 | McDonald et al. |
| 2020/0008351 A1 | 1/2020 | Zielke et al. |
| 2020/0015416 A1 | 1/2020 | Barther et al. |
| 2020/0019159 A1 | 1/2020 | Kocer et al. |
| 2020/0024102 A1 | 1/2020 | Brill et al. |
| 2020/0029488 A1 | 1/2020 | Bertucci et al. |
| 2020/0034759 A1 | 1/2020 | Dumstorff et al. |
| 2020/0037491 A1 | 2/2020 | Schoeny et al. |
| 2020/0053961 A1 | 2/2020 | Dix et al. |
| 2020/0064144 A1 | 2/2020 | Tomita et al. |
| 2020/0064863 A1 | 2/2020 | Tomita et al. |
| 2020/0074023 A1 | 3/2020 | Nizami et al. |
| 2020/0084963 A1 | 3/2020 | Gururajan et al. |
| 2020/0084966 A1 | 3/2020 | Corban et al. |
| 2020/0090094 A1 | 3/2020 | Blank |
| 2020/0097851 A1 | 3/2020 | Alvarez et al. |
| 2020/0113142 A1 | 4/2020 | Coleman et al. |
| 2020/0117173 A1 | 4/2020 | Terres et al. |
| 2020/0125098 A1 | 4/2020 | Cavender-Bares |
| 2020/0125822 A1 | 4/2020 | Yang et al. |
| 2020/0128732 A1 | 4/2020 | Chaney |
| 2020/0128733 A1 | 4/2020 | Vandike et al. |
| 2020/0128734 A1 | 4/2020 | Brammeier et al. |
| 2020/0128735 A1 | 4/2020 | Bonefas et al. |
| 2020/0128737 A1 | 4/2020 | Anderson et al. |
| 2020/0128738 A1 | 4/2020 | Suleman et al. |
| 2020/0128740 A1 | 4/2020 | Suleman |
| 2020/0133262 A1 | 4/2020 | Suleman et al. |
| 2020/0141784 A1 | 5/2020 | Lange et al. |
| 2020/0146203 A1 | 5/2020 | Deng |
| 2020/0150631 A1 | 5/2020 | Frieberg et al. |
| 2020/0154639 A1 | 5/2020 | Takahara et al. |
| 2020/0163277 A1 | 5/2020 | Cooksey et al. |
| 2020/0183406 A1 | 6/2020 | Borgstadt |
| 2020/0187409 A1 | 6/2020 | Meyer et al. |
| 2020/0193589 A1 | 6/2020 | Peshlov et al. |
| 2020/0196526 A1 | 6/2020 | Koch et al. |
| 2020/0202127 A1 | 6/2020 | Chen et al. |
| 2020/0202596 A1 | 6/2020 | Kitahara et al. |
| 2020/0214231 A1 | 7/2020 | Beeri et al. |
| 2020/0214281 A1 | 7/2020 | Koch et al. |
| 2020/0221632 A1 | 7/2020 | Strnad et al. |
| 2020/0221635 A1 | 7/2020 | Hendrickson et al. |
| 2020/0221636 A1 | 7/2020 | Boydens et al. |
| 2020/0236836 A1 | 7/2020 | Barrick et al. |
| 2020/0250360 A1 | 8/2020 | Hoffmann et al. |
| 2020/0250593 A1 | 8/2020 | Peters et al. |
| 2020/0265527 A1 | 8/2020 | Rose et al. |
| 2020/0278680 A1 | 9/2020 | Schultz et al. |
| 2020/0317114 A1 | 10/2020 | Hoff |
| 2020/0319632 A1 | 10/2020 | Desai et al. |
| 2020/0319655 A1* | 10/2020 | Desai ................... G05D 1/0291 |
| 2020/0323133 A1 | 10/2020 | Anderson et al. |
| 2020/0323134 A1 | 10/2020 | Darr et al. |
| 2020/0326674 A1 | 10/2020 | Palla et al. |
| 2020/0326727 A1 | 10/2020 | Palla et al. |
| 2020/0333278 A1 | 10/2020 | Locken et al. |
| 2020/0337232 A1 | 10/2020 | Blank et al. |
| 2020/0342225 A1 | 10/2020 | Schumann et al. |
| 2020/0352099 A1 | 11/2020 | Meier et al. |
| 2020/0359547 A1 | 11/2020 | Sakaguchi et al. |
| 2020/0359549 A1 | 11/2020 | Sakaguchi et al. |
| 2020/0363256 A1 | 11/2020 | Meier et al. |

(56) References Cited

U.S. PATENT DOCUMENTS

| | | |
|---|---|---|
| 2020/0375083 A1 | 12/2020 | Anderson et al. |
| 2020/0375084 A1 | 12/2020 | Sakaguchi et al. |
| 2020/0378088 A1 | 12/2020 | Anderson |
| 2020/0404842 A1 | 12/2020 | Dugas et al. |
| 2021/0015041 A1 | 1/2021 | Bormann et al. |
| 2021/0029877 A1 | 2/2021 | Vandike et al. |
| 2021/0129853 A1 | 5/2021 | Appleton et al. |
| 2021/0149406 A1 | 5/2021 | Javault |
| 2021/0176916 A1 | 6/2021 | Sidon et al. |
| 2021/0176918 A1 | 6/2021 | Franzen et al. |
| 2021/0289687 A1 | 9/2021 | Heinold et al. |
| 2021/0315163 A1 | 10/2021 | Brewin |
| 2021/0321567 A1 | 10/2021 | Sidon et al. |
| 2022/0110252 A1 | 4/2022 | Vandike et al. |
| 2022/0151156 A1 | 5/2022 | Bidram et al. |
| 2022/0327815 A1 | 10/2022 | Picon Ruiz |

FOREIGN PATENT DOCUMENTS

| | | |
|---|---|---|
| BR | MU6800140 U | 12/1989 |
| BR | PI0502658 A | 2/2007 |
| BR | PI0802384 A2 | 3/2010 |
| BR | PI1100258 A2 | 3/2014 |
| BR | 102014007178 A2 | 8/2016 |
| CA | 1165300 A | 4/1984 |
| CA | 2283767 A1 | 3/2001 |
| CA | 2330979 A1 | 8/2001 |
| CA | 2629555 A1 | 11/2009 |
| CA | 135611 S | 5/2011 |
| CN | 2451633 Y | 10/2001 |
| CN | 1614392 A | 5/2005 |
| CN | 101236188 A | 8/2008 |
| CN | 100416590 C | 9/2008 |
| CN | 101303338 A | 11/2008 |
| CN | 101363833 A | 2/2009 |
| CN | 201218789 Y | 4/2009 |
| CN | 101839906 A | 9/2010 |
| CN | 101929166 A | 12/2010 |
| CN | 102080373 A | 6/2011 |
| CN | 102138383 A | 8/2011 |
| CN | 102277867 B | 12/2011 |
| CN | 202110103 U | 1/2012 |
| CN | 202119772 U | 1/2012 |
| CN | 202340435 U | 7/2012 |
| CN | 103088807 A | 5/2013 |
| CN | 103181263 A | 7/2013 |
| CN | 203053961 U | 7/2013 |
| CN | 203055121 U | 7/2013 |
| CN | 203206739 U | 9/2013 |
| CN | 102277867 B | 10/2013 |
| CN | 203275401 U | 11/2013 |
| CN | 203613525 U | 5/2014 |
| CN | 203658201 U | 6/2014 |
| CN | 103954738 A | 7/2014 |
| CN | 203741803 U | 7/2014 |
| CN | 204000818 U | 12/2014 |
| CN | 204435344 U | 7/2015 |
| CN | 204475304 U | 7/2015 |
| CN | 105205248 A | 12/2015 |
| CN | 204989174 U | 1/2016 |
| CN | 105432228 A | 3/2016 |
| CN | 105741180 A | 7/2016 |
| CN | 106053330 A | 10/2016 |
| CN | 106198877 A | 12/2016 |
| CN | 106198879 A | 12/2016 |
| CN | 106226470 A | 12/2016 |
| CN | 106248873 A | 12/2016 |
| CN | 106290800 A | 1/2017 |
| CN | 106327349 A | 1/2017 |
| CN | 106644663 A | 5/2017 |
| CN | 206330815 U | 7/2017 |
| CN | 107111795 A | 8/2017 |
| CN | 206515118 U | 9/2017 |
| CN | 206515119 U | 9/2017 |
| CN | 206616118 U | 11/2017 |
| CN | 206696107 | 12/2017 |
| CN | 206696107 U | 12/2017 |
| CN | 107576674 | 1/2018 |
| CN | 107576674 A | 1/2018 |
| CN | 206906093 U | 1/2018 |
| CN | 206941558 | 1/2018 |
| CN | 206941558 U | 1/2018 |
| CN | 107736088 A | 2/2018 |
| CN | 107795095 A | 3/2018 |
| CN | 207079558 | 3/2018 |
| CN | 107941286 A | 4/2018 |
| CN | 107957408 A | 4/2018 |
| CN | 108009542 A | 5/2018 |
| CN | 108304796 A | 7/2018 |
| CN | 207567744 U | 7/2018 |
| CN | 108614089 A | 10/2018 |
| CN | 208013131 U | 10/2018 |
| CN | 108881825 A | 11/2018 |
| CN | 208047351 U | 11/2018 |
| CN | 109357804 A | 2/2019 |
| CN | 109485353 A | 3/2019 |
| CN | 109633127 A | 4/2019 |
| CN | 109763476 A | 5/2019 |
| CN | 109961024 A | 7/2019 |
| CN | 110262287 A | 9/2019 |
| CN | 110720302 A | 1/2020 |
| CN | 111201879 A | 5/2020 |
| CN | 210585958 U | 5/2020 |
| CN | 111406505 A | 7/2020 |
| CS | 247426 B1 | 12/1986 |
| CS | 248318 B1 | 2/1987 |
| CZ | 17266 U1 | 2/2007 |
| CZ | 20252 U1 | 11/2009 |
| DE | 441597 C | 3/1927 |
| DE | 504035 C | 7/1930 |
| DE | 2354828 A1 | 5/1975 |
| DE | 152380 A1 | 11/1981 |
| DE | 3728669 A1 | 3/1989 |
| DE | 4431824 C1 | 5/1996 |
| DE | 19509496 A1 | 9/1996 |
| DE | 19528663 A1 | 2/1997 |
| DE | 19718455 A1 | 11/1997 |
| DE | 19705842 A1 | 8/1998 |
| DE | 19828355 A1 | 1/2000 |
| DE | 10050224 A1 | 4/2002 |
| DE | 10120173 A1 | 10/2002 |
| DE | 202004015141 U1 | 12/2004 |
| DE | 102005000770 B3 | 7/2006 |
| DE | 102005000771 A1 | 8/2006 |
| DE | 102008021785 A1 | 11/2009 |
| DE | 102009041646 A1 | 3/2011 |
| DE | 102010004648 A1 | 7/2011 |
| DE | 102010038661 A1 | 2/2012 |
| DE | 102011005400 A1 | 9/2012 |
| DE | 202012103730 U1 | 10/2012 |
| DE | 102011052688 A1 | 2/2013 |
| DE | 102012211001 A1 | 1/2014 |
| DE | 102012220109 | 5/2014 |
| DE | 102012223768 | 6/2014 |
| DE | 102013212151 A1 | 12/2014 |
| DE | 102013019098 B3 | 1/2015 |
| DE | 102014108449 A1 | 2/2015 |
| DE | 2014201203 A1 | 7/2015 |
| DE | 102014208068 A1 | 10/2015 |
| DE | 102015006398 B3 | 5/2016 |
| DE | 102015109799 A1 | 12/2016 |
| DE | 112015002194 T5 | 1/2017 |
| DE | 102017215087 A1 | 4/2018 |
| DE | 102017204511 A1 | 9/2018 |
| DE | 102019206734 A1 | 11/2020 |
| DE | 102019114872 A1 | 12/2020 |
| EP | 0070219 B1 | 10/1984 |
| EP | 0355049 A2 | 2/1990 |
| EP | 845198 B2 | 6/1998 |
| EP | 0532146 B1 | 8/1998 |
| EP | 1444879 A1 | 8/2004 |
| EP | 1473673 A2 | 11/2004 |
| EP | 1219159 B1 | 6/2005 |
| EP | 1219153 B1 | 2/2006 |

(56) References Cited

FOREIGN PATENT DOCUMENTS

| | | | | |
|---|---|---|---|---|
| EP | 1692928 | A2 | 8/2006 | |
| EP | 1574122 | B1 | 2/2008 | |
| EP | 1943877 | A2 | 7/2008 | |
| EP | 2020174 | A1 * | 2/2009 | ........... A01D 43/087 |
| EP | 1598586 | B1 | 9/2009 | |
| EP | 1731983 | B1 | 9/2009 | |
| EP | 2146307 | A2 | 1/2010 | |
| EP | 0845198 | B2 | 2/2010 | |
| EP | 2186389 | A1 | 5/2010 | |
| EP | 2267566 | A2 | 12/2010 | |
| EP | 3491192 | A2 | 12/2010 | |
| EP | 2057884 | B1 | 1/2011 | |
| EP | 2146307 | B1 | 5/2012 | |
| EP | 2446732 | A1 | 5/2012 | |
| EP | 2524586 | A2 | 11/2012 | |
| EP | 2529610 | A1 | 12/2012 | |
| EP | 2243353 | B1 | 3/2013 | |
| EP | 2174537 | B1 | 5/2013 | |
| EP | 2592919 | A1 | 5/2013 | |
| EP | 1674324 | B2 | 5/2014 | |
| EP | 2759829 | A1 | 7/2014 | |
| EP | 2764764 | B1 | 8/2014 | |
| EP | 2267566 | A3 | 12/2014 | |
| EP | 2191439 | B1 | 3/2015 | |
| EP | 2586286 | B1 | 3/2015 | |
| EP | 2592919 | B1 | 9/2015 | |
| EP | 2921042 | A1 | 9/2015 | |
| EP | 2944725 | A1 | 11/2015 | |
| EP | 2764764 | B1 | 12/2015 | |
| EP | 2510777 | B1 | 3/2016 | |
| EP | 2997805 | A1 | 3/2016 | |
| EP | 3000302 | A1 | 3/2016 | |
| EP | 2868806 | B1 | 7/2016 | |
| EP | 3085221 | A1 | 10/2016 | |
| EP | 3095310 | A1 | 11/2016 | |
| EP | 3097759 | A1 | 11/2016 | |
| EP | 2452551 | B1 | 5/2017 | |
| EP | 3175691 | A1 | 6/2017 | |
| EP | 3195719 | A1 | 7/2017 | |
| EP | 3195720 | A1 | 7/2017 | |
| EP | 3259976 | A1 | 12/2017 | |
| EP | 3262934 | A1 | 1/2018 | |
| EP | 3491192 | A1 | 1/2018 | |
| EP | 3287007 | A1 | 2/2018 | |
| EP | 3298876 | A1 | 3/2018 | |
| EP | 3300579 | A1 | 4/2018 | |
| EP | 3315005 | A1 | 5/2018 | |
| EP | 3316208 | A1 | 5/2018 | |
| EP | 2829171 | B1 | 6/2018 | |
| EP | 2508057 | | 7/2018 | |
| EP | 2508057 | B1 | 7/2018 | |
| EP | 3378298 | A1 | 9/2018 | |
| EP | 3378299 | A1 | 9/2018 | |
| EP | 2997805 | A1 | 10/2018 | |
| EP | 3384754 | A1 | 10/2018 | |
| EP | 3289853 | B1 | 3/2019 | |
| EP | 3456167 | A1 | 3/2019 | |
| EP | 3466239 | A1 | 4/2019 | |
| EP | 3469878 | A1 | 4/2019 | |
| EP | 3289852 | B1 | 6/2019 | |
| EP | 3491192 | A1 | 6/2019 | |
| EP | 3494770 | A1 | 6/2019 | |
| EP | 3498074 | A1 | 6/2019 | |
| EP | 3000302 | B1 | 8/2019 | |
| EP | 3533314 | A1 | 9/2019 | |
| EP | 3569049 | A1 | 11/2019 | |
| EP | 3000307 | B1 | 12/2019 | |
| EP | 3586592 | A2 | 1/2020 | |
| EP | 3593613 | A1 | 1/2020 | |
| EP | 3593620 | A1 | 1/2020 | |
| EP | 3613272 | A1 | 2/2020 | |
| EP | 3243374 | B1 | 3/2020 | |
| EP | 3626038 | A1 | 3/2020 | |
| EP | 3259976 | B1 | 4/2020 | |
| EP | 3635647 | A1 | 4/2020 | |
| EP | 3378298 | B1 | 5/2020 | |
| EP | 3646699 | A1 | 5/2020 | |
| EP | 3662741 | A1 | 6/2020 | |
| EP | 3685648 | A1 | 7/2020 | |
| EP | 2995191 | B2 | 10/2020 | |
| ES | 2116215 | A1 | 7/1998 | |
| ES | 2311322 | A1 | 2/2009 | |
| FI | 5533 | A | 11/1913 | |
| FR | 1451480 | A | 1/1966 | |
| FR | 2817344 | A1 | 5/2002 | |
| FR | 2901291 | | 11/2007 | |
| FR | 2901291 | A1 | 11/2007 | |
| GB | 901081 | A | 7/1962 | |
| GB | 201519517 | A1 | 5/2017 | |
| IN | 01632DE2014 | A | 8/2016 | |
| IN | 1632DE2014 | A | 8/2016 | |
| IN | 201641027017 | A | 10/2016 | |
| IN | 202041039250 | A | 9/2020 | |
| JP | 7079681 | A | 11/1982 | |
| JP | S60253617 | A | 12/1985 | |
| JP | S63308110 | A | 12/1988 | |
| JP | H02196960 | A | 8/1990 | |
| JP | H02215311 | A | 8/1990 | |
| JP | H0779681 | A | 3/1995 | |
| JP | H1066436 | A | 3/1998 | |
| JP | H10191762 | A | 7/1998 | |
| JP | 2000352044 | A | 12/2000 | |
| JP | 2001057809 | A | 3/2001 | |
| JP | 2002186348 | A | 7/2002 | |
| JP | 2005227233 | A | 8/2005 | |
| JP | 2006166871 | A | 6/2006 | |
| JP | 2011205967 | A | 10/2011 | |
| JP | 2015070812 | A | 4/2015 | |
| JP | 2015151826 | A | 8/2015 | |
| JP | 2015219651 | A | 12/2015 | |
| JP | 2016071726 | A | 5/2016 | |
| JP | 2016160808 | A | 9/2016 | |
| JP | 6087258 | B2 | 3/2017 | |
| JP | 2017136035 | A | 8/2017 | |
| JP | 2017137729 | A | 8/2017 | |
| JP | 2017195804 | A | 11/2017 | |
| JP | 2018068284 | A | 5/2018 | |
| JP | 2018102154 | A | 7/2018 | |
| JP | 2018151388 | A | 9/2018 | |
| JP | 2019004796 | A | 1/2019 | |
| JP | 2019129744 | A | 8/2019 | |
| JP | 2019146506 | A | 9/2019 | |
| JP | 2019216744 | A | 12/2019 | |
| JP | 2020018255 | A | 2/2020 | |
| JP | 2020031607 | A | 3/2020 | |
| JP | 2020113062 | A | 7/2020 | |
| JP | 2020127405 | A | 8/2020 | |
| KR | 100974892 | | 8/2010 | |
| KR | 100974892 | B1 | 8/2010 | |
| KR | 20110018582 | A | 2/2011 | |
| KR | 101067576 | B | 9/2011 | |
| KR | 101067576 | B1 | 9/2011 | |
| KR | 101134075 | B1 | 4/2012 | |
| KR | 101447197 | B1 | 10/2014 | |
| KR | 101653750 | | 9/2016 | |
| KR | 20170041377 | A | 4/2017 | |
| KR | 200485051 | Y | 11/2017 | |
| KR | 200485051 | Y1 | 11/2017 | |
| KR | 101873657 | B | 8/2018 | |
| MX | GT06000012 | A | 1/2008 | |
| PL | 178299 | B1 | 4/2000 | |
| RO | 130713 | | 11/2015 | |
| RU | 1791767 | C | 1/1993 | |
| RU | 2005102554 | A | 7/2006 | |
| RU | 2421744 | C | 6/2011 | |
| RU | 2421744 | C1 | 6/2011 | |
| RU | 2447640 | C1 | 4/2012 | |
| RU | 2502047 | C | 12/2013 | |
| RU | 2502047 | C1 | 12/2013 | |
| RU | 164128 | | 8/2016 | |
| RU | 2017114139 | A | 4/2017 | |
| RU | 2017114139 | A | 10/2018 | |
| RU | 2017114139 | A3 | 5/2019 | |
| SU | 834514 | A1 | 5/1981 | |

(56) References Cited

FOREIGN PATENT DOCUMENTS

| | | | |
|---|---|---|---|
| SU | 887717 A1 | 12/1981 | |
| SU | 1052940 A1 | 11/1983 | |
| SU | 1134669 A1 | 1/1985 | |
| SU | 1526588 A1 | 12/1989 | |
| SU | 1540053 A1 | 1/1991 | |
| SU | 1761864 A1 | 9/1992 | |
| WO | 1986005353 A1 | 9/1986 | |
| WO | 2001052160 A1 | 7/2001 | |
| WO | 2002015673 A1 | 2/2002 | |
| WO | 2003005803 A1 | 1/2003 | |
| WO | 2007050192 A2 | 5/2007 | |
| WO | WO-2009042238 A1 * | 4/2009 | ........... A01B 63/002 |
| WO | 2009156542 A1 | 12/2009 | |
| WO | 2010003421 A1 | 1/2010 | |
| WO | 2011104085 A1 | 9/2011 | |
| WO | 2012041621 A1 | 4/2012 | |
| WO | 2012110508 A1 | 8/2012 | |
| WO | 2012110544 A1 | 8/2012 | |
| WO | 2013063106 A2 | 5/2013 | |
| WO | 2013079247 A1 | 6/2013 | |
| WO | 2013086351 A1 | 6/2013 | |
| WO | 2013087275 A1 | 6/2013 | |
| WO | 2014046685 A1 | 3/2014 | |
| WO | 2014093814 A1 | 6/2014 | |
| WO | 2014195302 A1 | 12/2014 | |
| WO | 2015038751 A1 | 3/2015 | |
| WO | 2015153809 A1 | 10/2015 | |
| WO | 16020595 A1 | 2/2016 | |
| WO | 2016020595 A1 | 2/2016 | |
| WO | 2016118686 A1 | 7/2016 | |
| WO | 2017008161 A1 | 1/2017 | |
| WO | 2017060168 A1 | 4/2017 | |
| WO | 2017077113 A1 | 5/2017 | |
| WO | 2017092905 A1 | 6/2017 | |
| WO | 2017096489 A1 | 6/2017 | |
| WO | 2017099570 A1 | 6/2017 | |
| WO | 2017116913 A1 | 7/2017 | |
| WO | 2017170507 A1 | 10/2017 | |
| WO | 2017205406 A1 | 11/2017 | |
| WO | 2017205410 A1 | 11/2017 | |
| WO | 2018043336 A1 | 3/2018 | |
| WO | 2018073060 A1 | 4/2018 | |
| WO | 2018081043 A1 | 5/2018 | |
| WO | 2018081759 A1 | 5/2018 | |
| WO | 2018086764 A1 | 5/2018 | |
| WO | 2018112615 | 6/2018 | |
| WO | 2018116772 A1 | 6/2018 | |
| WO | 2018142768 A1 | 8/2018 | |
| WO | 2018200870 A1 | 11/2018 | |
| WO | 2018206587 A1 | 11/2018 | |
| WO | 2018220159 A1 | 12/2018 | |
| WO | 2018226139 A1 | 12/2018 | |
| WO | 2018235486 A1 | 12/2018 | |
| WO | 2018235942 A1 | 12/2018 | |
| WO | WO18235486 A1 | 12/2018 | |
| WO | 2019034213 A1 | 2/2019 | |
| WO | 2019079205 A1 | 4/2019 | |
| WO | 2019081349 A1 | 5/2019 | |
| WO | 2019091535 A1 | 5/2019 | |
| WO | 2019109191 A1 | 6/2019 | |
| WO | 2019124174 A1 | 6/2019 | |
| WO | 2019124217 A1 | 6/2019 | |
| WO | 2019124225 A1 | 6/2019 | |
| WO | 2019124273 A1 | 6/2019 | |
| WO | 2019129333 A1 | 7/2019 | |
| WO | 2019129334 A1 | 7/2019 | |
| WO | 2019129335 A1 | 7/2019 | |
| WO | 2019215185 A1 | 11/2019 | |
| WO | 2019230358 A1 | 12/2019 | |
| WO | 2020026578 A1 | 2/2020 | |
| WO | 2020026650 A1 | 2/2020 | |
| WO | 2020026651 A1 | 2/2020 | |
| WO | 2020031473 A1 | 2/2020 | |
| WO | 2020038810 A1 | 2/2020 | |
| WO | 2020039312 A1 | 2/2020 | |
| WO | 2020039671 A1 | 2/2020 | |
| WO | 2020044726 A1 | 3/2020 | |
| WO | 2020082182 A1 | 4/2020 | |
| WO | 2020100810 A1 | 5/2020 | |
| WO | 2020110920 A1 | 6/2020 | |
| WO | 2020195007 A1 | 10/2020 | |
| WO | 2020206941 A1 | 10/2020 | |
| WO | 2020206942 A1 | 10/2020 | |
| WO | 2020210607 A1 | 10/2020 | |
| WO | 2020221981 A1 | 11/2020 | |
| WO | 2021262500 A1 | 12/2021 | |

OTHER PUBLICATIONS

Jones et al., "Brief history of agricultural systems modeling" Jun. 21, 2016, 15 pages.
Dan Anderson, "Brief history of agricultural systems modeling" 1 pages. Aug. 13, 2019.
A.Y. Şeflek, "Determining the Physico-Mechanical Characteristics of Maize Stalks Fordesigning Harvester", The Journal of Animal & Plant Sciences, 27(3): 2017, p. 855-860 ISSN: 1018-7081, Jun. 1, 2017.
Carmody, Paul, "Windrowing and harvesting", 8 pages Date: Feb. 3, 2010.
Dabney, et al., "Forage Harvest Representation in RUSLE2", Published Nov. 15, 2013, 17 pages.
John Deere S-Series Combines S760, S770, S780, S790 Brochure, 44 pages, Nov. 15, 2017.
Sekhon et al., "Stalk Bending Strength is Strongly Assoicated with Maize Stalk Lodging Incidence Across Multiple Environments", Jun. 20, 2019, 23 pages.
Thomison et al. "Abnormal Corn Ears", Apr. 28, 2015, 1 page.
Anderson, "Adjust your Combine to Reduce Damage to High Moisture Corn", Aug. 13, 2019, 11 pages.
Sumner et al., "Reducing Aflatoxin in Corn During Harvest and Storage", Reviewed by John Worley, Apr. 2017, 6 pages.
Sick, "Better understanding corn hybrid characteristics and properties can impact your seed decisions", 8 pages, Sep. 21, 2018.
TraCI/Change Vehicle State—SUMO Documentation, 10 pages, Retrieved Dec. 11, 2020.
Arnold, et al., Chapter 8. "Plant Growth Component", Jul. 1995, 41 pages.
Humburg, Chapter: 37 "Combine Adjustments to Reduce Harvest Losses", 2019, South Dakota Board of Regents, 8 pages.
Hoff, "Combine Adjustments", Cornell Extension Bulletin 591, Mar. 1943, 10 pages.
University of Wisconsin, Corn Agronomy, Originally written Feb. 1, 2006 | Last updated Oct. 18, 2018, 2 pages.
University of Nebraska-Lincoln, "Combine Adjustments for Downed Corn—Crop Watch", Oct. 27, 2017, 5 pages.
"Combine Cleaning: Quick Guide To Removing Resistant Weed Seeds (Among Other Things)", Nov. 2006, 5 pages.
Dekalb, "Corn Drydown Rates", 7 pages, Aug. 4, 2020.
Mahmoud et al. Iowa State University, "Corn Ear Orientation Effects on Mechanical Damage and Forces on Concave", 1975, 6 pages.
Sindelar et al., Kansas State University, "Corn Growth & Development" Jul. 17, 2017, 9 pages.
Pannar, "Manage the Growth Stages of the Maize Plant With Pannar", Nov. 14, 2016, 7 pages.
He et al., "Crop residue harvest impacts wind erodibility and simulated soil loss in the Central Great Plains", Sep. 27, 2017, 14 pages.
Blanken, "Designing a Living Snow Fence for Snow Drift Control", Jan. 17, 2018, 9 pages.
Jean, "Drones give aerial boost to ag producers", Mar. 21, 2019, 4 pages.
Zhao et al., "Dynamics modeling for sugarcane sucrose estimation using time series satellite imagery", Jul. 27, 2017, 11 pages.
Brady, "Effects of Cropland Conservation Practices on Fish and Wildlife Habitat", Sep. 1, 2007, 15 pages.
Jasa, et al., "Equipment Adjustments for Harvesting Soybeans at 13%-15% Moisture", Sep. 15, 2017, 2 pages.

(56) References Cited

OTHER PUBLICATIONS

Bendig et al., "Estimating Biomass of Barley Using Crop Surface Models (CSMs) Derived from UAV-Based RGB Imaging", Oct. 21, 2014, 18 pages.
Robertson, et al., "Maize Stalk Lodging: Morphological Determinants of Stalk Strength", Mar. 3, 2017, 10 pages.
MacGowan et al. Purdue University, Corn and Soybean Crop Deprediation by Wildlife, Jun. 2006, 14 pages.
Martinez-Feria et al., Iowa State University, "Corn Grain Dry Down in Field From Maturity to Harvest", Sep. 20, 2017, 3 pages.
Wrona, "Precision Agriculture's Value" Cotton Physiology Today, vol. 9, No. 2, 1998, 8 pages.
Zhang et al., "Design of an Optical Weed Sensor Using Plant Spectral Characteristics" Sep. 2000, 12 pages.
Hunt, et al., "What Weeds Can Be Remotely Sensed?", 5 pages, May 2016.
Pepper, "Does An Adaptive Gearbox Really Learn How You Drive?", Oct. 30, 2019, 8 pages.
Eggerl, "Optimization of Combine Processes Using Expert Knowledge and Methods of Artificial Intelligence", Oct. 7, 1982, 143 pages.
Sheely et al., "Image-Based, Variable Rate Plant Growth Regulator Application in Cotton at Sheely Farms in California", Jan. 6-10, 2003 Beltwide Cotton Conferences, Nashville, TN, 17 pages.
Kovacs et al., "Physical characteristics and mechanical behaviour of maize stalks for machine development", Apr. 23, 2019, 1-pages.
Anonymously, "Optimizing Crop Profit Across Multiple Grain Attributes and Stover", ip.com, May 26, 2009, 17 pages.
Breen, "Plant Identification: Examining Leaves", Oregon State University, 2020, 8 pages.
Caglayan et al., A Plant Recognition Approach Using Shape and Color Features in Leaf Images, Sep. 2013, 11 pages.
Casady et al., "Precision Agriculture" Yield Monitors University of Missouri—System, 4 pages, 1998.
Apan et al., "Predicting Grain Protein Content in Wheat Using Hyperspectral Sensing of In-season Crop Canopies and Partial Least Squares Regression" 18 pages, 2006.
Xu et al., "Prediction of Wheat Grain Protein by Coupling Multisource Remote Sensing Imagery and ECMWF Data", Apr. 24, 2020, 21 pages.
Day, "Probability Distributions of Field Crop Yields," American Journal of Agricultural Economics, vol. 47, Issue 3, Aug. 1965, Abstract Only, 1 page.
Butzen, "Reducing Harvest Losses in Soybeans", Pioneer, Jul. 23, 2020, 3 pages.
Martin et al., "Relationship between secondary variables and soybean oil and protein concentration", Abstract Only, 1 page., 2007.
Torres, "Precision Planting of Maize" Dec. 2012, 123 pages.
Extended European Search Report and Written Opinion issued in European Patent Application No. 22161407.6, dated Sep. 16, 2022, in 12 pages.
U.S. Appl. No. 17/067,383 Final Office Action dated Feb. 21, 2023, 40 pages.
Application and Drawings for U.S. Appl. No. 16/175,993, filed Oct. 31, 2018, 28 pages.
Application and Drawings for U.S. Appl. No. 16/380,623, filed Apr. 10, 2019, 36 pages.
Application and Drawings for U.S. Appl. No. 16/783,511, filed Feb. 6, 2020, 55 pages.
"Automated Weed Detection With Drones" dated May 25, 2017, retrieved at: <<https://www.precisionhawk.com/blog/media/topic/automated-weed-identification-with-drones>>, retrieved on Jan. 21, 2020, 4 pages.
F. Forcella, "Estimating the Timing of Weed Emergence", Site-Specific Management Guidelines, retrieved at: <<http://www.ipni.net/publication/ssmg.nsf/0/D26EC9A906F9B8C9852579E500773936/$FILE/SSMG-20.pdf>>, retrieved on Jan. 21, 2020, 4 pages.
Chauhan et al., "Emerging Challenges and Opportunities for Education and Research in Weed Science", frontiers in Plant Science. Published online Sep. 5, 2017, 22 pages.
Apan, A., Wells , N., Reardon-Smith, K, Richardson, L, McDougall, K, and Basnet, B.B., 2008. Predictive mapping of blackberry in the Condamine Catchment using logistic regression and spatial analysis. In Proceedings of the 2008 Queensland Spatial Conference: Global Warning: What's Happening in Paradise. Spatial Sciences Institute, 11 pages.
Jarnevich, C.S., Holcombe, T.R., Barnett, D.T., Stohlgren, T.J. and Kartesz, J.T., 2010. Forecasting weed distributions using climate data: a GIS early warning tool. Invasive Plant Science and Management. 3(4), pp. 365-375.
Sa et al., "WeedMap: A Large-Scale Semantic Weed Mapping Framework Using Aerial Multispectral Imaging and Deep Neural Network for Precision Farming", Sep. 6, 2018, 25 pages.
Pflanz et al., "Weed Mapping with UAS Imagery and a Bag of Visual Words Based Image Classifier", Published Sep. 24, 2018, 28 pages.
Provisional Application and Drawings for U.S. Appl. No. 62/928,964, filed Oct. 31, 2019, 14 pages.
Application and Drawings for U.S. Appl. No. 16/783,475, filed Feb. 6, 2020, 55 pages.
U.S. Appl. No. 17/067,483 Application and Drawings filed Oct. 9, 2020, 63 pages.
U.S. Appl. No. 17/066,442 Application and Drawings filed Oct. 8, 2020, 65 pages.
U.S. Appl. No. 16/380,550, filed Apr. 10, 2019, Application and Drawings, 47 pages.
U.S. Appl. No. 17/066,999 Application and Drawings filed Oct. 9, 2020, 67 pages.
U.S. Appl. No. 17/066,444 Application and Drawings filed Oct. 8, 2020, 102 pages.
Extended Search Report for European Patent Application No. 20167930.5 dated Sep. 15, 2020, 8 pages.
Extended Search Report for European Patent Application No. 19205901.2 dated Mar. 17, 2020, 6 pages.
Notice of Allowance for U.S. Appl. No. 16/171,978, dated Dec. 15, 2020, 21 pages.
Zhigen et al., "Research of the Combine Harvester Load Feedback Control System Using Multi-Signal Fusion Method and Fuzzy Algorithm," 2010, Publisher: IEEE, 5 pages.
Dan et al., "On-the-go Throughput Prediction in a Combine Harvester Using Sensor Fusion," 2017, Publisher: IEEE, 6 pages.
Fernandez-Quintanilla et al., "Is the current state of the art of weed monitoring sutible for site-specific weed management in arable crops?", First Published May 1, 2018, 4 pages.
Dionysis Bochtis et al. "Field Operations Planning for Agricultural Vehicles: A Hierarchical Modeling Framework." Agricultural Engineering International: the CIGR Ejournal. Manuscript PM 06 021. vol. IX. Feb. 2007, pp. 1-11.
U.S. Appl. No. 16/432,557, filed Jun. 5, 2019, 61 pages.
European Search Report issued in counterpart European Patent Application No. 19205142.3 dated Feb. 28, 2020 (6 pages).
Mei-Ju et al., "Two paradigms in cellular Internet-of-Things access for energy-harvesting machine-to-machine devices: push-based versus pull-based," 2016, vol. 6, 9 pages.
Yi et al., "An Efficient MAC Protocol With Adaptive Energy Harvesting for Machine-to-Machine Networks," 2015, vol. 3, Publisher: IEEE, 10 pages.
Application and Drawings for U.S. Appl. No. 16/171,978, filed Oct. 26, 2018, 53 pages.
European Search Report issued in European Patent Application No. 19203883.4 dated Mar. 23, 2020 (10 pages).
Notice of Allowance for U.S. Appl. No. 16/171,978 dated Oct. 28, 2020, 5 pages.
Notice of Allowance for U.S. Appl. No. 16/171,978, dated Aug. 7, 2020, 9 pages.
K.R. Manjunath et al., "Developing Spectral Library of Major Plant Species of Western Himalayas Using Ground Observations", J. Indian Soc Remote Sen (Mar. 2014) 42(a):201-216, 17 pages.
U.S. Appl. No. 16/380,564 Application and Drawings filed Apr. 10, 2019, 55 pages.
S. Veenadhari et al., "Machine Learning Approach For Forecasting Crop Yield Based on Climatic Parameters", 2014 International

(56) References Cited

OTHER PUBLICATIONS

Conference on Computer Communication and Informatics (ICCCI-2014) Jan. 3-6, 2014, Coimbatore, India, 5 pages.
Non-Final Office Action for U.S. Appl. No. 16/380,531 dated Oct. 21, 2020, 10 pages.
U.S. Appl. No. 16/380,531 Application and Drawings filed Apr. 10, 2019, 46 pages.
Notice of Allowance for U.S. Appl. No. 16/783,511 dated Jan. 19, 2023, 7 pages.
Application and Drawings for U.S. Appl. No. 18/158,005, filed Jan. 23, 2023, 62 pages.
Notice of Allowance for U.S. Appl. No. 17/066,999 dated Jan. 26, 2023, 6 pages.
U.S. Appl. No. 16/783,475 Final Office Action dated Nov. 16, 2023, 20 pages.
Gayle, J. Somerville,et al. "Modelling Annual Grass Weed Seed Dispersal in Winter Wheat, When Influenced by Hedges and Directional Wind, Ecological Modeling", vol. 410, Aug. 7, 2019, pp. 1-12.
Thompson SE, et al. Seconary Dispersal Driven by Overland Flow in Drylands: Review and Mechanistic Model Development. Mov Ecol. Apr. 17, 2014, pp. 1-13.
Gayle J. Somerville, et al. How Do Spatial Heterogeneity and Dispersal in Weed Population Models Affect Predictions of Herbicide Resistance Eveolution?, Ecological Modelling, 2017, pp. 37-53.
U.S. Appl. No. 17/344,517 Office Action dated May 25, 2022, 8 pages.
Notice of Allowance for U.S. Appl. No. 16/432,557 dated Mar. 22, 2021, 9 pages.
Zhao, L., Yang, J., Li, P. and Zhang, L., 2014. Characteristics analysis and classification of crop harvest patterns by exploiting high-frequency multipolarization SAR data. IEEE Journal of Selected Topics in Applied Earth Observations and Remote Sensing, 7(9), pp. 3773-3783.
Feng-Jie, X., Er-da, W. and Feng-yuan, X., Crop area yield risk evaluation and premium rates calculation—Based on nonparametric kernel density estimation. In 2009 International Conference on Management Science and Engineering, 7 pages.
Liu, R. and Bai, X., 2014, May. Random fuzzy production and distribution plan of agricultural products and its PSO algorithm. In 2014 IEEE International Conference on Progress in Informatics and Computing (pp. 32-36). IEEE.
Notice of Allowance for U.S. Appl. No. 16/171,978 dated Mar. 31, 2021, 6 pages.
Application and Drawings for U.S. Appl. No. 17/067,383, filed Oct. 9, 2020, 61 pages.
Extended European Search Report and Written Opinion issued in European Patent Application No. 20208171.7, dated May 11, 2021, in 05 pages.
Cordoba, M.A., Bruno, C.I. Costa, J.L. Peralta, N.R. and Balzarini, M.G., 2016, Protocol for multivariate homegeneous zone delineation in precision agriculture, biosystems engineering, 143, pp. 95-107.
Pioneer Estimator, "Corn Yield Estimator" accessed on Feb. 13, 2018, 1 page. retrieved from: https://www.pioneer.com/home/site/us/tools-apps/growing-tools/corn-yield-estimator/.
Guindin, N. "Estimating Maize Grain Yield From Crop Biophysical Parameters Using Remote Sensing", Nov. 4, 2013, 19 pages.
EP Application No. 19203883.4-1004 Office Action dated May 3, 2021, 4 pages.
Iowa State University Extension and Outreach, "Harvest Weed Seed Control", Dec. 13, 2018, 6 pages. https://crops.extension.iastate.edu/blog/bob-hartzler/harvest-weed-seed-control.
Getting Rid Of Weeds Through Integrated Weed Management, accessed on Jun. 25, 2021, 10 pages. https://integratedweedmanagement.org/index.php/iwm-toolbox/the-harrington-seed-destructor.
The Importance of Reducing Weed Seeds, Jul. 2018, 2 pages. https://www.aphis.usda.gov/plant_health/soybeans/soybean-handouts.pdf.
Alternative Crop Guide, Published by the Jefferson Institute, "Buckwheat", Revised Jul. 2002. 4 pages.
U.S. Appl. No. 17/066,444 Office Action dated Nov. 27, 2023, 34 pages.
U.S. Appl. No. 17/067,383 Office Action dated Nov. 27, 2023, 36 pages.
Leu et al., Grazing Corn Residue Using Resources and Reducing Costs, Aug. 2009, 4 pages.
"No-Till Soils", Soil Heath Brochure, 2 pages, last accessed Jul. 14, 2020.
Strickland et al., "Nitrate Toxicity in Livestock" Oklahoma State University, Feb. 2017, 2 pages.
Strickland et al., "Nitrate Toxicity in Livestock" Oklahoma State University, 8 pages, Feb. 2017.
Brownlee, "Neural Networks are Function Approximation Algorithms", Mar. 18, 2020, 13 pages.
Thompson, "Morning glory can make it impossible to harvest corn", Feb. 19, 2015, 3 pages.
Tumlison, "Monitoring Growth Development and Yield Estimation of Maize Using Very High-Resolution UAVImages in Gronau, Germany", Feb. 2017, 63 pages.
Hunt, "Mapping Weed Infestations Using Remote Sensing", 8 pages, Jul. 19, 2005.
Wright, et al., "Managing Grain Protein in Wheat Using Remote Sensing", 12 pages, 2003.
"Malting Barley in Pennsylvania", Agronomy Facts 77, 6 pages, Code EE0179 Jun. 2016.
"Green stem syndrome in soybeans", Agronomy eUpdate Issue 478 Oct. 10, 2014, 3 pages.
"Keep Weed Seed Out of Your Harvest", Aug. 8, 2019, 1 pages.
Hodrius et al., "The Impact of Multi-Sensor Data Assimilation on Plant Parameter Retrieval and Yield Estimation for Sugar Beet", The International Archives of the Photogrammetry, Remote Sensing and Spatial Information Sciences, vol. XL-7/W3, 2015, 36th International Symposium on Remote Sensing of Environment, May 11-15, 2015, Berlin, Germany, 7 pages.
Fernandez-Quintanilla et al., "Is the current state of the art of weed monitoring suitable for site-specific weed management in arable crops?", Feb. 2018, 35 pages.
Anonymously, "Improved System and Method for Controlling Agricultural Vehicle Operation Using Historical Data", Dec. 16, 2009, 8 pages.
Anonymously, "System and Method for Controlling Agricultural Vehicle Operation Using Historical Data", Jun. 30, 2009, 8 pages.
"Leafsnap, a new mobile app that identifies plants by leaf shape, is launched by Smithsonian and collaborators", May 2, 2011, 5 pages.
Insect Gallery, Department of Entomology, Kansas State University, Oct. 19, 2020, 8 pages.
Licht, "Influence of Corn Seeding Rate, Soil Attributes, and Topographic Characteristics on Grain Yield, Yield Components, and Grain Composition", 2015, 107 pages,.
"Notice of Retraction Virtual simulation of plant with individual stem based on crop growth model", Mar. 5, 2017, 7 pages.
Ma et al., "Identification of Fusarium Head Blight in Winter Wheat Ears Using Continuous Wavelet Analysis", Dec. 19, 2019, 15 pages.
Leland, "Who Did that? Identifying Insect Damage", Apr. 1, 2015, 4 pages.
"How to improve maize protein content" https://www.yara.co.uk/crop-nutrition/forage-maize/improving-maize-protein-content, Sep. 30, 2020, 10 pages.
Hafemeister, "Weed control at harvest, combines are ideal vehicles for spreading weed seeds", Sep. 25, 2019, 3 pages.
"Harvesting Tips", Northern Pulse Growers Association, 9 pages, Jan. 31, 2001.
Wortmann et al., "Harvesting Crop Residues", Aug. 10, 2020, 8 pages.
"Harvesting", Oklahoma State University, Canola Swathing Guide, 2010, 9 pages, last accessed Jul. 14, 2020.
Hanna, "Harvest Tips for Lodged Corn", Sep. 6, 2011, 3 pages.
"Green Weeds Complicate Harvest", Crops, Slider, Sep. 26, 2012, 2 pages.
"Agrowatch Green Vegetation Index", Retrieved Dec. 11, 2020, 4 pages.

(56) References Cited

OTHER PUBLICATIONS

"Grazing Corn Residues" (http://www.ca.uky.edu), 3 pages, Aug. 24, 2009.
Jarnevich et al., Forecasting Weed Distributions Using Climate Data: A GIS Early Warning Tool, Downloaded on Jul. 13, 2020, 12 pages.
Combine Cutting and Feeding Mechanisms in the Southeast, By J-K Park, Agricultural Research Service, U.S. Dept. of Agriculture, 1963, 1 page.
Hartzler, "Fate of weed seeds in the soil", 4 pages, Jan. 31, 2001.
Digman, "Combine Considerations for a Wet Corn Harvest", Extension SpecialistUW—Madison, 3 pages, Oct. 29, 2009.
S-Series Combine and Front End Equipment Optimization, John Deere Harvester Works, 20 pages Date: Oct. 9, 2017.
Determining yield monitoring system delay time with geostatistical and data segmentation approaches (https://www.ars.usda.gov/ARSUserFiles/50701000/cswq-0036-128359.pdf) Jul. 2002, 13 pages.
Precision Agriculture: Yield Monitors (dated Nov. 1998—metadata; last accessed Jul. 16, 2020) (https://extensiondata.missouri.edu/pub/pdf/envqual/wq0451.pdf) 4 pages.
Paul et al., "Effect of soil water status and strength on trafficability" (1979) (https://www.nrcresearchpress.com/doi/pdfplus/10.4141/cjss79-035), 12 pages, Apr. 23, 1979.
Sick, "Better understanding corn hybrid characteristics and properties can impact your seed decisions" (https://emergence.fbn.com/agronomy/corn-hybrid-characteristics-and-properties-impact-seed-decisions) By Steve Sick, FBN Breeding Project Lead | Sep. 21, 2018, 8 pages.
Robertson et al., "Maize Stalk Lodging: Morphological Determinants of Stalk Strength" Mar. 2017, 10 pages.
Martin, et al., "Breakage Susceptibility and Hardness of Corn Kernels of Various Sizes and Shapes", May 1987, 10 Pages.
U.S. Appl. No. 18/158,005 Notice of Allowance dated Feb. 7, 2024, 8 pages.
Apan et al., "Predictive Mapping of Blackberry in the Condamine Catchment Using Logistic Regressiona dn Spatial Analysis", Jan. 2008, 12 pages.
Robson, "Remote Sensing Applications for the Determination of Yield, Maturity and Aflatoxin Contamination in Peanut", Oct. 2007, 275 pages.
Bhattarai et al., "Remote Sensing Data to Detect Hessian Fly Infestation in Commercial Wheat Fields", Apr. 16, 2019, 8 pages.
Towery, et al., "Remote Sensing of Crop Hail Damage", Jul. 21, 1975, 31 pages.
Sa et al., "WeedMap: A Large-Scale Semantic Weed Mapping Framework Using Aerial Multispectral Imaging and Deep Neural Network for Precision Farming", Sep. 7, 2018, 25 pages.
Mathyam et al., "Remote Sensing of Biotic Stress in Crop Plants and Its Applications for Pest Management", Dec. 2011, 30 pages.
Martinez-Feria et al., "Evaluating Maize and Soybean Grain Dry-Down In The Field With Predictive Algorithms and Genotype-by-Environmental Analysis", May 9, 2019, 13 pages.
"GIS Maps for Agriculture", Precision Agricultural Mapping, Retrieved Dec. 11, 2020, 6 pages.
Paul, "Scabby Wheat Grain? Increasing Your Fan Speed May Help", https://agcrops.osu.edu/newsletter/corn-newsletter/2015-20/scabby-wheat-grain-increasing-yourfan-speed-may-help, C.O.R.N Newsletter//2015-20, 3 pages.
Clay et al., "Scouting for Weeds", SSMG-15, 4 pages, 2002.
Taylor et al., "Sensor-Based Variable Rate Application for Cotton", 8 pages, 2010.
Christiansen et al., "Designing and Testing a UAV Mapping System for Agricultural Field Surveying", Nov. 23, 2017, 19 pages.
Haung et al., "AccurateWeed Mapping and Prescription Map Generation Based on Fully Convolutional Networks Using UAV Imagery", Oct. 1, 2018, 12 pages.
Morrison, "Should You Use Tillage to Control Resistant Weeds", Aug. 29, 2014, 9 pages.
Morrison, "Snow Trapping Snars Water", Oct. 13, 2005, 3 pages.

"Soil Zone Index", https://www.satimagingcorp.com/applications/natural-resources/agricultu . . . , Retrieved Dec. 11, 2020, 5 pages.
Malvic, "Soybean Cyst Nematode", University of Minnesota Extension, Oct. 19, 2020, 3 pages.
Unglesbee, "Soybean Pod Shatter—Bad Enough to Scout Before Harvest?—DTN", Oct. 17, 2018, 4 pages.
Tao, "Standing Crop Residue Can Reduce Snow Drifting and Increase Soil Moisture", 2 pages, last accessed Jul. 14, 2020.
Berglund, et al., "Swathing and Harvesting Canola", Jul. 2019, 8 pages.
Bell et al., "Synthetic Aperture Radar and Optical Remote Sensing of Crop Damage Attributed To Severe Weather in the Central United States", Jul. 25, 2018, 1 page.
Rosencrance, "Tabletop Grapes in India to Be Picked by Virginia Tech Robots", Jul. 23, 2020, 8 pages.
Lofton, et al., The Potential of Grazing Grain Sorghum Residue Following Harvest, May 13, 2020, 11 pages.
Beal et al., "Time Shift Evaluation to Improve Yield Map Quality", Published in Applied Engineering in Agriculture Volume 17(3): 385-390 (© 2001 American Society of Agricultural Engineers ), 9 pages.
"Tips and Tricks of Harvesting High Moisture Grain", https://www.koenigequipment.com/blog/tips-and-tricks-of-harvesting-highmoisture-grain, 7 pages, last accessed Jul. 14, 2020.
Ransom, "Tips for Planting Winter Wheat and Winter Rye (for Grain) (Aug. 15, 2019)", 2017, 3 pages.
AgroWatch Tree Grading Maps, "The Grading Maps and Plant Count Reports", https://www.satimagingcorp.com/applications/natural-resources/agricultu . . . , Retrieved Dec. 11, 2020, 4 pages.
Ackley, "Troubleshooting Abnormal Corn Ears", Jul. 23, 2020, 25 pages.
Smith, "Understanding Ear Flex", Feb. 25, 2019, 17 pages.
Carroll et al., "Use of Spectral Vegetation Indicies Derived from Airborne Hyperspectral Imagery For Detection of European Corn Borer Infestation in Iowa Corn Plots", Nov. 2008, 11 pages.
Agriculture, "Using drones in agriculture and capturing actionable data", Retrieved Dec. 11, 2020, 18 pages.
Bentley et al., "Using Landsat to Identify Thunderstorm Damage in Agricultural Regions", Aug. 28, 2001, 14 pages.
Duane Grant and the Idaho Wheat Commission, "Using Remote Sensing to Manage Wheat Grain Protein", Jan. 2, 2003, 13 pages.
Zhang et al., "Using satellite multispectral imagery for damage mapping of armyworm (*Spodoptera frugiperda*) in maize at a regional scale", Apr. 10, 2015, 14 pages.
Booker, "Video: Canadian cage mill teams up with JD", Dec. 19, 2019, 6 pages.
AgTalk Home, "Best Combine to Handle Weeds", Posted Nov. 23, 2018, 9 pages.
"Volunteer corn can be costly for soybeans", Jun. 2, 2016, 1 page.
Pflanz, et al., "Weed Mapping with UAS Imagery and a Bag of Visual Words Based Image Classifier", Published Sep. 24, 2018, 17 pages.
Hartzler, "Weed seed predation in agricultural fields", 9 pages, 2009.
Sa et al., "Weedmap: A Large-Scale Sematnic Weed Mapping Framework Using Aerial Multispectral Imaging and Deep Neural Netowrk for Precision Farming", Sep. 6, 2018, 25 pages.
Nagelkirk, Michigan State University-Extension, "Wheat Harvest: Minimizing the Risk of Fusarium Head Scab Losses", Jul. 11, 2013, 4 pages.
Saskatchewan, "Wheat: Winter Wheat", (https://www.saskatchewan.ca/business/agriculture-natural-resources-and-industry/agribusiness-farmers-and-ranchers/crops-and-irrigation/field-crops/cereals-barley-wheat-oats-triticale/wheat-winter-wheat) 5 pages, last accessed Jul. 14, 2020.
Quora, "Why would I ever use sport mode in my automatic transmission car? Will this incrase fuel efficiency or isit simply a feature that makes form more fun when driving?", Aug. 10, 2020, 5 pages.
Wade, "Using a Drone's Surface Model to Estimate Crop Yields & Assess Plant Health", Oct. 19, 2015, 14 pages.
Mathyam et al., "Remote Sensing of Biotic Stress in Crop Plants and Its Applications for Pest Stress", Dec. 2011, 30 pages.

(56) References Cited

OTHER PUBLICATIONS

"Four Helpful Weed-Management Tips for Harvest Time", 2 pages, Sep. 4, 2019.
Franz et al., "The role of topography, soil, and remotely sensed vegetation condition towards predicting crop yield", University of Nebraska—Lincoln, Mar. 23, 2020, 44 pages.
Peiffer et al., The Genetic Architecture of Maize Stalk Strength:, Jun. 20, 2013, 14 pages.
7 Combine Tweaks to Boost Speed (https://www.agriculture.com/machinery/harvest-equipment/7-combine-tweaks-to-boost-speed_203-ar33059) 8 pages, Aug. 19, 2018.
Managing corn harvest this fall with variable corn conditions (https://www.ocj.com/2019/10/managing-corn-harvest-this-fall-with-variable-corn-conditions/), 4 pages, Oct. 10, 2019.
Reducing Aflatoxin in Corn During Harvest and Storage (https://extension.uga.edu/publications/detail.html?number=B1231&title=Reducing%20Aflatoxin%20in%20Corn%20During%20Harvest%20and%20Storage), 9 pages, Published with Full Review on Apr. 19, 2017.
Variable Rate Applications to Optimize Inputs (https://www.cotton.org/tech/physiology/cpt/miscpubs/upload/CPT-v9No2-98-REPOP.pdf), 8 pages, Nov. 2, 1998.
Robin Booker, Video: Canadian cage mill teams up with JD (https://www.producer.com/2019/12/video-canadian-cage-mill-teams-up-with-jd/) , 6 pages, Dec. 19, 2019.
Jarnevich, et al. "Forecasting Weed Distributions using Climate Data: A GIS Early Warning Tool", Invasive Plant Science and Management, 11 pages, Jan. 20, 2017.
Burks, "Classification of Weed Species Using Color Texture Features and Discriminant Analysis" (http://citeseerx.ist.psu.edu/viewdoc/download?doi=10.1.1.468.5833&rep=rep1&type=pdf), 8 pages, 2000.
John Deere, https://www.youtube.com/watch?v=1Gq77CfdGI4&list=PL1KGsSJ4CWk4rShNb3-sTMOliL8meHBL5 (last accessed Jul. 14, 2020), Jun. 15, 2020, 5 pages.
Combine Adjustments (http://corn.agronomy.wisc.edu/Management/L036.aspx), 2 pages, Originally written Feb. 1, 2006; last updated Oct. 18, 2018.
Ardekani, "Off- and on-ground GPR techniques for field-scale soil moisture mapping" Jun. 2013, 13 pages.
Does an Adaptive Gearbox Really Learn How You Drive? (https://practicalmotoring.com.au/voices/does-an-adaptive-gearbox-really-learn-how-you-drive/), Oct. 30, 2019, 8 pages.
https://www.researchgate.net/publication/222527694_Energy_Requirement_Model_for_a_Combine_Harvester_Part_I_Development_of_Component_Models, Abstract Only, Jan. 2005.
http://canola.okstate.edu/cropproduction/harvesting, 8 pages, Aug. 2011.
"Tips and Tricks of Harvesting High Moisture Grain", https://www.koenigequipment.com/blog/tips-and-tricks-of-harvesting-highmoisture-grain, 5 pages, last accessed Feb. 11, 2021.
Hoff, Combine Adjustements, Mar. 1943, 8 pages.
Haung et al., "Accurate Weed Mapping and Prescription Map Generation Based onFully Convolutional Networks Using UAV Imagery", 14 pages, Oct. 1, 2018.
Thompson, "Morning glory can make it impossible to harvest corn", Feb. 19, 2015, 4 pages.
U.S. Appl. No. 16/783,475 Non Final Office Action dated Jul. 7, 2023, 21 pages.
Benvenuti, Weed seed movement and dispersal strategies in the agricultural environment, 2007, Weed Biology and Management, 7, pp. 141-157 (Year:2007), 18 pages.
Chante et al., A flexible and practical approach for real-time weed emergence prediction based on Artificial Neural Networks, 2018, Biosystems Engineering, vol. 170, pp. 51-60 (Year:2018), 10 pages.
Xiujun et al., "Integrating Map Services and Location-based Services for Geo-Referenced Individual Data Collection," 2008, vol. 5, Publisher: IEEE, 4 pages.
U.S. Appl. No. 16/783,511 Final Office Action dated Nov. 4, 2022, 35 pages.

U.S. Appl. No. 17/067,383 Non Final Office Action dated Nov. 2, 2022, 256 pages.
U.S. Appl. No. 17/066,444 Non Final Office Action dated Oct. 25, 2022, 273 pages.
U.S. Appl. No. 17/066,999 Non Final Office Action dated Aug. 18, 2022, 225 pages.
U.S. Appl. No. 17/066,442 Non Final Office Action dated Aug. 4, 2022, 228 pages.
U.S. Appl. No. 17/066,442 Notice of Allowance dated Nov. 30, 2022, 11 pages.
U.S. Appl. No. 18/185,570 Non Final Office Action dated Jul. 18, 2023, 9 pages.
Prosecution History for U.S. Appl. No. 16/380,691 including: Notice of Allowance dated Mar. 10, 2021 and Application and Drawings filed Apr. 10, 2019, 46 pages.
U.S. Appl. No. 16/831,216 Application and Drawings filed Mar. 26, 2020, 56 pages.
Notice of Allowance for U.S. Appl. No. 16/380,531 dated Apr. 5, 2021, 5 pages.
Martin et al. Breakage Susceptibiltiy and Hardness of Corn Kernels of Various Sizes and Shapes, vol. 3( ) May 1087, 10 pages. https://pdfs.semanticscholar.org/e579/1b5363b6a78efd44adfb97755a0cdd14f?ca.pdf.
Hoff, "Combine Adjustments" (https://smallfarmersjournal.com/combine-adjustments/). Mar. 1943, 9 pages.
Optimizing Crop Profit Across Multiple Grain Attributes and Stover, Electronic Publication Date May 26, 2009, 17 pages.
Unglesbee, Soybean Pod Shatter—Bad Enough to Scout Before Harvest—DTN, Oct. 17, 2018, 11 pages. Susceptibility to shatter (https://agfax.com/2018/10/17/soybean-pod-shatler-bad-enough-to-scout-before-harvest-dtn/).
GIS Maps for Agricultural, accessed on May 10, 2022. 7 pages. https://www.satimagingcorp.com/services/geographic-information-systems/gis-maps-agriculture-mapping.
https://wingtra.com/drone-mapping-applications/use-of-drones-in-agriculture, accessed on May 10, 2022, 19 pages.
Energy Requirement Model for a Combine Harvester: Part 1: Development of Component Models, Published online Dec. 22, 2004, 17 pages.
Energy Requirement Model for a Combine Harvester, Part 2: Integration of Component Models, Published online Jan. 18, 2005, 11 pages.
Pioneer on reducing soybean harvest losses including combine adjustments (last accessed Jul. 23, 2020) (https://www.pioneer.com/us/agronomy/reducing_harvest_losses_in_soybeans.html), 5 pages.
Non-Final Office Action for U.S. Appl. No. 16/783,511, dated Jun. 8, 2022, 21 pages.
Colbach, N., Busset, H., Roger-Estrade, J. and Caneill, J., 2014. Predictive modelling of weed seed movement in response to superficial tillage tools, Soil and tillage research. 138, pp. 1-8.
Non-Final Office Action for U.S. Appl. No. 17/067,383 dated Nov. 2, 2022, 38 pages.
Benvenuti, S., 2007. Weed seed movement and dispersal strategies in the agricultural environment, Weed biology and management, 7, pp. 141-157.
Chantre, G.R., Vigna, M.R., Renzi, J.P. and Blanco, A.M., 2018. A flexible and practical approach for real-time weed emergence prediction based on Artificial Neural Networks. Biosystems engineering, 170, pp. 51-60.
Final Office Action for U.S. Appl. No. 16/783,511 dated Nov. 4, 2022, 19 pages.
Non Final Office Action from U.S. Appl. No. 18/158,005 dated Sep. 14, 2023, 11 pages.
Lamsal et al. "Sugarcane Harvest Logistics in Brazil" Iowa Research Online, Sep. 11, 2013, 27 pages.
Jensen, "Algorithms for Operational Planning of Agricultural Field Operations", Mechanical Engineering Technical Report ME-TR-3, Nov. 9, 2012, 23 pages.
Chauhan, "Remote Sensing of Crop Lodging", Nov. 16, 2020, 16 pages.

* cited by examiner

PREDICTIVE ENVIRONMENTAL CHARACTERISTIC MAP GENERATION AND CONTROL SYSTEM

CROSS-REFERENCE TO RELATED APPLICATION

The present application is a continuation-in-part of and claims priority of U.S. patent application Ser. No. 17/066,442, filed on Oct. 8, 2020, which is a continuation-in-part of and claims priority of U.S. patent application Ser. No. 16/783,475, filed Feb. 6, 2020, Ser. No. 16/783,511, filed Feb. 6, 2020, Ser. No. 16/380,531, filed Apr. 10, 2019, and Ser. No. 16/171,978, filed Oct. 26, 2018 the content of which is hereby incorporated by reference in their entirety.

FIELD OF THE DESCRIPTION

The present description relates to agricultural machines, forestry machines, construction machines and turf management machines.

BACKGROUND

There are a wide variety of different types of agricultural machines. Some agricultural machines include harvesters, such as combine harvesters, sugar cane harvesters, cotton harvesters, self-propelled forage harvesters, and windrowers. Some harvesters can also be fitted with different types of heads to harvest different types of crops.

The discussion above is merely provided for general background information and is not intended to be used as an aid in determining the scope of the claimed subject matter.

SUMMARY

An information map is obtained by an agricultural system. The information map maps values of a topographic characteristic to different geographic locations in a field. An in-situ sensor detects values of an environmental characteristic as an agricultural work machine moves through the field. A predictive map generator generates a predictive map that predicts the environmental characteristic at different locations in the field based on a relationship between the values of the topographic characteristic and the values of the environmental characteristic detected by the in-situ sensor. The predictive map can be output and used in automated machine control.

Example 1 is an agricultural system comprising:
a communication system that receives a topographic map that maps values of a topographic characteristic to different geographic locations in the field;
a geographic position sensor that detects a geographic location of the agricultural work machine;
an in-situ sensor that detects a value of an environmental characteristic corresponding to the geographic location;
a predictive model generator that generates a predictive environmental characteristic model indicative of a relationship between the topographic characteristic and the environmental characteristic based on the value of the topographic characteristic in the topographic map corresponding to the geographic location and the value of the environmental characteristic sensed by the in-situ sensor corresponding to the geographic location; and
a predictive map generator that generates a functional predictive environmental characteristic map of the field that maps predictive values of the environmental characteristic to the different geographic locations in the field based on the values of the topographic characteristic in the topographic map and based on the predictive environmental characteristic model.

Example 2 is the agricultural system of any or all previous examples, wherein the predictive map generator configures the functional predictive environmental characteristic map for consumption by a control system that generates control signals to control a controllable subsystem on the agricultural work machine based on the functional predictive environmental characteristic map.

Example 3 is the agricultural system of any or all previous examples, wherein the in-situ sensor detects, as the value of the environmental characteristic, a yield value,
wherein the predictive model generates as the predictive environmental characteristic model, a predictive yield model indicative of a relationship between the topographic characteristic and yield based on the yield value detected by the in-situ sensor corresponding to the geographic location and a value of the topographic characteristic in the topographic map at the geographic location, and
wherein the predictive map generator generates, as the functional predictive environmental characteristic map, a functional predictive yield map that maps predictive yield values to the different geographic locations in the worksite based on the values of the topographic characteristic in the topographic map at those different locations and based on the predictive yield model.

Example 4 is the agricultural system of any or all previous examples, wherein the in-situ sensor detects, as the value of the environmental characteristic, a crop moisture value,
wherein the predictive model generates as the predictive environmental characteristic model, a predictive crop moisture model indicative of a relationship between the topographic characteristic and crop moisture based on the crop moisture value detected by the in-situ sensor corresponding to the geographic location and a value of the topographic characteristic in the topographic map at the geographic location, and
wherein the predictive map generator generates, as the functional predictive environmental characteristic map, a functional predictive crop moisture map that maps predictive crop moisture values to the different geographic locations in the worksite based on the values of the topographic characteristic in the topographic map at those different locations and based on the predictive crop moisture model.

Example 5 is the agricultural system of any or all previous examples, wherein the in-situ sensor detects, as the value of the environmental characteristic, a soil moisture value,
wherein the predictive model generates as the predictive environmental characteristic model, a predictive soil moisture model indicative of a relationship between the topographic characteristic and soil moisture based on the soil moisture value detected by the in-situ sensor corresponding to the geographic location and a value of the topographic characteristic in the topographic map at the geographic location, and
wherein the predictive map generator generates, as the functional predictive environmental characteristic map, a functional predictive soil moisture map that maps predictive soil moisture values to the different geographic locations in the worksite based on the values of the topographic characteristic in the topographic map at those different locations and based on the predictive soil moisture model.

Example 6 is the agricultural system of any or all previous examples, wherein the in-situ sensor detects, as the value of the environmental characteristic, a biomass value,
  wherein the predictive model generates as the predictive environmental characteristic model, a predictive biomass model indicative of a relationship between the topographic characteristic and biomass based on the biomass value detected by the in-situ sensor corresponding to the geographic location and a value of the topographic characteristic in the topographic map at the geographic location, and
  wherein the predictive map generator generates, as the functional predictive environmental characteristic map, a functional predictive biomass map that maps predictive biomass values to the different geographic locations in the worksite based on the values of the topographic characteristic in the topographic map at those different locations and based on the predictive biomass model.

Example 7 is the agricultural system of any or all previous examples, wherein the in-situ sensor detects, as the value of the environmental characteristic, a crop state value,
  wherein the predictive model generates as the predictive environmental characteristic model, a predictive crop state model indicative of a relationship between the topographic characteristic and crop state based on the crop state value detected by the in-situ sensor corresponding to the geographic location and a value of the topographic characteristic in the topographic map at the geographic location, and
  wherein the predictive map generator generates, as the functional predictive environmental characteristic map, a functional predictive crop state map that maps predictive crop state values to the different geographic locations in the worksite based on the values of the topographic characteristic in the topographic map at those different locations and based on the predictive crop state model.

Example 8 is the agricultural system of any or all previous examples, wherein the in-situ sensor detects, as the value of the environmental characteristic, a crop constituent value,
  wherein the predictive model generates as the predictive environmental characteristic model, a predictive crop constituent model indicative of a relationship between the topographic characteristic and a crop constituent based on the crop constituent value detected by the in-situ sensor corresponding to the geographic location and a value of the topographic characteristic in the topographic map at the geographic location, and
  wherein the predictive map generator generates, as the functional predictive environmental characteristic map, a functional predictive crop constituent map that maps predictive crop constituent values to the different geographic locations in the worksite based on the values of the topographic characteristic in the topographic map at those different locations and based on the predictive crop constituent model.

Example 9 is the agricultural system of any or all previous examples, wherein the in-situ sensor detects, as the value of the environmental characteristic, a kernel size value,
  wherein the predictive model generates as the predictive environmental characteristic model, a predictive kernel size model indicative of a relationship between the topographic characteristic and kernel size based on the kernel size value detected by the in-situ sensor corresponding to the geographic location and a value of the topographic characteristic in the topographic map at the geographic location, and
  wherein the predictive map generator generates, as the functional predictive environmental characteristic map, a functional predictive kernel size map that maps predictive kernel size values to the different geographic locations in the worksite based on the values of the topographic characteristic in the topographic map at those different locations and based on the predictive kernel size model.

Example 10 is the agricultural system of any or all previous examples, wherein the in-situ sensor detects, as the value of the environmental characteristic, a stalk size value,
  wherein the predictive model generates as the predictive environmental characteristic model, a predictive stalk size model indicative of a relationship between the topographic characteristic and stalk size based on the stalk size value detected by the in-situ sensor corresponding to the geographic location and a value of the topographic characteristic in the topographic map at the geographic location, and
  wherein the predictive map generator generates, as the functional predictive environmental characteristic map, a functional predictive stalk size map that maps predictive stalk size values to the different geographic locations in the worksite based on the values of the topographic characteristic in the topographic map at those different locations and based on the predictive stalk size model.

Example 11 is the agricultural system of any or all previous examples, wherein the in-situ sensor detects, as the value of the environmental characteristic, an ear size value,
  wherein the predictive model generates as the predictive environmental characteristic model, a predictive ear size model indicative of a relationship between the topographic characteristic and ear size based on the ear size value detected by the in-situ sensor corresponding to the geographic location and a value of the topographic characteristic in the topographic map at the geographic location, and
  wherein the predictive map generator generates, as the functional predictive environmental characteristic map, a functional predictive ear size map that maps predictive ear size values to the different geographic locations in the worksite based on the values of the topographic characteristic in the topographic map at those different locations and based on the predictive ear size model.

Example 12 is the agricultural system of any or all previous examples, wherein the in-situ sensor detects, as the value of the environmental characteristic, a standing water value,
  wherein the predictive model generates as the predictive environmental characteristic model, a predictive standing water model indicative of a relationship between the topographic characteristic and standing water based on the standing water value detected by the in-situ sensor corresponding to the geographic location and a value of the topographic characteristic in the topographic map at the geographic location, and
  wherein the predictive map generator generates, as the functional predictive environmental characteristic map, a functional predictive standing water map that maps predictive standing water values to the different geographic locations in the worksite based on the values of the topographic characteristic in the topographic map at those different locations and based on the predictive standing water model.

Example 13 is the agricultural system of any or all previous examples, wherein the in-situ sensor detects, as the value of the environmental characteristic, an obscurants value,
wherein the predictive model generates as the predictive environmental characteristic model, a predictive obscurants model indicative of a relationship between the topographic characteristic and obscurants based on the obscurants value detected by the in-situ sensor corresponding to the geographic location and a value of the topographic characteristic in the topographic map at the geographic location, and
wherein the predictive map generator generates, as the functional predictive environmental characteristic map, a functional predictive obscurants map that maps predictive obscurants values to the different geographic locations in the worksite based on the values of the topographic characteristic in the topographic map at those different locations and based on the predictive obscurants model.

Example 14 is the agricultural system of any or all previous examples, wherein the predictive map generator outputs the functional predictive environmental characteristic map for presentation to an operator of the agricultural work machine.

Example 15 is a computer implemented method of generating a functional predictive environmental characteristic map, comprising:
receiving a topographic map that maps values of a topographic characteristic to different geographic locations in a field;
obtaining in-situ sensor data indicative of a value of an environmental characteristic corresponding to a geographic location at the field;
generating a predictive environmental characteristic model indicative of a relationship between the topographic characteristic and the environmental characteristic; and
controlling a predictive map generator to generate the functional predictive environmental characteristic map of the field, that maps predictive values of the environmental characteristic to the different locations in the field based on the values of the topographic characteristic in the topographic map and the predictive environmental characteristic model.

Example 16 is the computer implemented method of any or all previous examples and further comprising:
configuring the functional predictive environmental characteristic map for a control system that generates control signals to control a controllable subsystem on an agricultural work machine based on the functional predictive environmental characteristic map.

Example 17 is the computer implemented method of any or all previous examples and further comprising:
controlling a controllable subsystem of an agricultural work machine based on the functional predictive environmental characteristic map.

Example 18 is the computer implemented method of any or all previous examples, wherein obtaining in-situ sensor data indicative of the value of an environmental characteristic comprises obtaining in-situ sensor data indicative of two or more of a value of yield, a value of crop moisture, a value of soil moisture, a value of biomass, a value of crop state, a value of a crop constituent, a value of kernel size, a value of stalk size, a value of ear size, a value of standing water, and a value of obscurants.

Example 19 is the computer implemented method of any or all previous examples, wherein generating the predictive environmental characteristic model is indicative of a relationship between the topographic characteristic and two or more of yield, crop moisture, soil moisture, biomass, crop state, the crop constituent, kernel size, stalk size, ear size, standing water, and obscurants, and
wherein the functional predictive environmental map of the field maps predictive values of two or more of yield, crop moisture, soil moisture, biomass, crop state, the crop constituent, kernel size, stalk size, ear size, standing water, and obscurants.

Example 20 is an agricultural work machine, comprising:
a communication system that receives a topographic map that maps values of a topographic characteristic to different geographic locations in a field;
a geographic position sensor that detects a geographic location of the agricultural work machine;
an in-situ sensor that detects a value of an environmental characteristic corresponding to a geographic location;
a predictive model generator that generates a predictive environmental characteristic model indicative of a relationship between values of the topographic characteristic and values of the environmental characteristic based on the value of the environmental characteristic detected by the in-situ sensor corresponding to the geographic location and a value of the topographic characteristic in the topographic map at the geographic location;
a predictive map generator that generates a functional predictive environmental characteristic map of the field, that maps predictive values of the environmental characteristic to the different locations in the field, based on the topographic values in the topographic map at those different locations and based on the predictive environmental characteristic model; and
a control system that generates a control system based on the functional predictive environmental characteristic map and based on the geographic location of the agricultural work machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to examples that solve any or all disadvantages noted in the background.

DETAILED DESCRIPTION

Figure 1:
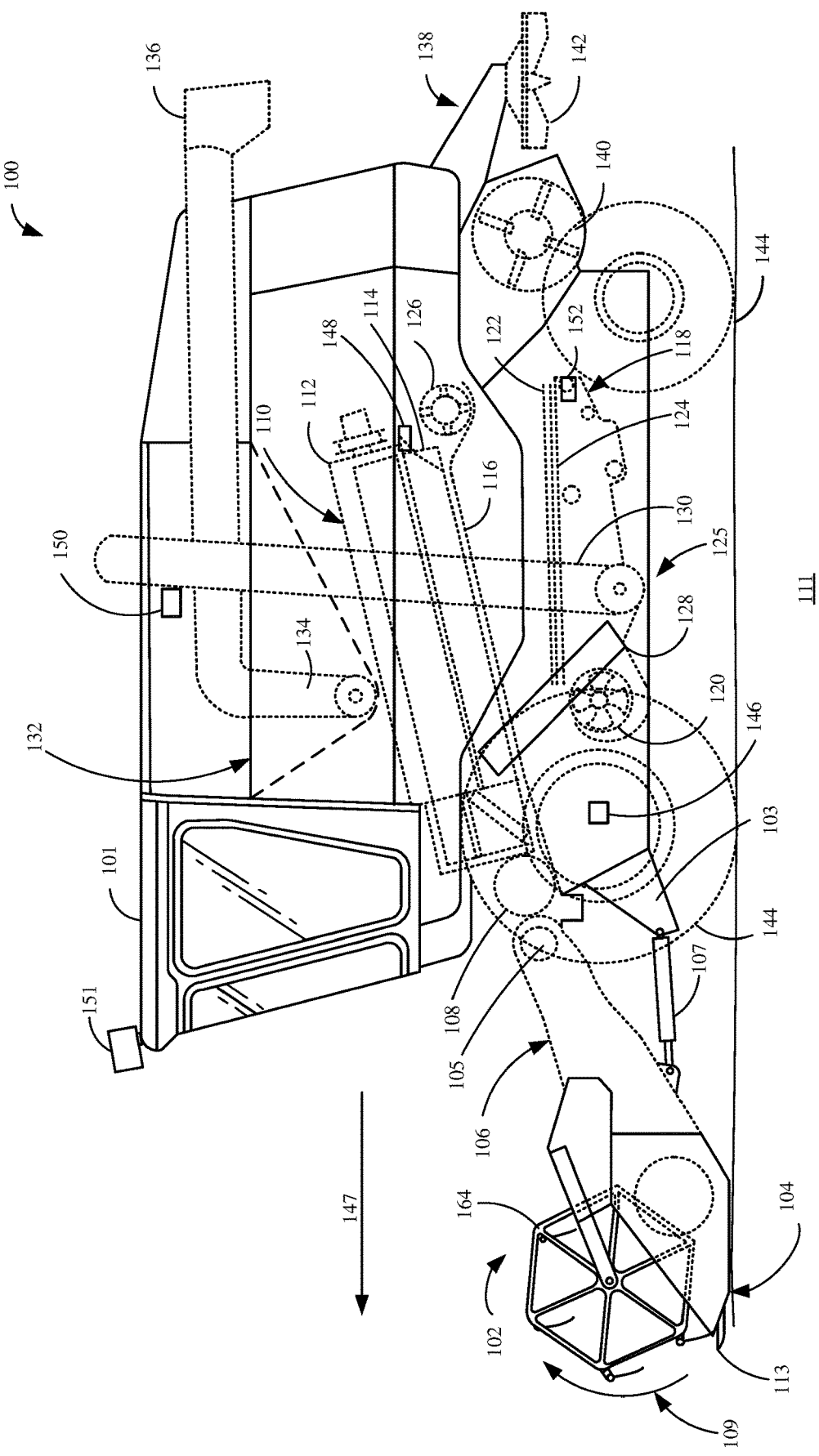
FIG. 1 is a partial pictorial, partial schematic illustration of one example of a combine harvester.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

The present description relates to using in-situ data taken concurrently with an agricultural operation, in combination with data in an information map, to generate a predictive map and, more particularly, a predictive environmental characteristic map. In some examples, the predictive environmental characteristic map can be used to control an agricultural work machine, such as an agricultural harvester. As discussed above, performance of an agricultural harvester may vary with the variability of environmental characteristics at the field. The environmental characteristics may vary based on the topography of the location at the field to which they correspond. Without limitation, environmental characteristics may include characteristics at the worksite (including characteristics of the field) or characteristics of crop at the field.

A topographic map illustratively maps elevations of the ground across different geographic locations in a field of interest. Since ground slope is indicative of a change in elevation, having two or more elevation values allows for calculation of slope across the areas having known elevation values. Greater granularity of slope can be accomplished by having more areas with known elevation values. As an agricultural harvester travels across the terrain in known directions, the pitch and roll of the agricultural harvester can be determined based on the slope of the ground (i.e., areas of changing elevation). Topographic characteristics, when referred to below, can include, but are not limited to, the elevation, slope (e.g., including the machine orientation relative to the slope), and ground profile (e.g., roughness).

The present discussion thus proceeds with respect to systems that receive a topographic map of a field and also use an in-situ sensor to detect a value indicative of an environmental characteristic, during a harvesting operation. The systems generate a model that models a relationship between the topographic characteristics derived from the topographic map and the output values from the in-situ sensor. The model is used to generate a functional predictive environmental characteristic map that predicts the environmental characteristic (or an output value of the in-situ sensor) at different locations in the field. The functional predictive environmental characteristic map, generated during the harvesting operation, can be used in automatically controlling a harvester during the harvesting operation.

FIG. 1 is a partial pictorial, partial schematic, illustration of a self-propelled agricultural harvester 100. In the illustrated example, agricultural harvester 100 is a combine harvester. Further, although combine harvesters are provided as examples throughout the present disclosure, it will be appreciated that the present description is also applicable to other types of harvesters, such as cotton harvesters, sugarcane harvesters, self-propelled forage harvesters, windrowers, or other agricultural work machines. Consequently, the present disclosure is intended to encompass the various types of harvesters described and is, thus, not limited to combine harvesters. Moreover, the present disclosure is directed to other types of work machines, such as agricultural seeders and sprayers, construction equipment, forestry equipment, and turf management equipment where generation of a predictive map may be applicable. Consequently, the present disclosure is intended to encompass these various types of harvesters and other work machines and is, thus, not limited to combine harvesters.

As shown in FIG. 1, agricultural harvester 100 illustratively includes an operator compartment 101, which can have a variety of different operator interface mechanisms, for controlling agricultural harvester 100. Agricultural harvester 100 includes front-end equipment, such as a header 102, and a cutter generally indicated at 104. Agricultural harvester 100 also includes a feeder house 106, a feed accelerator 108, and a thresher generally indicated at 110. The feeder house 106 and the feed accelerator 108 form part of a material handling subsystem 125. Header 102 is pivotally coupled to a frame 103 of agricultural harvester 100 along pivot axis 105. One or more actuators 107 drive movement of header 102 about axis 105 in the direction generally indicated by arrow 109. Thus, a vertical position of header 102 (the header height) above ground 111 over which the header 102 travels is controllable by actuating actuator 107. While not shown in FIG. 1, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt angle is decreased by controlling header 102 to point the distal edge 113 of cutter 104 more away from the ground. The roll angle refers to the orientation of header 102 about the front-to-back longitudinal axis of agricultural harvester 100.

Thresher 110 illustratively includes a threshing rotor 112 and a set of concaves 114. Further, agricultural harvester 100 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, clean grain elevator 130, as well as unloading auger 134 and spout 136. The clean grain elevator moves clean grain into clean grain tank 132. Agricultural harvester 100 also includes a residue subsystem 138 that can include chopper 140 and spreader 142. Agricultural harvester 100 also includes a propulsion subsystem that includes an engine that drives ground engaging components 144, such as wheels or tracks. In some examples, a combine harvester within the scope of the present disclosure may have more than one of any of the subsystems mentioned above. In some examples, agricultural harvester 100 may have left and right cleaning subsystems, separators, etc., which are not shown in FIG. 1.

In operation, and by way of overview, agricultural harvester 100 illustratively moves through a field in the direction indicated by arrow 147. As agricultural harvester 100 moves, header 102 (and the associated reel 164) engages the crop to be harvested and gathers the crop toward cutter 104. An operator of agricultural harvester 100 can be a local human operator, a remote human operator, or an automated system. The operator of agricultural harvester 100 may determine one or more of a height setting, a tilt angle setting, or a roll angle setting for header 102. For example, the operator inputs a setting or settings to a control system, described in more detail below, that controls actuator 107. The control system may also receive a setting from the operator for establishing the tilt angle and roll angle of the header 102 and implement the inputted settings by controlling associated actuators, not shown, that operate to change the tilt angle and roll angle of the header 102. The actuator 107 maintains header 102 at a height above ground 111 based on a height setting and, where applicable, at desired tilt and roll angles. Each of the height, roll, and tilt settings may be implemented independently of the others. The control system responds to header error (e.g., the difference between the height setting and measured height of header 104 above ground 111 and, in some examples, tilt angle and roll angle errors) with a responsiveness that is determined based on a sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house 106 toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow. In other examples, the residue subsystem 138 can include weed seed eliminators (not shown) such as seed baggers or other seed collectors, or seed crushers or other seed destroyers.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in agricultural harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

FIG. 1 also shows that, in one example, agricultural harvester 100 includes ground speed sensor 146, one or more separator loss sensors 148, a clean grain camera 150, a forward looking image capture mechanism 151, which may be in the form of a stereo or mono camera, and one or more loss sensors 152 provided in the cleaning subsystem 118.

Ground speed sensor 146 senses the travel speed of agricultural harvester 100 over the ground. Ground speed sensor 146 may sense the travel speed of the agricultural harvester 100 by sensing the speed of rotation of the ground engaging components (such as wheels or tracks), a drive shaft, an axle, or other components. In some instances, the travel speed may be sensed using a positioning system, such as a global positioning system (GPS), a dead reckoning system, a long range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when agricultural harvester 100 is on a slope, the orientation of agricultural harvester 100 relative to the slope is known. For example, an orientation of agricultural harvester 100 could include ascending, descending or transversely travelling the slope. Machine or ground speed, when referred to in this disclosure can also include the two or three dimension direction of travel.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118. Separator loss sensor 148 provides a signal indicative of grain loss in the left and right separators, not separately shown in FIG. 1. The separator loss sensors 148 may be associated with the left and right separators and may provide separate grain loss signals or a combined or aggregate signal. In some instances, sensing grain loss in the separators may also be performed using a wide variety of different types of sensors as well.

Agricultural harvester 100 may also include other sensors and measurement mechanisms. For instance, agricultural harvester 100 may include one or more of the following sensors: a header height sensor that senses a height of header 102 above ground 111; stability sensors that sense oscillation or bouncing motion (and amplitude) of agricultural harvester 100; a residue setting sensor that is configured to sense whether agricultural harvester 100 is configured to chop the residue, produce a windrow, etc.; a cleaning shoe fan speed sensor to sense the speed of fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; one or more machine setting sensors configured to sense various configurable settings of agricultural harvester 100; a machine orientation sensor that senses the orientation of agricultural harvester 100; a material other than grain (MOG) moisture sensor that senses a moisture level of the MOG passing through agricultural harvester 100; and crop property sensors that sense a variety of different types of crop properties, such as crop type, crop moisture, and other crop properties. Crop property sensors may also be configured to sense characteristics of the severed crop material as the crop material is being processed by agricultural harvester 100. For example, in some instances, the crop property sensors may sense grain quality such as broken grain; MOG levels; grain constituents such as starches and protein; grain moisture; and grain feed rate as the grain travels through the feeder house 106, clean grain elevator 130, or elsewhere in the agricultural harvester 100. The crop property sensors may also sense the feed rate of biomass through feeder house 106, through the separator 116 or elsewhere in agricultural harvester 100. The crop property sensors may also sense the feed rate as a mass flow rate of grain through elevator 130 or through other portions of the agricultural harvester 100 or provide other output signals indicative of other sensed variables.

It should be noted that crop moisture can broadly refer to the moisture of the crop plant (e.g., corn plant) which includes both grain (e.g., corn kernels) and material other than grain (e.g., leaves, stalk, etc.) Thus crop moisture can be inclusive of the both grain moisture and moisture of material other than grain (e.g., MOG moisture).

Examples of sensors used to detect or sense the power characteristics include, but are not limited to, a voltage sensor, a current sensor, a torque sensor, a hydraulic pressure sensor, a hydraulic flow sensor, a force sensor, a bearing load sensor and a rotational sensor. Power characteristics can be measured at varying levels of granularity. For instance, power usage can be sensed machine-wide, subsystem-wide or by individual components of the subsystems.

Examples of sensors used to detect internal material distribution include, but are not limited to, one or more cameras, capacitive sensors, electromagnetic or ultrasonic time-of-flight reflective sensors, signal attenuation sensors, weight or mass sensors, material flow sensors, etc. These sensors can be placed at one or more locations in agricultural harvester 100 to sense the distribution of the material in agricultural harvester 100, during the operation of agricultural harvester 100.

Examples of sensors used to detect or sense a pitch or roll of agricultural harvester 100 include accelerometers, gyroscopes, inertial measurement units, gravimetric sensors, magnetometers, etc. These sensors can also be indicative of the slope of the terrain that agricultural harvester 100 is currently on.

Prior to describing how agricultural harvester 100 generates a functional predictive environmental characteristic map, and uses the functional predictive environmental characteristic map for control, a brief description of some of the items on agricultural harvester 100, and their operation, will first be described. The description of FIGS. 2 and 3 describe receiving a general type of information map and combining information from the information map with georeferenced sensor data (e.g., signal, image, etc.) generated by an in-situ sensor, where the sensor data is indicative of an environmental characteristic at the field. Environmental characteristics at the "field" may include, but are not limited to, soil moisture, standing water, obscurants (e.g., dust or other debris in the air), various plant or crop properties, such as biomass, yield, crop moisture, crop state, crop constituents, kernel size, stalk size, ear size, as well various other environmental characteristics. A relationship between the environmental characteristic values obtained from in-situ sensor data and the information map values is identified, and that relationship is used to generate a functional predictive map. A functional predictive map predicts values at different geographic locations in a field, and one or more of those values can be used for controlling a machine. In some instances, a functional predictive map can be presented to a user, such as an operator of an agricultural work machine, which may be an agricultural harvester, or another user, or both. A functional predictive map can be presented to a user visually, such as via a display, haptically, or audibly. The user can interact with the functional predictive map to perform editing operations and other user interface operations. In some instances, a functional predictive map can be used for one or more of controlling an agricultural work machine, such as an agricultural harvester, presentation to an operator or other user, and presentation to an operator or user for interaction by the operator or user.

Figure 2:
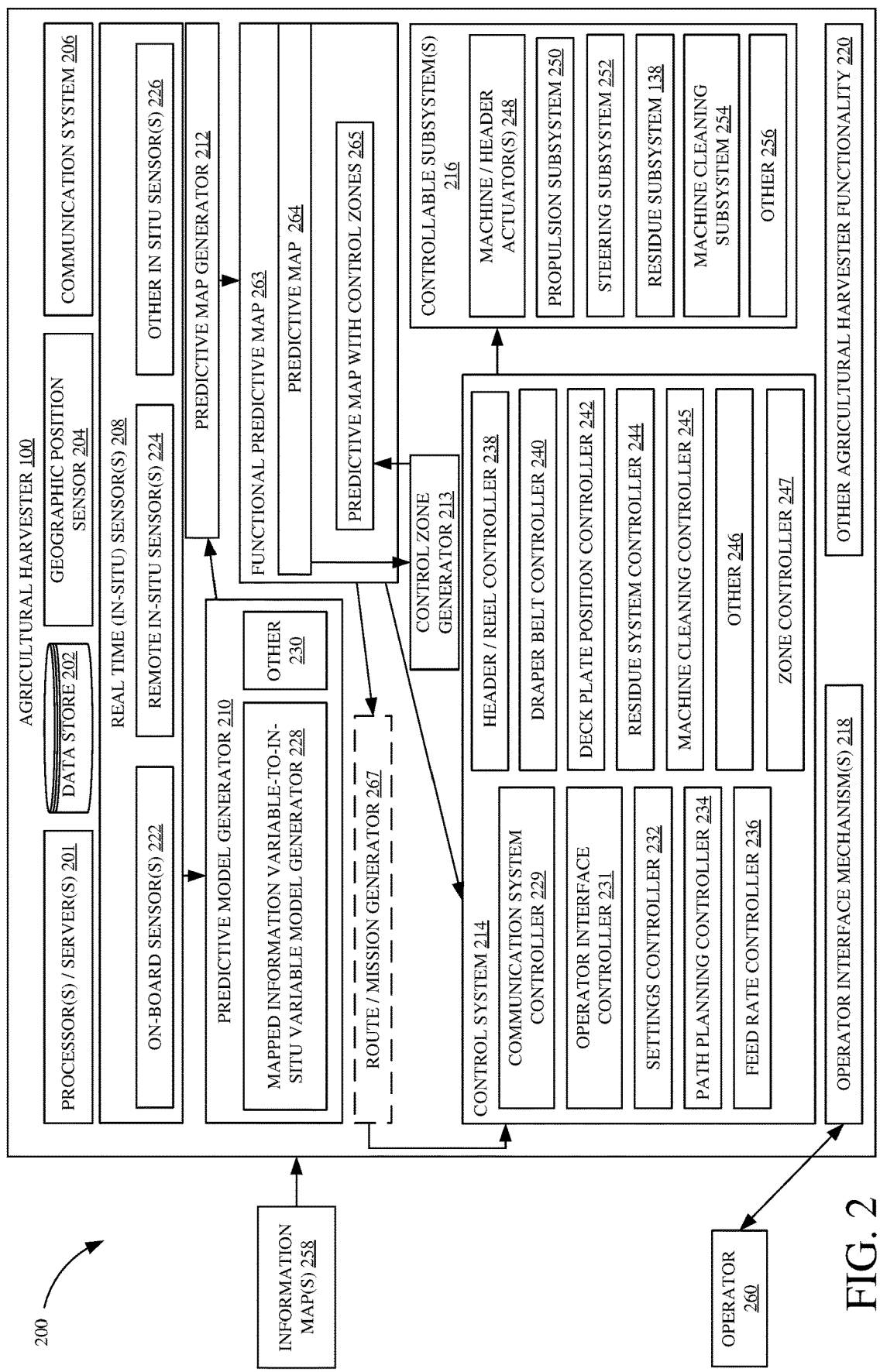
FIG. 2 is a block diagram showing some portions of an agricultural system, including an agricultural harvester, in more detail, according to some examples of the present disclosure.

After the general approach is described with respect to FIGS. 2 and 3, a more specific approach for generating a functional predictive map that can be presented to an operator or user, or used to control agricultural harvester 100, or both, is described with respect to FIGS. 4 and 5. Again, while the present discussion proceeds with respect to the agricultural harvester and, particularly, a combine harvester, the scope of the present disclosure encompasses other types of agricultural harvesters or other agricultural work machines.

FIG. 2 is a block diagram showing some portions of an example agricultural system 200 that includes, among other things, an agricultural harvester 100. FIG. 2 shows that agricultural harvester 100 illustratively includes one or more processors or servers 201, data store 202, geographic position sensor 204, communication system 206, and one or more in-situ sensors 208 that sense one or more agricultural characteristics of a field concurrent with a harvesting operation. An agricultural characteristic can include any characteristic that can have an effect of the harvesting operation. Some examples of agricultural characteristics include environmental characteristics. Agricultural characteristics can also include characteristics of the machine, such as the harvesting machine. Other types of agricultural characteristics are also included. The in-situ sensors 208 generate values corresponding to the sensed characteristics. The agricultural harvester 100 also includes a predictive model or relationship generator (collectively referred to hereinafter as "predictive model generator 210"), predictive map generator 212, control zone generator 213, control system 214, one or more controllable subsystems 216, and an operator interface mechanism 218. The agricultural harvester 100 can also include a wide variety of other agricultural harvester functionality 220. The in-situ sensors 208 include, for example, on-board sensors 222, remote sensors 224, and other sensors 226 that sense characteristics at a field during the course of an agricultural operation. Predictive model generator 210 illustratively includes an information variable-to-in-situ variable model generator 228, and predictive model generator 210 can include other items 230. Control system 214 includes communication system controller 229, operator interface controller 231, a settings controller 232, path planning controller 234, feed rate controller 236, header and reel controller 238, draper belt controller 240, deck plate position controller 242, residue system controller 244, machine cleaning controller 245, zone controller 247, and system 214 can include other items 246. Controllable subsystems 216 include machine and header actuators 248, propulsion subsystem 250, steering subsystem 252, residue subsystem 138, machine cleaning subsystem 254, and subsystems 216 can include a wide variety of other subsystems 256.

FIG. 2 also shows that agricultural harvester 100 can receive one or more information maps 258. As described below, the information maps 258 include, for example, a topographic map from a prior operation at the field, such as an unmanned aerial vehicle completing a range scanning operation from a known altitude, a topographic map sensed by a plane, a topographic map sensed by a satellite, a topographic map sensed by a ground vehicle, such as a GPS-equipped planter, etc. However, map information may also encompass other types of data that were obtained prior to a harvesting operation or a map from a prior operation. For instance, a topographic map can be retrieved from a remote source such as the United States Geological Survey (USGS). FIG. 2 also shows that an operator 260 may operate the agricultural harvester 100. The operator 260 interacts with operator interface mechanisms 218. In some examples, operator interface mechanisms 218 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 260 may interact with operator interface mechanisms 218 using touch gestures. These examples described above are provided as illustrative examples and are not intended to limit the scope of the present disclosure. Consequently, other types of operator interface mechanisms 218 may be used and are within the scope of the present disclosure.

Information maps 258 may be downloaded onto agricultural harvester 100 and stored in data store 202, using communication system 206 or in other ways. In some examples, communication system 206 may be a cellular communication system, a system for communicating over a wide area network or a local area network, a system for communicating over a near field communication network, or a communication system configured to communicate over any of a variety of other networks or combinations of networks. Communication system 206 may also include a system that facilitates downloads or transfers of information to and from a secure digital (SD) card or a universal serial bus (USB) card or both.

Geographic position sensor 204 illustratively senses or detects the geographic position or location of agricultural harvester 100. Geographic position sensor 204 can include, but is not limited to, a global navigation satellite system (GNSS) receiver that receives signals from a GNSS satellite transmitter. Geographic position sensor 204 can also include a real-time kinematic (RTK) component that is configured to enhance the precision of position data derived from the GNSS signal. Geographic position sensor 204 can include a dead reckoning system, a cellular triangulation system, or any of a variety of other geographic position sensors.

In-situ sensors 208 may be any of the sensors described above with respect to FIG. 1 or below with respect to FIG. 4. In-situ sensors 208 include on-board sensors 222 that are mounted on-board agricultural harvester 100. Such sensors may include, for instance, a speed sensor (e.g., a GPS, speedometer, or compass), image sensors that are internal to agricultural harvester 100 (such as the clean grain camera or cameras mounted to identify material distribution in agricultural harvester 100, for example, in the residue subsystem or the cleaning system), grain loss sensors, tailings characteristic sensors, and grain quality sensors. The in-situ sensors 208 also include remote in-situ sensors 224 that capture in-situ information. In-situ data include data taken from a sensor on-board the harvester or taken by any sensor where the data are detected during the harvesting operation.

Predictive model generator 210 generates a model that is indicative of a relationship between the values sensed by the in-situ sensor 208 and a characteristic mapped to the field by the information map 258. For example, if an information map 258 maps a topographic characteristic to different locations in the field, and the in-situ sensor 208 is sensing a value indicative of an environmental characteristic, then mapped information variable-to-in-situ variable model generator 228 generates a predictive environmental characteristic model that models the relationship between the topographic characteristics and the environmental characteristic. The predictive environmental characteristic model can also be generated based on topographic characteristics from the information map 258 and multiple in-situ data values generated by in-situ sensors 208. Then, predictive map generator 212 uses the predictive environmental characteristic model generated by predictive model generator 210 to generate a functional predictive environmental characteristic map that predicts the value of an environmental characteristic, sensed by the in-situ sensors 208 at different locations in the field based upon the information map 258.

In some examples, the type of values in the functional predictive map 263 may be the same as the in-situ data type sensed by the in-situ sensors 208. In some instances, the type of values in the functional predictive map 263 may have different units from the data sensed by the in-situ sensors 208. In some examples, the type of values in the functional predictive map 263 may be different from the data type sensed by the in-situ sensors 208 but have a relationship to the type of data type sensed by the in-situ sensors 208. For example, in some examples, the data type sensed by the in-situ sensors 208 may be indicative of the type of values in the functional predictive map 263. In some examples, the type of data in the functional predictive map 263 may be different than the data type in the information map 258. In some instances, the type of data in the functional predictive map 263 may have different units from the data in the information map 258. In some examples, the type of data in the functional predictive map 263 may be different from the data type in the information map 258 but has a relationship to the data type in the information map 258. For example, in some examples, the data type in the information map 258 may be indicative of the type of data in the functional predictive map 263. In some examples, the type of data in the functional predictive map 263 is different than one of, or both of the in-situ data type sensed by the in-situ sensors 208 and the data type in the information map 258. In some examples, the type of data in the functional predictive map 263 is the same as one of, or both of, of the in-situ data type sensed by the in-situ sensors 208 and the data type in information map 258. In some examples, the type of data in the functional predictive map 263 is the same as one of the in-situ data type sensed by the in-situ sensors 208 or the data type in the information map 258, and different than the other.

Predictive map generator 212 can use the topographic characteristics in information map 258, and the model generated by predictive model generator 210, to generate a functional predictive map 263 that predicts the environmental characteristics at different locations in the field. Predictive map generator 212 thus outputs predictive map 264.

As shown in FIG. 2, predictive map 264 predicts the value of one or more sensed characteristics (sensed by in-situ sensors 208), or one or more characteristics related to the one or more sensed characteristics, at various locations across the field based upon an information value in information map 258 at those locations and using the predictive model. For example, if predictive model generator 210 has generated a predictive model indicative of a relationship between a topographic characteristic and an environmental characteristic, then, given the topographic characteristics at different locations across the field, predictive map generator 212 generates a predictive map 264 that predicts the value of the environmental characteristic at different locations across the field. The topographic characteristic, obtained from the topographic map, at those locations and the relationship between the topographic characteristic and the environmental characteristic, obtained from the predictive model, are used to generate the predictive map 264. The predicted environmental characteristic can be used by a control system to adjust, for example, settings of the various subsystems based on the predictive environmental characteristic.

Some variations in the data types that are mapped in the information map 258, the data types sensed by in-situ sensors 208 and the data types predicted on the predictive map 264 will now be described.

In some examples, the data type in the information map 258 is different from the data type sensed by in-situ sensors 208, yet the data type in the predictive map 264 is the same as the data type sensed by the in-situ sensors 208. For instance, the information map 258 may be a topographic map, and the variable sensed by the in-situ sensors 208 may be an environmental characteristic. The predictive map 264 may then be a predictive environmental characteristic map that maps predicted environmental characteristic values to different geographic locations in the field.

Also, in some examples, the data type in the information map 258 is different from the data type sensed by in-situ sensors 208, and the data type in the predictive map 264 is different from both the data type in the information map 258 and the data type sensed by the in-situ sensors 208.

In some examples, the information map 258 is from a prior operation through the field and the data type is different from the data type sensed by in-situ sensors 208, yet the data type in the predictive map 264 is the same as the data type sensed by the in-situ sensors 208. For instance, the information map 258 may be a topographic map generated during planting, and the variable sensed by the in-situ sensors 208 may be an environmental characteristic. The predictive map 264 may then be a predictive environmental characteristic map that maps predicted environmental characteristic values to different geographic locations in the field.

In some examples, the information map 258 is from a prior operation through the field and the data type is the same as the data type sensed by in-situ sensors 208, and the data type in the predictive map 264 is also the same as the data type sensed by the in-situ sensors 208.

In some examples, predictive map 264 can be provided to the control zone generator 213. Control zone generator 213 groups contiguous individual point data values on predictive map 264, into control zones. A control zone may include two or more contiguous portions of an area, such as a field, for which a control parameter corresponding to the control zone for controlling a controllable subsystem is constant. For example, a response time to alter a setting of controllable subsystems 216 may be inadequate to satisfactorily respond to changes in values contained in a map, such as predictive map 264. In that case, control zone generator 213 parses the map and identifies control zones that are of a defined size to accommodate the response time of the controllable subsystems 216. In another example, control zones may be sized to reduce wear from excessive actuator movement resulting from continuous adjustment. In some examples, there may be a different set of control zones for each controllable subsystem 216 or for groups of controllable subsystems 216. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265. In some examples, multiple crops may be simultaneously present in a field if an intercrop production system is implemented. In that case, predictive map generator 212 and control zone generator 213 are able to identify the location and characteristics of the two or more crops and then generate predictive map 264 and predictive control zone map 265 accordingly.

It will also be appreciated that control zone generator 213 can cluster values to generate control zones and the control zones can be added to predictive control zone map 265, or a separate map, showing only the control zones that are generated. In some examples, the control zones may only be used for controlling or calibrating agricultural harvester 100 or both. In other examples, the control zones may be presented to the operator 260 and used to control or calibrate agricultural harvester 100 and in other examples the control zones may just be presented to the operator 260 or another user or stored for later use.

Predictive map 264 or predictive control zone map 265 or both are provided to control system 214, which generates control signals based upon the predictive map 264 or predictive control zone map 265 or both. In some examples, communication system controller 229 controls communication system 206 to communicate the predictive map 264 or predictive control zone map 265 or control signals based on the predictive map 264 or predictive control zone map 265 to other agricultural harvesters that are harvesting in the same field. In some examples, communication system controller 229 controls the communication system 206 to send the predictive map 264, predictive control zone map 265, or both to other remote systems.

In some examples, predictive map 264 can be provided to route/mission generator 267. Route/mission generator 267 plots a travel path for agricultural harvester 100 to travel on during the harvesting operation based on predictive map 264. The travel path can also include machine control settings corresponding to locations along the travel path as well. For example, if a travel path ascends a hill, then at a point prior to hill ascension, the travel path can include a control indicative of directing power to propulsion systems to maintain a speed or feed rate of agricultural harvester 100. In some examples, route/mission generator 267 analyzes the predicted environmental characteristics according to predictive map 264, for a plurality of different travel routes, and selects a route that has desirable results (such as, quick harvest time or other desired performance parameters, such as yield, loss, etc.). As an illustrative example, the predictive map 264 may predict, as an environmental characteristic, obscurants at different geographic locations in the worksite. Route/mission generator 267 may then plot a travel path for agricultural harvester 100 to travel to avoid the obscurants.

Operator interface controller 231 is operable to generate control signals to control operator interface mechanisms 218. The operator interface controller 231 is also operable to present the predictive map 264 or predictive control zone map 265 or other information derived from or based on the predictive map 264, predictive control zone map 265, or both to operator 260. Operator 260 may be a local operator or a remote operator. As an example, controller 231 generates control signals to control a display mechanism to display one or both of predictive map 264 and predictive control zone map 265 for the operator 260. Controller 231 may generate operator actuatable mechanisms that are displayed and can be actuated by the operator to interact with the displayed map. The operator can edit the map by, for example, correcting an environmental characteristic displayed on the map, based on the operator's observation. Settings controller 232 can generate control signals to control various settings on the agricultural harvester 100 based upon predictive map 264, the predictive control zone map 265, or both. For instance, settings controller 232 can generate control signals to control machine and header actuators 248. In response to the generated control signals, the machine and header actuators 248 operate to control, for example, one or more of the sieve and chaffer settings, thresher clearance, rotor settings, cleaning fan speed settings, header height (or cut height), header functionality, reel speed, reel position, draper functionality (where agricultural harvester 100 is coupled to a draper header), corn header functionality, internal distribution control and other actuators 248 that affect the other functions of the agricultural harvester 100. Path planning controller 234 illustratively generates control signals to control steering subsystem 252 to steer agricultural harvester 100 according to a desired path. Path planning controller 234 can control a path planning system to generate a route for agricultural harvester 100 and can control propulsion subsystem 250 and steering subsystem 252 to steer agricultural harvester 100 along that route. Feed rate controller 236 can control various subsystems, such as propulsion subsystem 250 and machine actuators 248, to control a feed rate based upon the predictive map 264 or predictive control zone map 265 or both. For instance, as agricultural harvester 100 approaches a declining terrain having a predictive environmental characteristic value above a selected threshold, feed rate controller 236 may reduce the speed of machine 100 to maintain constant feed rate of biomass through the agricultural harvester 100. Header and reel controller 238 can generate control signals to control a header or a reel or other header functionality. Draper belt controller 240 can generate control signals to control a draper belt or other draper functionality based upon the predictive map 264, predictive control zone map 265, or both. For example, as agricultural harvester 100 approaches a declining terrain having a predicted environmental characteristic value above a selected threshold, draper belt controller 240 may increase the speed of the draper belts to prevent backup of material on the belts. Deck plate position controller 242 can generate control signals to control a position of a deck plate included on a header based on predictive map 264 or predictive control zone map 265 or both, and residue system controller 244 can generate control signals to control a residue subsystem 138 based upon predictive map 264 or predictive control zone map 265, or both. Machine cleaning controller 245 can generate control signals to control machine cleaning subsystem 254. For instance, as agricultural harvester 100 is about to travel on an area of the field where it is predicted that the biomass will increase, machine cleaning controller 245 can adjust cleaning subsystem 254 to account for the additional biomass. Other controllers included on the agricultural harvester 100 can control other subsystems based on the predictive map 264 or predictive control zone map 265 or both as well.

Figure 3A:
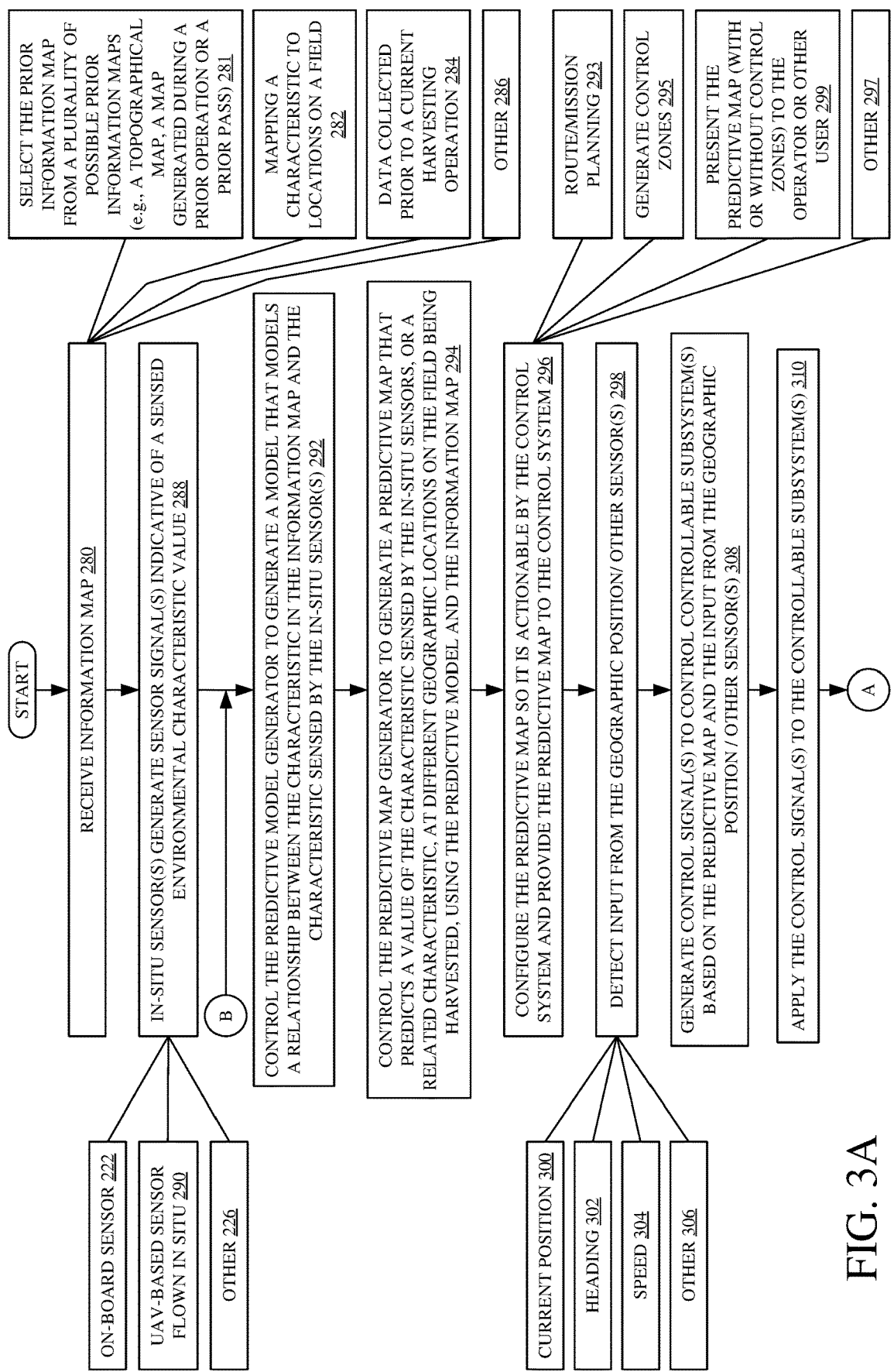
FIGS. 3A-3B (collectively referred to herein as FIG. 3) show a flow diagram illustrating an example of operation of an agricultural system in generating a map.
Figure 3B:
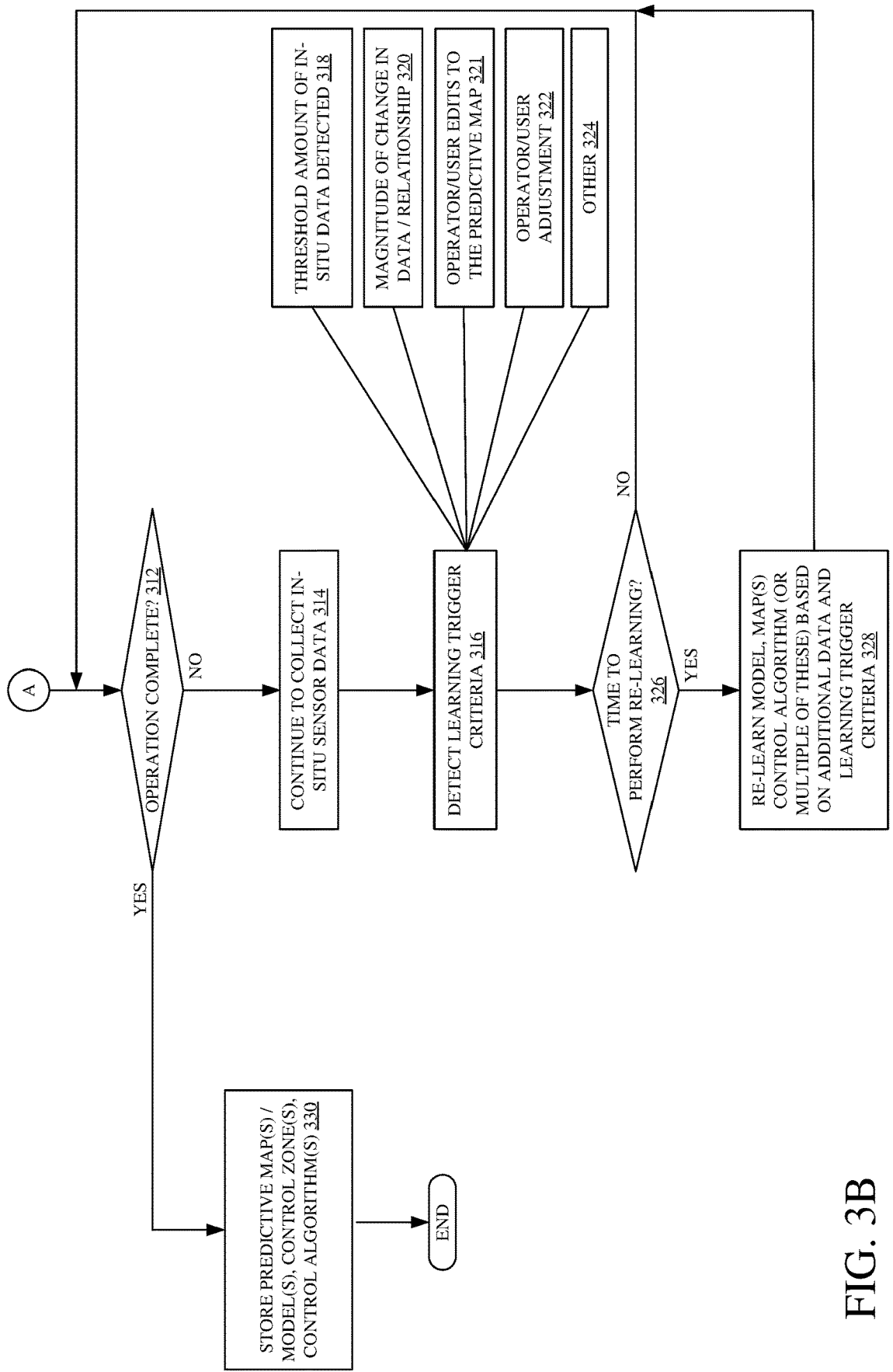

FIGS. 3A and 3B (collectively referred to herein as FIG. 3) show a flow diagram illustrating one example of the operation of agricultural system 200 in generating a predictive map 264 and predictive control zone map 265 based upon information map 258.

At 280, agricultural system 200 receives one or more information maps 258. Examples of information maps 258 or receiving information maps 258 are discussed with respect to blocks 281, 282, 284 and 286. As discussed above, information maps 258 map values of a variable, corresponding to a first characteristic, to different locations in the field, as indicated at block 282. As indicated at block 281, receiving the information maps 258 may involve selecting one or more of a plurality of possible information maps that are available. For instance, one information map may be a terrain profile map generated from aerial phase profilometry imagery. Another information map may be a map generated during a prior pass through the field which may have been performed by a different machine performing a previous operation in the field, such as a sprayer or other machine. The process by which one or more information maps are selected can be manual, semi-automated or automated. The information maps 258 are based on data collected prior to a current harvesting operation. This is indicated by block 284. For instance, the data may be collected by a GPS receiver mounted on a piece of equipment during a prior field operation. For instance, the data may be collected in a lidar range scanning operation during a previous year, or earlier in the current growing season, or at other times. The data may be based on data detected or received in ways other than using lidar range scanning. For instance, a drone equipped with a fringe projection profilometry system may detect the profile or elevation of the terrain. Or for instance, some topographic features can be estimated based on weather patterns, such as the formation of ruts due to erosion or the breakup of clumps over freeze-thaw cycles. In some examples, information maps 258 may be created by combining data from a number of sources such as those listed above. Or for instance, the data for the information maps 258, such as a topographic map can be transmitted to agricultural harvester 100 using communication system 206 and stored in data store 202. The data for the information maps 258 can be provided to agricultural harvester 100 using communication system 206 in other ways as well, and this is indicated by block 286 in the flow diagram of FIG. 3. In some examples, the information map 258 can be received by communication system 206.

Upon commencement of a harvesting operation, in-situ sensors 208 generate sensor signals indicative of one or more in-situ data values indicative of one or more environmental characteristics characteristic, for example, yield, crop moisture, soil moisture, biomass, crop state, crop constituents, kernel size, stalk size, ear size, standing water, and obscurants. Examples of in-situ sensors 288 are discussed with respect to blocks 222, 290, and 226. As explained above, the in-situ sensors 208 include on-board sensors 222; remote in-situ sensors 224, such as UAV-based sensors flown at a time to gather in-situ data, shown in block 290; or other types of in-situ sensors, designated by in-situ sensors 226. In some examples, data from on-board sensors is georeferenced using position, heading or speed data from geographic position sensor 204.

Predictive model generator 210 controls the mapped information variable-to-in-situ variable model generator 228 to generate a model that models a relationship between the mapped values contained in the information map 258 and the in-situ values sensed by the in-situ sensors 208 as indicated by block 292. The characteristics or data types represented by the mapped values in the information map 258 and the in-situ values sensed by the in-situ sensors 208 may be the same characteristics or data type or different characteristics or data types.

The relationship or model generated by predictive model generator 210 is provided to predictive map generator 212. Predictive map generator 212 generates a predictive map 264 that predicts a value of the characteristic sensed by the in-situ sensors 208 at different geographic locations in a field being harvested, or a different characteristic that is related to the characteristic sensed by the in-situ sensors 208, using the predictive model and the information map 258, as indicated by block 294.

It should be noted that, in some examples, the information map 258 may include two or more different maps or two or more different map layers of a single map. Each map in the two or more different maps or each layer in the two or more different map layers of a single map, map a different type of variable to the geographic locations in the field. In such an example, predictive model generator 210 generates a predictive model that models the relationship between the in-situ data and each of the different variables mapped by the two or more different maps or the two or more different map layers. Similarly, the in-situ sensors 208 can include two or more sensors each sensing a different type of variable. Thus, the predictive model generator 210 generates a predictive model that models the relationships between each type of variable mapped by the information map 258 and each type of variable sensed by the in-situ sensors 208. Predictive map generator 212 can generate a functional predictive map 263 that predicts a value for each sensed characteristic sensed by the in-situ sensors 208 (or a characteristic related to the sensed characteristic) at different locations in the field being harvested using the predictive model and each of the maps or map layers in the information map 258.

Predictive map generator 212 configures the predictive map 264 so that the predictive map 264 is actionable (or consumable) by control system 214. Predictive map generator 212 can provide the predictive map 264 to the control system 214 or to control zone generator 213 or both. Some examples of different ways in which the predictive map 264 can be configured or output are described with respect to blocks 296, 293, 295, 299 and 297. For instance, predictive map generator 212 configures predictive map 264 so that predictive map 264 includes values that can be read by control system 214 and used as the basis for generating control signals for one or more of the different controllable subsystems of the agricultural harvester 100, as indicated by block 296.

Route/mission generator 267 plots a travel path for agricultural harvester 100 to travel on during the harvesting operation based on predictive map 204, as indicated by block 293. Control zone generator 213 can divide the predictive map 264 into control zones based on the values on the predictive map 264. Contiguously-geolocated values that are within a threshold value of one another can be grouped into a control zone. The threshold value can be a default threshold value, or the threshold value can be set based on an operator input, based on an input from an automated system or based on other criteria. A size of the zones may be based on a responsiveness of the control system 214, the controllable subsystems 216, or based on wear considerations, or on other criteria as indicated by block 295. Predictive map generator 212 configures predictive map 264 for presentation to an operator or other user. Control zone generator 213 can configure predictive control zone map 265 for presentation to an operator or other user. This is indicated by block 299. When presented to an operator or other user, the presentation of the predictive map 264 or predictive control zone map 265 or both may contain one or more of the predictive values on the predictive map 264 correlated to geographic location, the control zones on predictive control zone map 265 correlated to geographic location, and settings values or control parameters that are used based on the predicted values on map 264 or zones on predictive control zone map 265. The presentation can, in another example, include more abstracted information or more detailed information. The presentation can also include a confidence level that indicates an accuracy with which the predictive values on predictive map 264 or the zones on predictive control zone map 265 conform to measured values that may be measured by sensors on agricultural harvester 100 as agricultural harvester 100 moves through the field. Further where information is presented to more than one location, an authentication or authorization system can be provided to implement authentication and authorization processes. For instance, there may be a hierarchy of individuals that are authorized to view and change maps and other presented information. By way of example, an on-board display device may show the maps in near real time locally on the machine, only, or the maps may also be generated at one or more remote locations. In some examples, each physical display device at each location may be associated with a person or a user permission level. The user permission level may be used to determine which display elements are visible on the physical display device, and which values the corresponding person may change. As an example, a local operator of machine 100 may be unable to see the information corresponding to the predictive map 264 or make any changes to machine operation. A supervisor, at a remote location, however, may be able to see the predictive map 264 on the display, but not make changes. A manager, who may be at a separate remote location, may be able to see all of the elements on predictive map 264 and also change the predictive map 264 that is used in machine control. This is one example of an authorization hierarchy that may be implemented. The predictive map 264 or predictive control zone map 265 or both can be configured in other ways as well, as indicated by block 297.

At block 298, input from geographic position sensor 204 and other in-situ sensors 208 are received by the control system. Block 300 represents receipt by control system 214 of an input from the geographic position sensor 204 identifying a geographic location of agricultural harvester 100. Block 302 represents receipt by the control system 214 of sensor inputs indicative of trajectory or heading of agricultural harvester 100, and block 304 represents receipt by the control system 214 of a speed of agricultural harvester 100. Block 306 represents receipt by the control system 214 of other information from various in-situ sensors 208.

At block 308, control system 214 generates control signals to control the controllable subsystems 216 based on the predictive map 264 or predictive control zone map 265 or both and the input from the geographic position sensor 204 and any other in-situ sensors 208. At block 310, control system 214 applies the control signals to the controllable subsystems 216. It will be appreciated that the particular control signals that are generated, and the particular controllable subsystems 216 that are controlled, may vary based upon one or more different things. For example, the control signals that are generated and the controllable subsystems 216 that are controlled may be based on the type of predictive map 264 or predictive control zone map 265 or both that is being used. Similarly, the control signals that are generated and the controllable subsystems 216 that are controlled, and the timing of the control signals can be based on various latencies of the agricultural harvester 100 and the responsiveness of the controllable subsystems 216.

By way of example, a generated predictive map 264 in the form of a predictive environmental characteristic map can be used to control one or more subsystems 216. For instance, the predictive environmental characteristic map can include environmental characteristic values georeferenced to locations within the field being harvested. The predictive environmental characteristic values from the predictive environmental characteristic map can be extracted and used to control the controllable subsystems 216 of the agricultural harvester 100 as the agricultural harvester 100 moves through the field.

At block 312, a determination is made as to whether the harvesting operation has been completed. If harvesting is not completed the processing advances to block 314 where in-situ sensor data from geographic position sensor 204 and in-situ sensors 208 (and perhaps other sensors) continues to be read.

In some examples, at block 316, agricultural harvester 100 can also detect learning trigger criteria to perform machine learning on one or more of the predictive map 264, predictive control zone map 265, the model generated by predictive model generator 210, the zones generated by control zone generator 213, one or more control algorithms implemented by the controllers in the control system 214, and other triggered learning.

The learning trigger criteria can include any of a wide variety of different criteria. Some examples of detecting trigger criteria are discussed with respect to blocks 318, 320, 321, 322 and 324. For instance, in some examples, triggered learning can involve recreation of a relationship used to generate a predictive model when a threshold amount of in-situ sensor data are obtained from in-situ sensors 208. In such examples, receipt of an amount of in-situ sensor data from the in-situ sensors 208 that exceeds a threshold triggers or causes the predictive model generator 210 to generate a new predictive model that is used by predictive map generator 212. Thus, as agricultural harvester 100 continues a harvesting operation, receipt of the threshold amount of in-situ sensor data from the in-situ sensors 208 triggers the creation of a new relationship represented by a predictive model generated by predictive model generator 210. Further, new predictive map 264, predictive control zone map 265, or both can be regenerated using the new predictive model. Block 318 represents detecting a threshold amount of in-situ sensor data used to trigger creation of a new predictive model.

In other examples, the learning trigger criteria may be based on how much the in-situ sensor data from the in-situ sensors 208 are changing from previous values or from a threshold value. For example, if variations within the in-situ sensor data (or the relationship between the in-situ sensor data and the information in information map 258) is within a range, is less than a defined amount, or below a threshold value, then a new predictive model is not generated by the predictive model generator 210. As a result, the predictive map generator 212 does not generate a new predictive map 264, predictive control zone map 265, or both. However, if variations within the in-situ sensor data exceed the range or exceed the predefined amount or the threshold value, for example, or if a relationship between the in-situ sensor data and the information in information map 258 varies by a defined amount, for example, then the predictive model generator 210 generates a new predictive model using all or a portion of the newly received in-situ sensor data that the predictive map generator 212 uses to generate a new predictive map 264. At block 320, variations in the in-situ sensor data, such as a magnitude of an amount by which the data exceeds the selected range or a magnitude of the variation of the relationship between the in-situ sensor data and the information in the information map 258, can be used as a trigger to cause generation of a new predictive model and predictive map. The threshold, the range and the defined amount can be set to default values, or set by an operator or user interaction through a user interface, or set by an automated system or in other ways.

Other learning trigger criteria can also be used. For instance, if predictive model generator 210 switches to a different information map (different from the originally selected information map 258), then switching to the different information map may trigger re-learning by predictive model generator 210, predictive map generator 212, control zone generator 213, control system 214, or other items. In another example, transitioning of agricultural harvester 100 to a different topography or to a different control zone may be used as learning trigger criteria as well.

In some instances, operator 260, or another user, can also edit the predictive map 264 or predictive control zone map 265 or both. The edits can change a value on the predictive map 264 or, change the size, shape, position or existence of a control zone, or a value on predictive control zone map 265 or both. Block 321 shows that edited information can be used as learning trigger criteria.

In some instances, it may also be that operator 260, or other user, observes that automated control of a controllable subsystem, is not what the operator, or other user, desires. In such instances, the operator 260, or other user, may provide a manual adjustment to the controllable subsystem reflecting that the operator 260, or other user, desires the controllable subsystem to operate in a different way than is being commanded by control system 214. Thus, manual alteration of a setting by the operator 260, or other user, can cause predictive model generator 210 to relearn a model, predictive map generator 212 to regenerate map 264, control zone generator 213 to regenerate the control zones on predictive control zone map 265 and control system 214 to relearn its control algorithm or to perform machine learning on one of the controller components 232-246 in control system 214 based upon the adjustment by the operator 260, as shown in block 322. Block 324 represents the use of other triggered learning criteria.

In other examples, relearning may be performed periodically or intermittently based, for example, upon a selected time interval such as a discrete time interval or a variable time interval. This is indicated by block 326.

If relearning is triggered, whether based upon learning trigger criteria or based upon passage of a time interval, as indicated by block 326, then one or more of the predictive model generator 210, predictive map generator 212, control zone generator 213 and control system 214 performs machine learning to generate new predictive model(s), new predictive map(s), new control zone(s), and new control algorithm(s), respectively, based upon the learning trigger criteria. The new predictive model(s), the new predictive map(s), new control zone(s), and the new control algorithm(s) are generated using any additional data that has been collected since the last learning operation was performed. Performing relearning is indicated by block 328.

If the harvesting operation has been completed, operation moves from block 312 to block 330 where one or more of the predictive map(s) 264, predictive control zone map(s) 265, the predictive model(s) generated by predictive model generator 210, the control zone(s), and the control algorithm(s) are stored. The predictive map(s) 264, predictive control zone map(s) 265, predictive model(s), control zone(s), and control algorithm(s) may be stored locally on data store 202 or sent to a remote system using communication system 206 for later use.

It will be noted that while some examples herein describe predictive model generator 210 and predictive map generator 212 receiving an information map in generating a predictive model and a functional predictive map, respectively, in other examples, the predictive model generator 210 and predictive map generator 212 can receive other types of maps, including predictive maps, such as a functional predictive map generated during the harvesting operation.

Figure 4A:
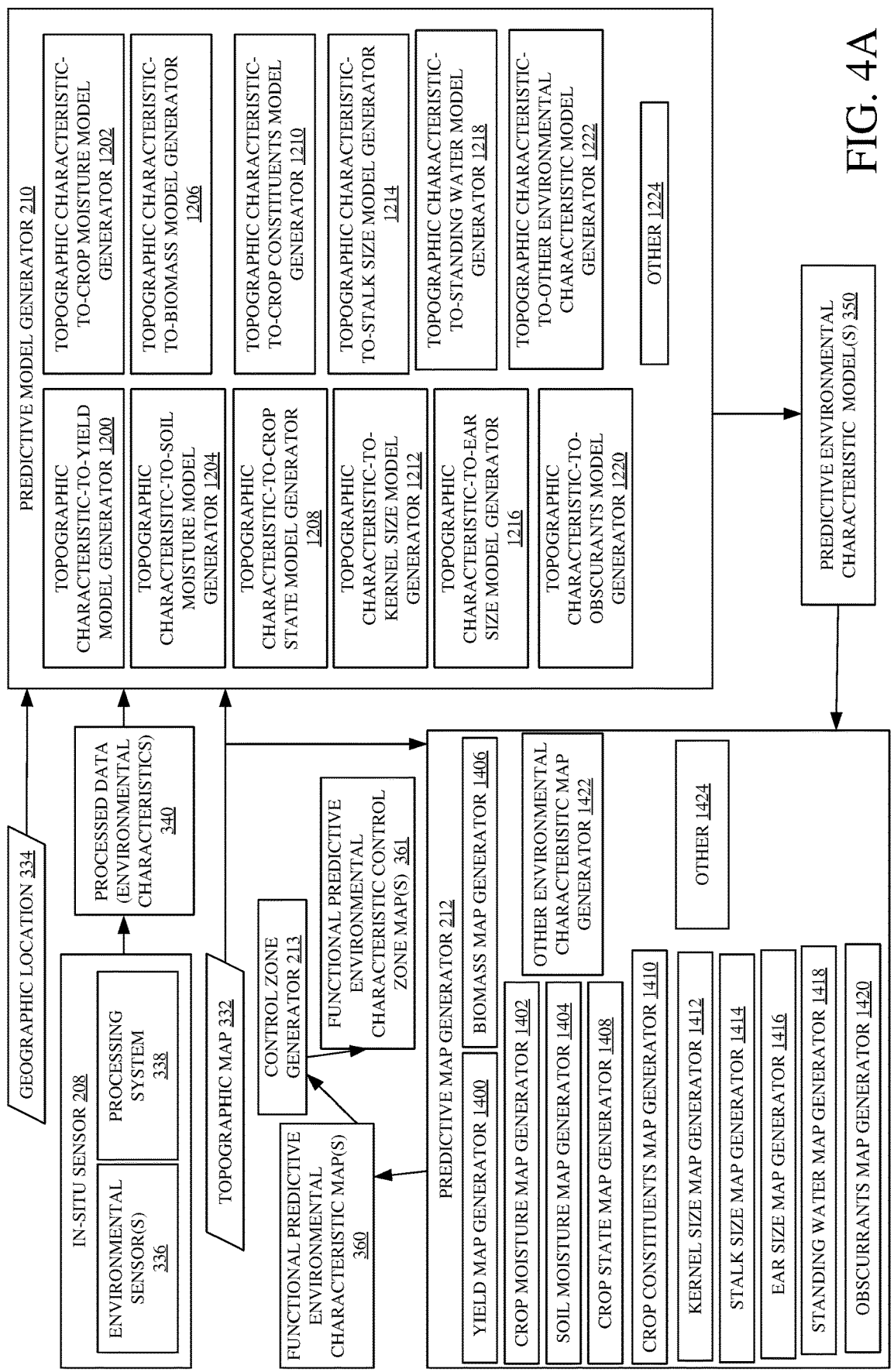
FIG. 4A is a block diagram showing one example of a predictive model generator and a predictive map generator.

FIG. 4A is a block diagram of a portion of the agricultural system 200 shown in FIG. 2. Particularly, FIG. 4A shows, among other things, examples of the predictive model generator 210 and the predictive map generator 212 in more detail. FIG. 4A also illustrates information flow among the various components shown. The predictive model generator 210 receives a topographic map 332 as an information map 258. Predictive model generator 210 also receive a geographic location 334, or an indication of geographic location, from geographic position sensor 204. In-situ sensors 208 illustratively include one or environmental sensors, such as environmental sensors 336, as well as a processing system 338. In some instances, environmental sensors 336 may be located on board the agricultural harvester 100. The processing system 338 processes sensor data generated from environmental sensors 336 to generate processed data. Prior to continuing the discussion of FIG. 4A, reference will now be drawn to FIG. 4B which is a block diagram showing some examples of environmental sensors 336.

Figure 4B:
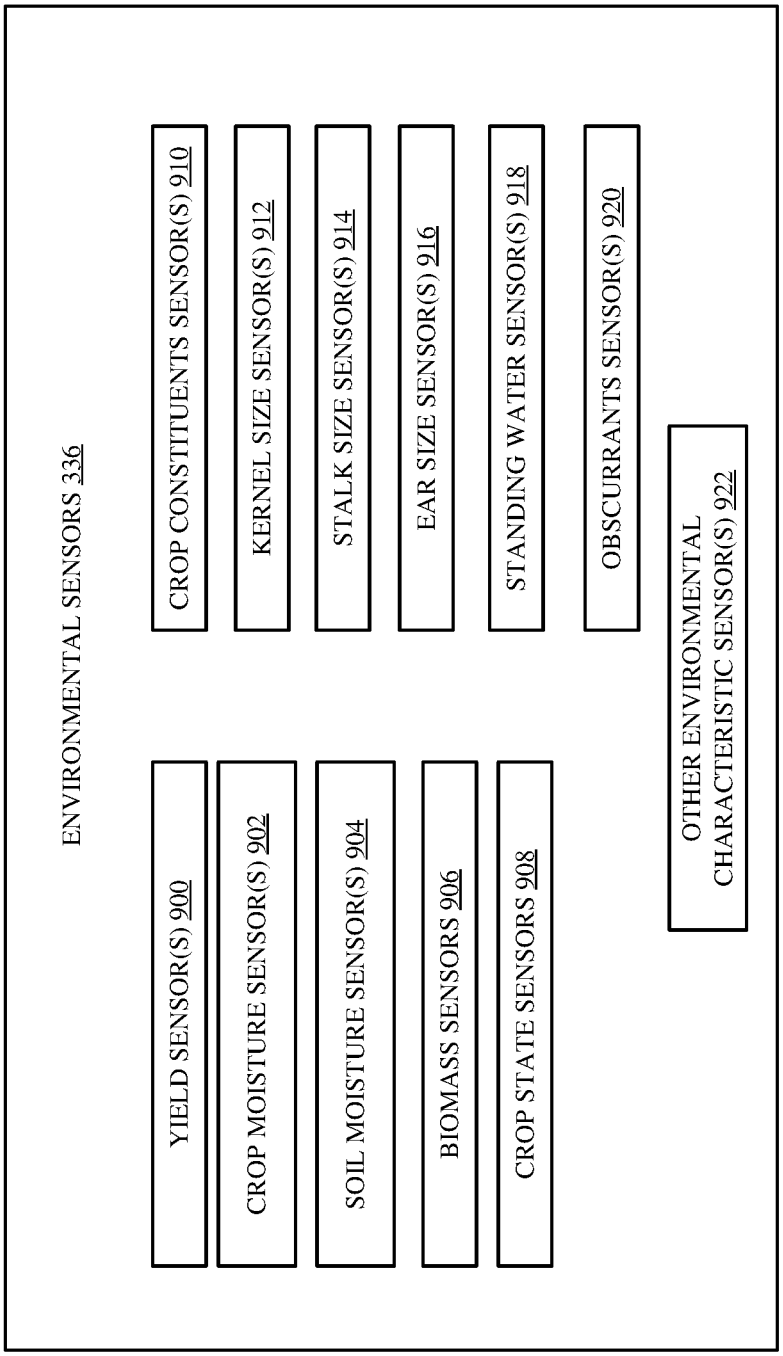
FIG. 4B is a block diagram showing in-situ environmental characteristic sensors.

As illustrated in FIG. 4B, environmental characteristic sensors 336 include one or more yield sensors 900, one or more crop moisture sensors 902, one or more soil moisture sensors 904, one or more biomass sensors 906, one or more crop state sensors 908, one or more crop constituents sensors 910, one or more kernel size sensors 912, one or more stalk size sensors 914, one or more ear size sensors 916, one or more standing water sensors 918, one or more obscurants sensors 920, and can include one or more other environmental characteristic sensors 922.

Yield sensors 900 illustratively detect a characteristic indicative of yield. Yield sensors 900 may include one or more of: a camera or optical sensor that detects a fill level of the clean grain tank; a camera or optical sensor that detects a flow of clean grain into clean grain tank; mass or load sensors that sense a mass of grain in the clean grain tank; mass flow sensors that sense a flow of clean grain into clean gain tank; as well as a variety of other types of yield sensors. Processing system 338 processes the sensor data (e.g., signals, images, etc.) generated by yield sensors 900 to generate processed data identifying a yield value (or sensor value indicative of yield), as an environmental characteristic value.

Crop moisture sensors 902 illustratively detect a characteristic indicative of crop moisture. Crop moisture may be measured for the entire crop material, for only grain, for only material-other-than grain, or for any other portion of the crop. Crop moisture sensors 902 can include, for example, a capacitive moisture sensor, a microwave sensor, or a conductivity sensor. In other examples, crop moisture sensors 902 may include sensors that detect a color of the crop plant, such as the "greenness" or "brownness" (or distribution of green and brown). In other examples, crop moisture sensors 902 may measure properties by utilizing electric fields or electromagnetic waves that interact with water molecules of the crop. Without limitation these properties may include permittivity, resonance, reflection, absorption, or transmission. Crop moisture sensors 902 may be disposed along the flow path of the crop material, such as disposed in the feeder house, on the clean grain elevator, as well as various other locations. In some examples, crop moisture sensors 902 may include a separate measurement cell to which crop material is diverted for sampling. Various other types of crop moisture sensors 902 are contemplated. Processing system 338 processes the sensor data generated by crop moisture sensors 902 to generate processed data identifying a crop moisture value (or sensor value indicative of crop moisture), as an environmental characteristic value.

Soil moisture sensors 904 illustratively detect a characteristic indicative of soil moisture. Soil moisture sensors 904 can include, for example, one or more cameras (e.g., forward looking cameras) or optical sensors (e.g., forward looking optical sensors). In one example, soil moisture sensors 904 can include a thermal imager that detects a thermal characteristic of the soil at the field. In other examples, soil moisture sensors 904 may include a probe or other device that contacts the soil, such as a capacitive soil moisture sensor. Various other types of soil moisture sensors 904 are contemplated. Processing system 338 processes the sensor data generated by the soil moisture sensors 904 to generate processed data identifying a soil moisture value (or sensor value indicative of soil moisture), as an environmental characteristic value.

Biomass sensors 906 illustratively detect a characteristic indicative of biomass. In some examples, biomass sensors 906 can include a force sensor that senses a force (e.g., fluid pressure, torque, etc.) used to drive threshing rotor 112. In some examples, biomass sensors 906 can include a camera or optical sensor that generates images of the crop plants ahead of agricultural harvester 100. Various other types of biomass sensors 906 are contemplated. Processing system 338 processes the sensor data generated by biomass sensors 906 to generate processed data identifying a biomass value (or sensor value indicative of biomass), as an environmental characteristic value.

Crop state sensors 908 illustratively detect a characteristic indicative of crop state. Crop state refers to whether a crop plant is standing, down, partially down, and, if the crop is down or partially down, the magnitude and direction of the downing. Crop state sensors 908 can include a camera (such as forward looking camera) or an optical sensor (such as a forward looking optical sensor) that generates sensor data (e.g., signals, images, etc.) indicative of the crop state of crop. Various other types of crop state sensors 908 are contemplated. Processing system 338 processes the sensor data generated by crop state sensors 908 to generate processed sensor data identifying a crop state value (or sensor value indicative of crop state), as an environmental characteristic value.

Crop constituents sensors 910 illustratively detect an amount (e.g., concentration) of constituents (e.g., starch, protein, oil, etc.) of crop. Crop constituents sensors 910 utilize one or more bands of electromagnetic radiation. For example, a crop constituent sensor 910 can utilize the reflection or absorption of various ranges (e.g., various wavelengths or frequencies, or both) of electromagnetic radiation by crop or other vegetation material in detecting crop constituents. In some examples, crop constituent sensors 910 can include an optical sensor, such as an optical spectrometer. In one example, a crop constituent sensor 910 utilizes near-infrared spectroscopy and near-infrared spectroscopy. Various other types of crop constituents sensors 910 are contemplated. Processing system 338 processes the sensor data generated by crop state sensors 910 to generate processed sensor data identifying a crop constituent value (or sensor value indicative of crop constituents), as an environmental characteristic value.

Kernel size sensors 912 illustratively detect a characteristic indicative of size of a kernel (or grain). Kernel size sensors 912 can include one or more cameras (e.g., clean grain camera), optical sensors, capacitive sensors, electromagnetic or ultrasonic time of flight reflective sensors, signal attenuation sensors, weight or mass sensors, material flow sensors, etc. Kernel size sensors 912 can be placed at one or more locations in agricultural harvester 100. Various other types of kernel size sensors 912 are contemplated herein. Processing system 338 processes the sensor data generated by kernel size sensors 912 to generate processed sensor data identifying a kernel size value (or sensor value indicative of crop state), as an environmental characteristic value.

Stalk size sensors 914 illustratively detect a characteristic indicative of a size (e.g., diameter) of stalks of crop plants. Stalk size sensors 914 can include one or more cameras (e.g., forward looking camera) or optical sensors (e.g., forward looking optical sensors). In some examples, stalk size sensors 914 can include a moveable member which contacts and is displaced by the stalks. The displacement of the moveable member (or force acting against the moveable member) can be measured to indicate a stalk size. Such measurement may utilize appropriate sensing technology, such as a sensing device utilizing the piezoelectric effect, a potentiometer, or a light barrier encoder. In other examples, the deck plates may be displaced by contact with the crop stalks, the displacement of the deck plates (or force acting against the deck plates) can be measured. Such measurement may utilize appropriate sensing technology, such as a sensing device utilizing the piezoelectric effect, a potentiometer, or a light barrier encoder. Various other types of stalk size sensors 914 are contemplated. Processing system 338 processes the sensor data generated by stalk size sensors 914 to generate processed sensor data identifying a stalk size value (or sensor value indicative of stalk size), as an environmental characteristic value.

Ear size sensors 916 illustratively detect a characteristic indicative of a size (e.g., one or more of diameter and length) of ears of crop plants. Ear size sensors 916 can include one or more cameras (e.g., forward looking camera) or optical sensors (e.g., forward looking optical sensors). Various other types of ear size sensors 916 are contemplated. Processing system 338 processes the sensor data generated by ear size sensors 916 to generate processed sensor data identifying an ear size value (or sensor value indicative of ear size), as an environmental characteristic value.

Standing water sensors 918 illustratively detect a characteristic indicative of an amount of standing water, that is, an amount of water on the surface of the field. Standing water sensors 918 can include one or more cameras (e.g., forward looking camera) or optical sensors (e.g., forward looking optical sensors). In some examples, standing water sensors 918 may utilize one or more bands of electromagnetic radiation. In one example, standing water sensors 918 may include a thermal camera that detects a thermal characteristic of the field. Various other types of standing water sensors 918 are contemplated. Processing system 338 processes the sensor data generated by standing water sensors 918 to generate processed sensor data identifying a standing water value (or sensor value indicative of standing water), as an environmental characteristic value.

Obscurants sensors 920 illustratively detect a characteristic indicative of an amount of obscurants in the air at the field. Obscurants sensors 920 can include one or more cameras (e.g., forward looking camera) or optical sensors (e.g., forward looking optical sensors. Various other types of obscurants sensors 920 are contemplated. Processing system 338 processes the sensor data generated by obscurants sensors 920 to generate processed sensor data identifying an obscurants value (or sensor value indicative of obscurants), as environmental characteristic value.

It will also be understood that processing system 338 can geolocate the values received from the environmental characteristic sensors 336 (as well as other in-situ sensors) to a location on the field. For example, the location of the agricultural harvester 100 at the time sensor data (e.g., signal, image, etc.) from an environmental characteristic sensor 336 is received is typically not the accurate location of the environmental characteristic. This may be because an amount of time elapses between when the agricultural harvester 100 makes contact with area of the field or the plant on the field and when the environmental characteristic is detected by the environmental sensor 336. As an illustrative example, a yield value derived from sensor data generated by yield sensors 900 may correspond to an area behind the agricultural harvester 100 (relative to its direction of travel). This is because of the time delay between when the crop (to which the yield corresponds) was encountered by the agricultural harvester 100 and when the crop was detected by the yield sensor 900. Thus, this latency (time delay) is taken into account when georeferencing the sensed data. Additionally, the heading and speed of the agricultural harvester 100 can also be taken into account. In other examples, the environmental characteristic value derived from the environmental sensor data may correspond to an area ahead of the agricultural harvester 100. As an illustrative example, an environmental characteristic sensor 336 in the form of a forward looking camera or optical sensor (or other type of sensor sensing ahead of the agricultural harvester 100) may detect environmental characteristics corresponding to a geographic location ahead of the agricultural harvester 100. Thus, the geographic location of the agricultural harvester at the time the environmental characteristic is detected may be behind (relative to the direction of travel of the agricultural harvester 100) the geographic location to which the environmental characteristic corresponds. In such an example, the distance between the environmental characteristic sensor 336 and the geographic location can be derived from the sensor data. These are merely some examples. It will be understood that the values received from the environmental sensors 336 can be geolocated to a location on the field.

It will also be understood that while the various environmental characteristic sensors 336 are listed separately, in other examples, the same sensor may be used to generate sensor data indicative of more than one environmental characteristic, for instance, a camera or optical sensor may generate an image that is indicative of multiple different environmental characteristics.

Various other environmental characteristics sensors 922 that detect various other environmental characteristics may also be used. In some examples, raw or processed data from environmental sensors 336 may be presented to operator 260 via operator interface mechanism 218, or to another user. Operator 260 may be on-board the agricultural harvester 100 or at a remote location.

Discussion will now return to FIG. 4A. As shown in FIG. 4A, the example predictive model generator 210 includes one or more of a topographic characteristic-to-yield model generator 1200, a topographic characteristic-to-crop moisture model generator 1202, a topographic characteristic-to-soil moisture model generator 1204, a topographic characteristic-to-biomass model generator 1206, a topographic characteristic-to-crop state model generator 1208, a topographic characteristic-to-crop constituents model generator 1210, a topographic characteristic-to-kernel size model generator 1212, a topographic characteristic-to-stalk size model generator 1214, a topographic characteristic-to-ear size model generator 1216, a topographic characteristic-to-standing water model generator 1218, a topographic characteristic-to-obscurants model generator 1220, and a topographic characteristic-to-other environmental characteristic model generator 1222. In other examples, the predictive model generator 210 may include additional, fewer, or different components than those shown in the example of FIG. 4A. Consequently, in some examples, the predictive model generator 210 may include other items 1224 as well, which may include other types of predictive model generators to generate other types of environmental characteristic models.

The present discussion proceeds with respect to an example in which environmental characteristic sensor 336 is a yield sensor 900. Topographic characteristic-to-yield model generator 1200 identifies a relationship between yield value(s) detected in processed sensor data 340, at geographic location(s) to which the yield value(s) correspond, and topographic characteristic value(s) from the topographic map 332 corresponding to the same location(s) in the field where the yield value(s) correspond. Based on this relationship established by topographic characteristic-to-yield model generator 1200, topographic characteristic-to-yield model generator 1200 generates a predictive yield model, as an example of a predictive environmental characteristic model 350. The predictive yield model is used by yield map generator 1400 to predict yield values at different locations in the worksite based upon the georeferenced topographic characteristic value contained in the topographic map 332 at the different locations in the field. Thus, for a given location in the field, a yield value can be predicted at the given location based on the predictive yield model and the topographic characteristic value, from the topographic map 332, at that given location.

The present discussion proceeds with respect to an example in which environmental characteristic sensor 336 is a yield sensor 900. Topographic characteristic-to-yield model generator 1200 identifies a relationship between yield value(s) detected in processed sensor data 340, at geographic location(s) to which the yield value(s) correspond, and topographic characteristic value(s) from the topographic map 332 corresponding to the same location(s) in the field where the yield value(s) correspond. Based on this relationship established by topographic characteristic-to-yield model generator 1200, topographic characteristic-to-yield model generator 1200 generates a predictive yield model, as an example of a predictive environmental characteristic model 350. The predictive yield model is used by yield map generator 1400 to predict yield values at different locations in the worksite based upon the georeferenced topographic characteristic value contained in the topographic map 332 at the different locations in the field. Thus, for a given location in the field, a yield value can be predicted at the given location based on the predictive yield model and the topographic characteristic value, from the topographic map 332, at that given location.

The present discussion proceeds with respect to an example in which environmental characteristic sensor 336 is a crop moisture sensor 902. Topographic characteristic-to-crop moisture model generator 1202 identifies a relationship between crop moisture value(s) detected in processed sensor data 340, at geographic location(s) to which the crop moisture value(s) correspond, and topographic characteristic value(s) from the topographic map 332 corresponding to the same location(s) in the field where the crop moisture value(s) correspond. Based on this relationship established by topographic characteristic-to-crop moisture model generator 1202, topographic characteristic-to-crop moisture model generator 1202 generates a predictive crop moisture model, as an example of a predictive environmental characteristic model 350. The predictive crop moisture model is used by crop moisture map generator 1402 to predict crop moisture values at different locations in the worksite based upon the georeferenced topographic characteristic value contained in the topographic map 332 at the different locations in the field. Thus, for a given location in the field, a crop moisture value can be predicted at the given location based on the predictive crop moisture model and the topographic characteristic value, from the topographic map 332, at that given location.

The present discussion proceeds with respect to an example in which environmental characteristic sensor 336 is a soil moisture sensor 904. Topographic characteristic-to-soil moisture model generator 1204 identifies a relationship between soil moisture value(s) detected in processed sensor data 340, at geographic location(s) to which the soil moisture value(s) correspond, and topographic characteristic value(s) from the topographic map 332 corresponding to the same location(s) in the field where the crop moisture value(s) correspond. Based on this relationship established by topographic characteristic-to-soil moisture model generator 1204, topographic characteristic-to-soil moisture model generator 1200 generates a predictive soil moisture model, as an example of a predictive environmental characteristic model 350. The predictive soil moisture model is used by soil moisture map generator 1404 to predict soil moisture values at different locations in the worksite based upon the georeferenced topographic characteristic value contained in the topographic map 332 at the different locations in the field. Thus, for a given location in the field, a soil moisture value can be predicted at the given location based on the predictive soil moisture model and the topographic characteristic value, from the topographic map 332, at that given location.

The present discussion proceeds with respect to an example in which environmental characteristic sensor 336 is a biomass sensor 906. Topographic characteristic-to-biomass model generator 1206 identifies a relationship between biomass value(s) detected in processed sensor data 340, at geographic location(s) to which the biomass value(s) correspond, and topographic characteristic value(s) from the topographic map 332 corresponding to the same location(s) in the field where the biomass value(s) correspond. Based on this relationship established by topographic characteristicto-biomass model generator 1206, topographic characteristic-to-biomass model generator 1206 generates a predictive biomass model, as an example of a predictive environmental characteristic model 350. The predictive biomass model is used by biomass map generator 1406 to predict biomass values at different locations in the worksite based upon the georeferenced topographic characteristic value contained in the topographic map 332 at the different locations in the field. Thus, for a given location in the field, a biomass value can be predicted at the given location based on the predictive biomass model and the topographic characteristic value, from the topographic map 332, at that given location.

The present discussion proceeds with respect to an example in which environmental characteristic sensor 336 is a crop state sensor 908. Topographic characteristic-to-crop state model generator 1208 identifies a relationship between crop state value(s) detected in processed sensor data 340, at geographic location(s) to which the crop state value(s) correspond, and topographic characteristic value(s) from the topographic map 332 corresponding to the same location(s) in the field where the crop state value(s) correspond. Based on this relationship established by topographic characteristic-to-crop state model generator 1208, topographic characteristic-to-crop state model generator 1208 generates a predictive crop state model, as an example of a predictive environmental characteristic model 350. The predictive crop state model is used by crop state map generator 1408 to predict crop state values at different locations in the worksite based upon the georeferenced topographic characteristic value contained in the topographic map 332 at the different locations in the field. Thus, for a given location in the field, a crop state value can be predicted at the given location based on the predictive crop state model and the topographic characteristic value, from the topographic map 332, at that given location.

The present discussion proceeds with respect to an example in which environmental characteristic sensor 336 is a crop constituents sensor 910. Topographic characteristic-to-crop constituents model generator 1210 identifies a relationship between crop constituents value(s) detected in processed sensor data 340, at geographic location(s) to which the crop constituents value(s) correspond, and topographic characteristic value(s) from the topographic map 332 corresponding to the same location(s) in the field where the crop constituents value(s) correspond. Based on this relationship established by topographic characteristic-to-crop constituents model generator 1210, topographic characteristic-to-crop constituents model generator 1210 generates a predictive crop constituents model, as an example of a predictive environmental characteristic model 350. The predictive crop constituents model is used by crop constituents map generator 1410 to predict crop constituents values at different locations in the worksite based upon the georeferenced topographic characteristic value contained in the topographic map 332 at the different locations in the field. Thus, for a given location in the field, a crop constituent value can be predicted at the given location based on the predictive crop constituents model and the topographic characteristic value, from the topographic map 332, at that given location.

The present discussion proceeds with respect to an example in which environmental characteristic sensor 336 is a kernel size sensor 912. Topographic characteristic-to-kernel size model generator 1212 identifies a relationship between kernel size value(s) detected in processed sensor data 340, at geographic location(s) to which the kernel size value(s) correspond, and topographic characteristic value(s) from the topographic map 332 corresponding to the same location(s) in the field where the kernel size value(s) correspond. Based on this relationship established by topographic characteristic-to-kernel size model generator 1212, topographic characteristic-to-kernel size model generator 1212 generates a predictive kernel size model, as an example of a predictive environmental characteristic model 350. The predictive kernel size model is used by kernel size map generator 1412 to predict kernel size values at different locations in the worksite based upon the georeferenced topographic characteristic value contained in the topographic map 332 at the different locations in the field. Thus, for a given location in the field, a kernel value can be predicted at the given location based on the predictive kernel size model and the topographic characteristic value, from the topographic map 332, at that given location.

The present discussion proceeds with respect to an example in which environmental characteristic sensor 336 is a stalk size sensor 914. Topographic characteristic-to-stalk size model generator 1214 identifies a relationship between stalk size value(s) detected in processed sensor data 340, at geographic location(s) to which the stalk size value(s) correspond, and topographic characteristic value(s) from the topographic map 332 corresponding to the same location(s) in the field where the stalk size value(s) correspond. Based on this relationship established by topographic characteristic-to-stalk size model generator 1214, topographic characteristic-to-stalk size model generator 1214 generates a predictive stalk size model, as an example of a predictive environmental characteristic model 350. The predictive stalk size model is used by stalk size map generator 1414 to predict stalk size values at different locations in the worksite based upon the georeferenced topographic characteristic value contained in the topographic map 332 at the different locations in the field. Thus, for a given location in the field, a stalk size value can be predicted at the given location based on the predictive stalk size model and the topographic characteristic value, from the topographic map 332, at that given location.

The present discussion proceeds with respect to an example in which environmental characteristic sensor 336 is an ear size sensor 916. Topographic characteristic-to-ear size model generator 1216 identifies a relationship between ear size value(s) detected in processed sensor data 340, at geographic location(s) to which the ear size value(s) correspond, and topographic characteristic value(s) from the topographic map 332 corresponding to the same location(s) in the field where the ear size value(s) correspond. Based on this relationship established by topographic characteristic-to-ear size model generator 1216, topographic characteristic-to-ear size model generator 1216 generates a predictive ear size model, as an example of a predictive environmental characteristic model 350. The predictive ear size model is used by ear size map generator 1416 to predict ear size values at different locations in the worksite based upon the georeferenced topographic characteristic value contained in the topographic map 332 at the different locations in the field. Thus, for a given location in the field, an ear size value can be predicted at the given location based on the predictive ear size model and the topographic characteristic value, from the topographic map 332, at that given location.

The present discussion proceeds with respect to an example in which environmental characteristic sensor 336 is a standing water sensor 918. Topographic characteristic-to-standing water model generator 1218 identifies a relationship between standing water value(s) detected in processed sensor data 340, at geographic location(s) to which the standing water value(s) correspond, and topographic characteristic value(s) from the topographic map 332 corresponding to the same location(s) in the field where the standing water value(s) correspond. Based on this relationship established by topographic characteristic-to-standing water model generator 1218, topographic characteristic-to-standing water model generator 1218 generates a predictive standing water model, as an example of a predictive environmental characteristic model 350. The predictive standing water model is used by standing water map generator 1418 to predict standing water values at different locations in the worksite based upon the georeferenced topographic characteristic value contained in the topographic map 332 at the different locations in the field. Thus, for a given location in the field, a standing water value can be predicted at the given location based on the predictive standing water model and the topographic characteristic value, from the topographic map 332, at that given location.

The present discussion proceeds with respect to an example in which environmental characteristic sensor 336 is an obscurants sensor 920. Topographic characteristic-to-obscurants model generator 1220 identifies a relationship between obscurants value(s) detected in processed sensor data 340, at geographic location(s) to which the obscurants value(s) correspond, and topographic characteristic value(s) from the topographic map 332 corresponding to the same location(s) in the field where the obscurants value(s) correspond. Based on this relationship established by topographic characteristic-to-obscurants model generator 1220, topographic characteristic-to-obscurants model generator 1220 generates a predictive obscurants model, as an example of a predictive environmental characteristic model 350. The predictive obscurants model is used by obscurants map generator 1420 to predict obscurants values at different locations in the worksite based upon the georeferenced topographic characteristic value contained in the topographic map 332 at the different locations in the field. Thus, for a given location in the field, an obscurant value can be predicted at the given location based on the predictive obscurants model and the topographic characteristic value, from the topographic map 332, at that given location.

The present discussion proceeds with respect to an example in which environmental characteristic sensor 336 is an other environmental characteristic sensor 922. Topographic characteristic-to-other environmental characteristic model generator 1222 identifies a relationship between other environmental characteristic value(s) detected in processed sensor data 340, at geographic location(s) to which the other environmental characteristic value(s) correspond, and topographic characteristic value(s) from the topographic map 332 corresponding to the same location(s) in the field where the other environmental characteristic value(s) correspond. Based on this relationship established by topographic characteristic-to-other environmental characteristic model generator 1222, topographic characteristic-to-other environmental characteristic model generator 1222 generates a predictive other environmental characteristic model, as an example of a predictive environmental characteristic model 350. The predictive other environmental characteristic model is used by other environmental characteristic map generator 1422 to predict other environmental characteristic values at different locations in the worksite based upon the georeferenced topographic characteristic value contained in the topographic map 332 at the different locations in the field. Thus, for a given location in the field, an other environmental characteristic value can be predicted at the given location based on the predictive other environmental characteristic model and the topographic characteristic value, from the topographic map 332, at that given location.

In light of the above, the predictive model generator 210 is operable to produce a plurality of predictive environmental characteristic models, such as one or more of the predictive environmental characteristic models generated by model generators 1200, 1202, 1204, 1206, 1208, 1210, 1212, 1214, 1216, 1218, 1220, 1222, and 1224. In another example, two or more of the predictive environmental characteristic models generated by model generators 1200, 1202, 1204, 1206, 1208, 1210, 1212, 1214, 1216, 1218, 1220, 1222, and 1224 may be combined into a single predictive environmental characteristic model that predicts two or more environmental characteristic, such as two or more of yield, crop moisture, soil moisture, biomass, crop state, crop constituents, kernel size, stalk size, ear size, standing water, obscurants, and another environmental characteristic based upon the topographic characteristics at different locations in the field. Any of these environmental characteristic models, or combinations thereof, are represented collectively by environmental characteristic model 350 in FIG. 4A.

The predictive environmental characteristic model 350 is provided to predictive map generator 212. In the example of FIG. 4A, predictive map generator 212 includes a yield map generator 1400, a crop moisture map generator 1402, a soil moisture map generator 1404, a biomass map generator 1406, a crop state map generator 1408, a crop constituents map generator 1410, a kernel size map generator 1412, a stalk size map generator 1414, an ear size map generator 1416, a standing water map generator 1418, an obscurants map generator 1420, and an other environmental characteristic map generator 1422. In other examples, the predictive map generator 212 may include additional, fewer, or different map generators. Thus, in some examples, the predictive map generator 212 may include other items 1424 which may include other types of map generators to generate environmental characteristic maps for other types of environmental characteristics.

Yield map generator 1400 receives the predictive environmental characteristic model 350 (e.g., predictive yield model), which predicts yield based upon topographic characteristics from the topographic map 332, and generates a predictive yield map, as an example of a functional predictive environmental characteristic map 360, that predicts yield at different locations in the field.

Crop moisture map generator 1402 receives the predictive environmental characteristic model 350 (e.g., predictive crop moisture model), which predicts crop moisture based upon topographic characteristics from the topographic map 332, and generates a predictive crop moisture map, as an example of a functional predictive environmental characteristic map 360, that predicts crop moisture at different locations in the field.

Soil moisture map generator 1404 receives the predictive environmental characteristic model 350 (e.g., predictive soil moisture model), which predicts soil moisture based upon topographic characteristics from the topographic map 332, and generates a predictive soil moisture map, as an example of a functional predictive environmental characteristic map 360, that predicts soil moisture at different locations in the field.

Biomass map generator 1406 receives the predictive environmental characteristic model 350 (e.g., predictive biomass model), which predicts biomass based upon topographic characteristics from the topographic map 332, and generates a predictive biomass map, as an example of a functional predictive environmental characteristic map 360, that predicts biomass at different locations in the field.

Crop state map generator 1408 receives the predictive environmental characteristic model 350 (e.g., predictive crop state model), which predicts crop state based upon topographic characteristics from the topographic map 332, and generates a predictive crop state map, as an example of a functional predictive environmental characteristic map 360, that predicts crop state at different locations in the field.

Crop constituents map generator 1410 receives the predictive environmental characteristic model 350 (e.g., predictive crop constituents model), which predicts crop constituents based upon topographic characteristics from the topographic map 332, and generates a predictive crop constituents map, as an example of a functional predictive environmental characteristic map 360, that predicts crop constituents at different locations in the field.

Kernel size map generator 1412 receives the predictive environmental characteristic model 350 (e.g., predictive kernel size model), which predicts kernel size based upon topographic characteristics from the topographic map 332, and generates a predictive kernel size map, as an example of a functional predictive environmental characteristic map 360, that predicts kernel size at different locations in the field.

Stalk size map generator 1414 receives the predictive environmental characteristic model 350 (e.g., predictive stalk size model), which predicts stalk size based upon topographic characteristics from the topographic map 332, and generates a predictive stalk size map, as an example of a functional predictive environmental characteristic map 360, that predicts stalk size at different locations in the field.

Ear size map generator 1416 receives the predictive environmental characteristic model 350 (e.g., predictive ear size model), which predicts ear size based upon topographic characteristics from the topographic map 332, and generates a predictive ear size map, as an example of a functional predictive environmental characteristic map 360, that predicts ear size at different locations in the field.

Standing water map generator 1418 receives the predictive environmental characteristic model 350 (e.g., predictive standing water model), which predicts standing water based upon topographic characteristics from the topographic map 332, and generates a predictive standing water map, as an example of a functional predictive environmental characteristic map 360, that predicts standing at different locations in the field.

Obscurants map generator 1420 receives the predictive environmental characteristic model 350 (e.g., predictive obscurants model), which predicts obscurants based upon topographic characteristics from the topographic map 332, and generates a predictive obscurants map, as an example of a functional predictive environmental characteristic map 360, that predicts obscurants at different locations in the field.

Other environmental characteristic map generator 1422 receives the predictive environmental characteristic model 350 (e.g., predictive other environmental characteristic model), which predicts an other environmental characteristic based upon topographic characteristics from the topographic map 332, and generates a predictive other environmental characteristic map, as an example of a functional predictive environmental characteristic map 360, that predicts an other environmental characteristic at different locations in the field.

Predictive map generator 212 outputs one or more functional predictive environmental characteristic maps 360 that are predictive of an environmental characteristic. Each of the functional predictive environmental characteristic maps 360 predicts the respective environmental characteristic at different locations in a field. The functional predictive environmental characteristic maps 360 are examples of a predictive map 264.

It will be understood that, in some examples, the functional predictive environmental characteristic map 360 may include two or more different map layers. Each map layer may represent a different data type, for instance, a functional predictive environmental characteristic map 360 that provides two or more of a map layer that provides predictive yield values based on topographic characteristic values from topographic map 332, a map layer that provides predictive crop moisture values based on topographic characteristic values from topographic map 332, a map layer that provides predictive soil moisture values based on topographic characteristic values from topographic map 332, a map layer that provides predictive biomass values based on topographic characteristic values from topographic map 332, a map layer that provides predictive crop state values based on topographic characteristic values from topographic map 332, a map layer that provides predictive crop constituents values based on topographic characteristic values from topographic map 332, a map layer that provides predictive kernel size values based on topographic characteristic values from topographic map 332, a predictive map layer that provides predictive stalk size values based on topographic characteristic values from topographic map 332, a map layer that provides predictive ear size values based on topographic characteristic values from topographic map 332, a map layer that provides predictive standing water values based on topographic characteristic values from topographic map 332, a map layer that provides predictive obscurants values based on topographic characteristic values from topographic map 332, and a map layer that provides predictive other environmental characteristic values based on topographic characteristic values from topographic map 332. In some examples, the functional predictive environmental characteristic map 360 may include a map layer that provides predictive values of two or more environmental characteristic values (e.g., two or more of yield values, crop moisture values, soil moisture values, biomass values, crop state values, crop constituents values, kernel size values, stalk size values, ear size values, standing water values, obscurants values, and other environmental characteristic values) based on topographic characteristic values from topographic map 332.

Each of the generated functional predictive environmental characteristic maps 360 may be provided to control zone generator 213, control system 214, or both. Control zone generator 213 generates control zones and incorporates those control zones into the functional predictive environmental characteristic map 360 to produce a respective predictive control zone map 265, that is a respective functional predictive environmental characteristic control zone map 361. One or both of functional predictive environmental characteristic map 360 and functional predictive environmental characteristic control zone map may be provided to control system 214, which generates control signals to control one or more of the controllable subsystems 216 based upon the functional predictive environmental characteristic map 360, functional predictive environmental characteristic control zone map 361, or both.

Figure 5A:
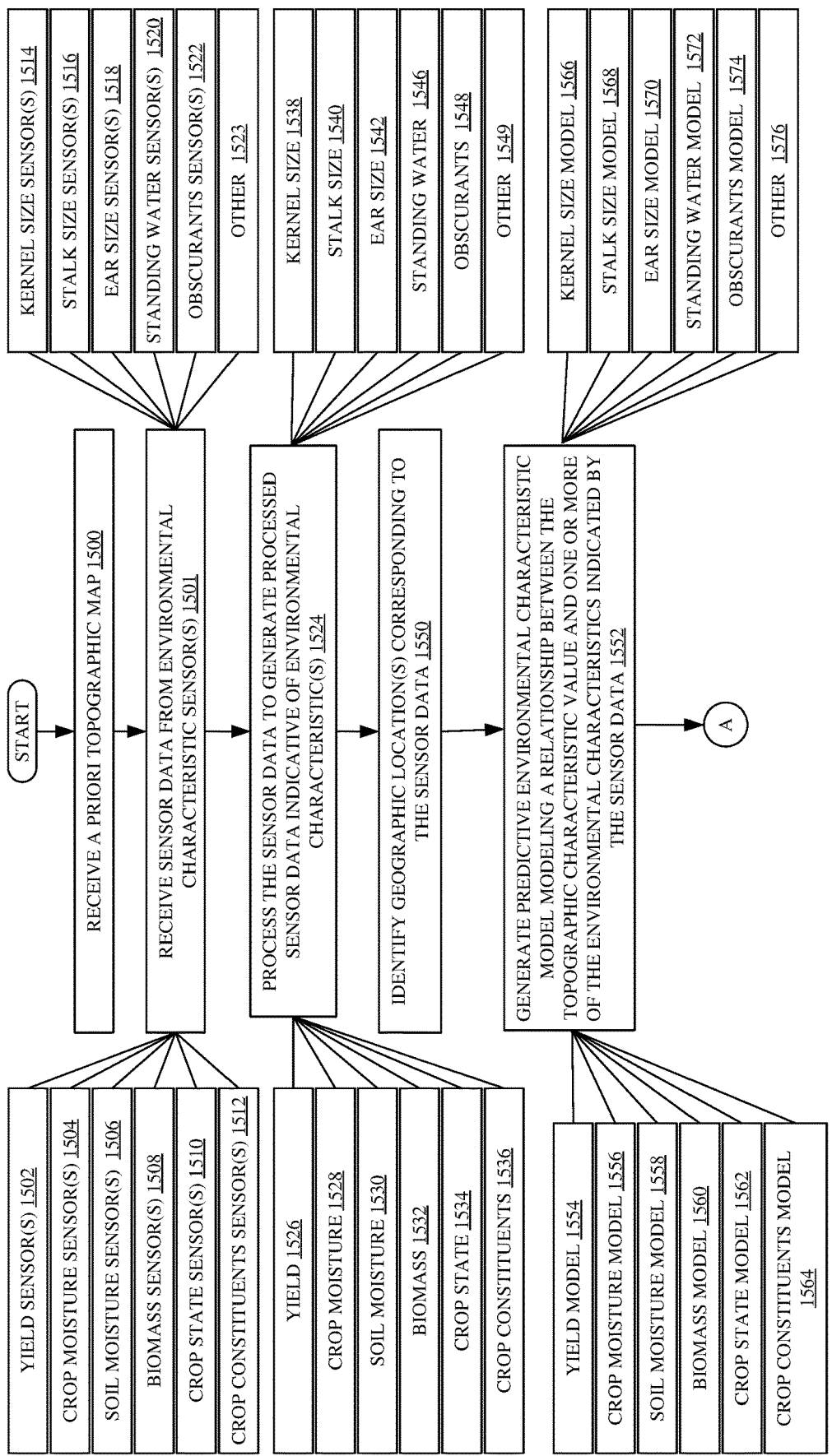
FIG. 5A-5B (collectively referred to herein as FIG. 5) show a flow diagram illustrating an example of operation of a predictive model generator and predictive map generator.
Figure 5B:
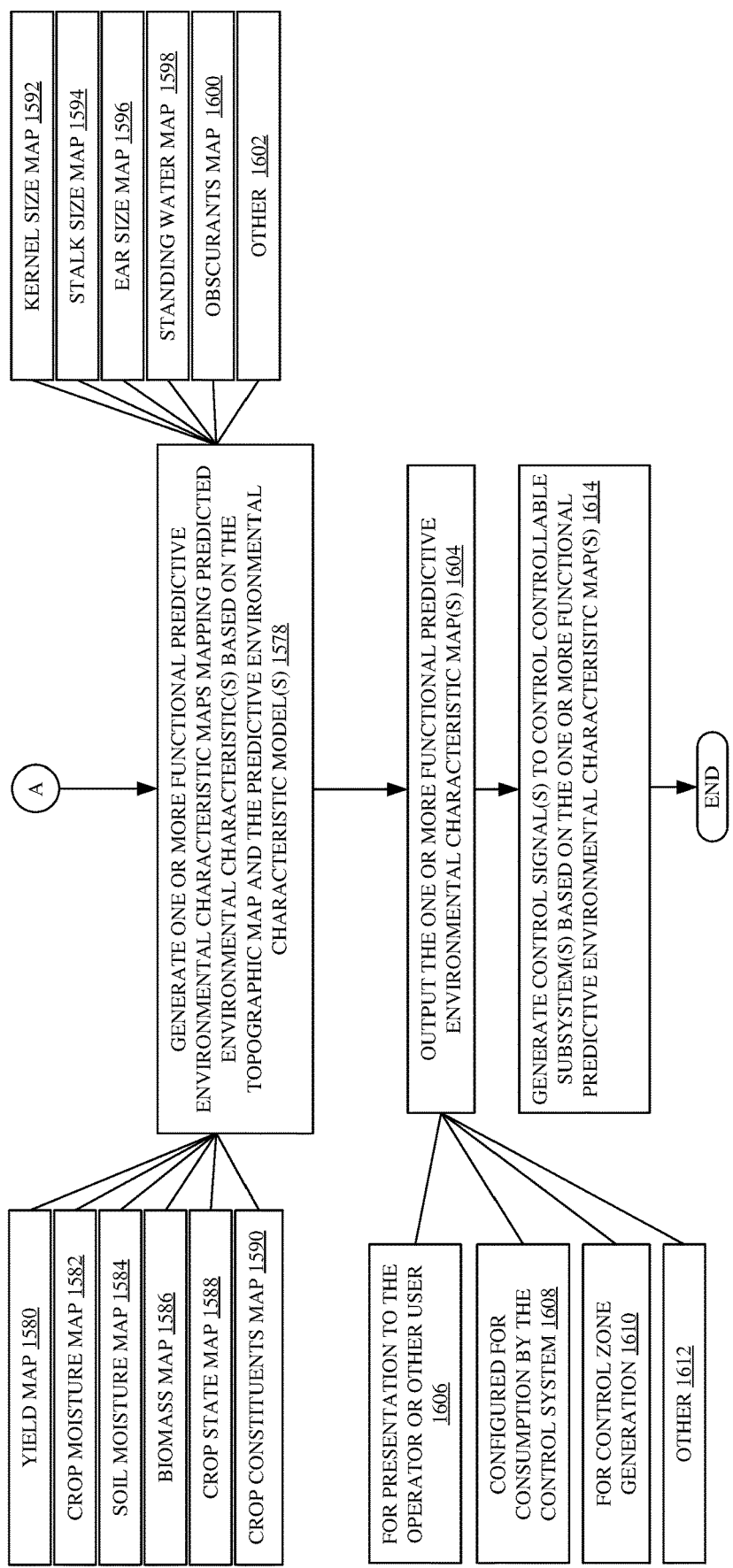

FIGS. 5A-5B (collectively referred to herein as FIG. 5) is a flow diagram of an example of operation of predictive model generator 210 and predictive map generator 212 in generating the predictive environmental characteristic model 350 and the functional predictive environmental characteristic map 360. At block 1500, predictive model generator 210 and predictive map generator 212 receive a topographic map 332. At block 1501, processing system 338 receives sensor data (e.g., signals, images, etc.) from one or more environmental sensors 336. As discussed above, the one or more environmental sensors 360 can include one or more yield sensors 900, one or more crop moisture sensors 902, one or more soil moisture sensors 904, one or more biomass sensors 906, one or more crop state sensors 908, one or more crop constituent sensors 910, one or more kernel size sensors 912, one or more stalk size sensors 914, one or more ear size sensors 916, one or more standing water sensors 918, one or more obscurants sensors 920, and one or more other types of environmental characteristic sensors 922. The various types of environmental characteristics sensors are shown at blocks 1502, 1504, 1506, 1508, 1510, 1512, 1514, 1516, 1518, 1520, 1522, and 1523.

At block 1524, processing system 338 processes the sensor data (e.g., signals, images, etc.) from the one or more environmental characteristic sensors 366 to generate processed sensor data 340 indicative of one or more environmental characteristics. In some instances, as indicated at block 1526, the environmental characteristic may be yield. In some instances, as indicated at block 1528, the environmental characteristic may be crop moisture. In some instances, as indicated at block 1530, the environmental characteristic may be soil moisture. In some instances, as indicated at block 1532, the environmental characteristic may be biomass. In some instances, as indicated at block 1534, the environmental characteristic may be crop state. In some instances, as indicated at block 1536, the environmental characteristic may be crop constituents. In some instances, as indicated at block 1538, the environmental characteristic may be kernel size. In some instances, as indicated at block 1540, the environmental characteristic may be stalk size. In some instances, as indicated at block 1542, the environmental characteristic may be ear size. In some instances, as indicated at block 1546, the environmental characteristic may be standing water. In some instances, as indicated at block 1548, the environmental characteristic may be obscurants. As indicated by block 1549, there can be other environmental characteristics as well.

At block 1550, predictive model generator 210 also obtains the geographic location corresponding to the sensor data. For instance, the predictive model generator 210 can obtain the geographic position from geographic position sensor 204 and determine, based upon machine delays, machine speed, machine headings, etc., a precise geographic location at the field to which the sensor data corresponds.

At block 1552, predictive model generator 210 generates one or more predictive environmental characteristic models, such as environmental characteristic model 350, that model a relationship between a topographic characteristic obtained from a topographic map 332, and an environmental characteristic being sensed by the in-situ sensor 208 or a related characteristic. For instance, predictive model generator 210 may generate one or more of a predictive yield model, as indicated by block 1554, a predictive crop moisture model, as indicated by block 1556, a predictive soil moisture model, as indicated by block 1558, a predictive biomass model, as indicated by block 1560, a predictive crop state model, as indicated by block 1562, a predictive crop constituents model, as indicated by block 1564, a predictive kernel size model, as indicated by block 1566, a predictive stalk size model, as indicated by block 1568, a predictive ear size model, as indicated by block 1570, a predictive standing water model, as indicated by block 1572, a predictive obscurants model, as indicated by block 1574, or a predictive other environmental characteristic model, as indicated by block 1576. In some examples, the predictive environmental characteristic model 350 may model a relationship between a topographic characteristic obtained from a topographic map 332, and two or more of yield, crop moisture, soil moisture, biomass, crop state, crop constituents, kernel size, stalk size, ear size, standing water, obscurants, and an other environmental characteristic.

At block 1578, the predictive machine model, such as predictive environmental characteristic 350, is provided to predictive map generator 212 which generates one or more functional predictive environmental characteristic maps 360 that map a predicted environmental characteristic based on the topographic map and the predictive environmental characteristic model 350. In some examples, the functional predictive environmental characteristic map 360 is a functional predictive yield map that predicts yield, as indicated by block 1580. In some examples, the functional predictive environmental characteristic map 360 is a functional predictive crop moisture map that predicts crop moisture, as indicated by block 1582. In some examples, the functional predictive environmental characteristic map 360 is a functional predictive soil moisture map that predicts soil moisture, as indicated by block 1584. In some examples, the functional predictive environmental characteristic map 360 is a functional predictive biomass map that predicts biomass, as indicated by block 1586. In some examples, the functional predictive environmental characteristic map 360 is a functional predictive crop state map that predicts crop state, as indicated by block 1588. In some examples, the functional predictive environmental characteristic map 360 is a functional predictive crop constituents map that predicts crop constituents, as indicated by block 1590. In some examples, the functional predictive environmental characteristic map 360 is a functional predictive kernel size map that predicts kernel size, as indicated by block 1592. In some examples, the functional predictive environmental characteristic map 360 is a functional predictive stalk size map that predicts stalk size, as indicated by block 1594. In some examples, the functional predictive environmental characteristic map 360 is a functional predictive ear size map that predicts ear size, as indicated by block 1596. In some examples, the functional predictive environmental characteristic map 360 is a functional predictive standing water map that predicts standing water, as indicated by block 1598. In some examples, the functional predictive environmental characteristic map 360 is a functional predictive obscurants map that predicts obscurants, as indicated by block 1600. In some examples, the functional predictive environmental characteristic map 360 is a functional predictive other environmental characteristic map that predicts an other environmental characteristic, as indicated by block 1602.

Still in other examples, the functional predictive environmental characteristic map 360 predicts two or more of yield, crop moisture, soil moisture, biomass, crop state, crop constituents, kernel size, stalk size, ear size, standing water, obscurants, and an other environmental characteristic. In some examples, the functional predictive environmental characteristic map 360 may include two or more map layers, each map layer predicting a different environmental characteristic, such as two or more of a map layer that predicts yield, a map layer that predicts crop moisture, a map layer that predicts soil moisture, a map layer that predicts biomass, a map layer that predicts crop state, a map layer that predicts crop constituents, a map layer that predicts kernel size, a map layer that predicts stalk size, a map layer that predicts ear size, a map layer that predicts standing water, a map layer that predicts obscurants, and a map layer that predicts an other environmental characteristic.

The predictive environmental characteristic map 360 can be generated during the course of an agricultural operation. Thus, as an agricultural harvester is moving through a field performing an agricultural operation, the predictive environmental characteristic map 360 is generated as the agricultural operation is being performed. Additionally, as noted above in FIG. 3, one or more of the predictive model(s) and the functional predictive map(s) may be updated (or generated new), during the agricultural operation, based on further collected sensor data and learning trigger criteria.

At block 1604, predictive map generator 212 outputs the functional predictive environmental characteristic map(s) 360. At block 1606 predictive map generator 212 outputs the one or more functional predictive environmental characteristic maps for presentation and possible interaction by operator 260, or another user, or both. At block 1608, predictive map generator 212 may configure the one or more functional predictive environmental characteristic maps 360 for consumption by control system 214. At block 1610, predictive map generator 212 can also provide the one or more functional predictive environmental characteristic maps 360 to control zone generator 213 for generation of control zones, to generate one or more functional predictive environmental characteristic control zone maps 361. At block 1612, predictive map generator 212 configures the one or more functional predictive environmental characteristic maps 360 in other ways as well. The functional predictive environmental characteristic map 360 or the functional predictive environmental characteristic control zone map 361, or both, are provided to control system 214. At block 1614, control system 214 generates control signals to control the controllable subsystems 216 based upon the functional predictive environmental characteristic map 360 or the functional predictive environmental characteristic control zone map 361.

It can thus be seen that the present system takes an information map that maps a characteristic, such as a topographic characteristic, to different locations in a field. The present system also uses one or more in-situ sensors that sense in-situ sensor data that is indicative of one or more environmental characteristics, such as yield, crop moisture, soil moisture, biomass, crop state, crop constituents, kernel size, stalk size, ear size, standing water, obscurants, and an other environmental characteristic, and generates a predictive model that models a relationship between the one or more environmental characteristics sensed using the one or more in-situ sensors, or one or more related characteristics, and the characteristic mapped in the information map, such as the topographic characteristic. Thus, the present system generates a functional predictive map using a model, in-situ data, and an information map and may configure the generated functional predictive map for consumption by a control system or for presentation to a local or remote operator or other user, or both. For example, the control system may use the functional predictive map to control one or more systems of an agricultural harvester.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or the same worksite at a future time.

The revision of the model in response to new data may employ machine learning methods. Without limitation, machine learning methods may include memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value (e.g., detected environmental characteristic value) varies from a predictive value of the characteristic (e.g., predictive environmental characteristic value), such as by a threshold amount. This deviation may only be detected in areas of the field where the elevation of the worksite is above a certain level. Thus, the revision to the predictive value is only applied to other areas of the worksite having elevation above the certain level. In this simpler example, the predictive environmental characteristic value and elevation at the point the deviation occurred and the detected environmental characteristic value and elevation at the point the deviation crossed the threshold are used to generate a linear equation. The linear equation is used to adjust the predictive environmental characteristic value in unharvested areas of the worksite in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as a topographic map.

In-situ sensors generate sensor data indicative of one or more in-situ environmental characteristic values, such as one or more of in-situ yield values, in-situ crop moisture values, in-situ soil moisture values, in-situ biomass values, in-situ crop state values, in-situ crop constituents values, in-situ kernel size values, in-situ stalk size values, in-situ ear size values, in-situ standing water values, in-situ obscurants values, and in-situ values of an other environmental characteristic.

A predictive model generator generates one or more predictive models based on the one or more obtained maps and the in-situ sensor data, such as a predictive environmental characteristic model.

A predictive map generator generates one or more functional predictive maps based on a model generated by the predictive model generator and the one or more obtained maps. For example, the predictive map generator may generate a functional predictive environmental characteristic map that maps predicted environmental characteristics to one or more locations on the worksite based on a predictive environmental characteristic model and the one or more obtained maps.

Control zones, which include machine settings values, can be incorporated into the functional predictive environmental characteristic map to generate a functional predictive 3D environmental characteristic control zone map.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic and interactions. It will be appreciated that any or all of such systems, components, logic and interactions may be implemented by hardware items, such as processors, memory, or other processing components, some of which are described below, that perform the functions associated with those systems, components, logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 6:
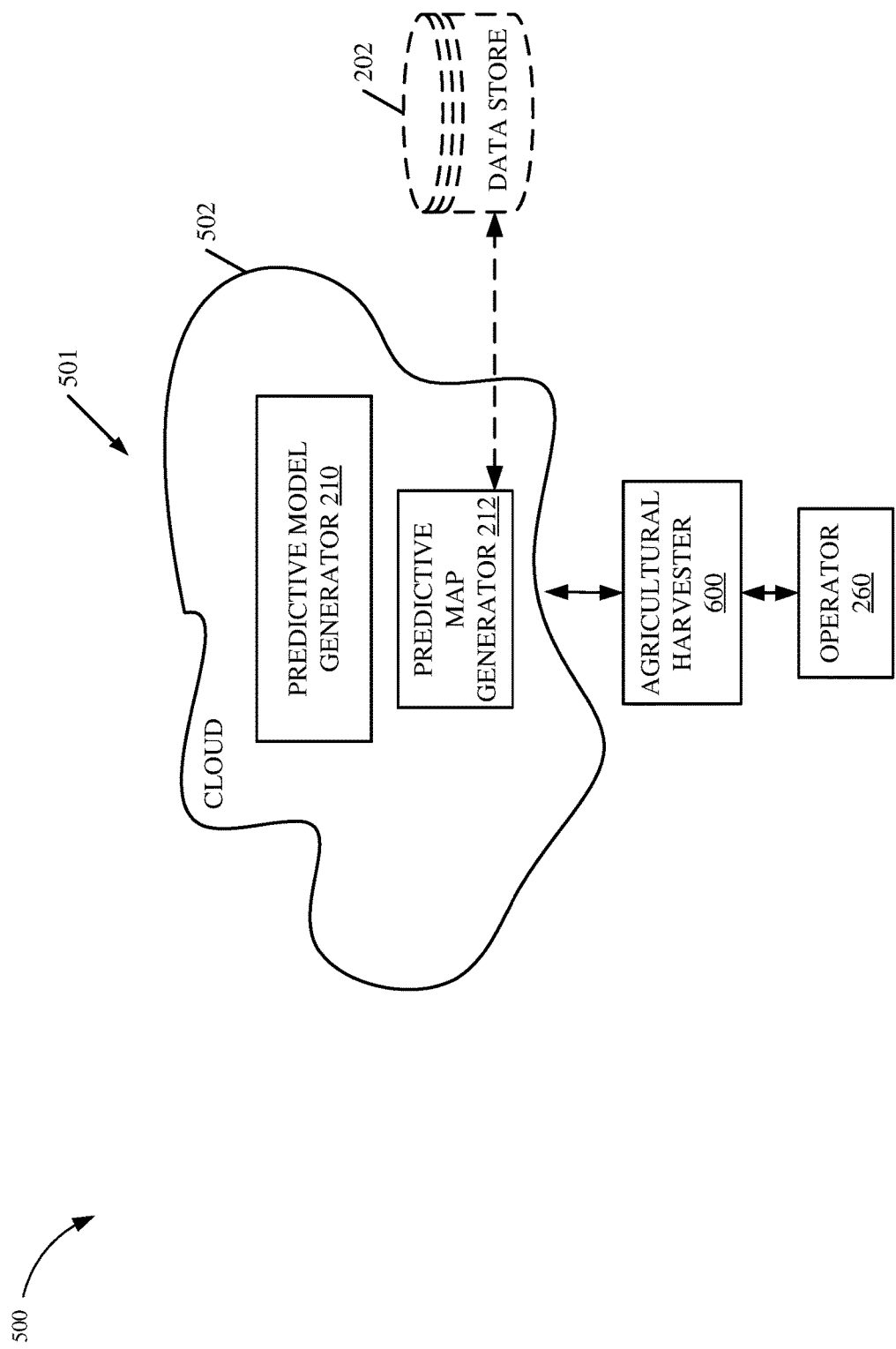
FIG. 6 is a block diagram showing one example of an agricultural harvester in communication with a remote server environment.

FIG. 6 is a block diagram of an agricultural system 500 which may be similar to agricultural system 200 shown in FIG. 2. Agricultural system 500 includes agricultural harvester 600, which may be similar to agricultural harvester 100 shown in FIG. 2. The agricultural harvester 600 communicates with elements in a remote server architecture 501. In some examples, remote server architecture 501 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 2 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 6, some items are similar to those shown in FIG. 2 and those items are similarly numbered. FIG. 6 specifically shows that predictive model generator 210 or predictive map generator 212, or both, may be located at a server location 502 that is remote from the agricultural harvester 600. Therefore, in the example shown in FIG. 6, agricultural harvester 600 accesses systems through remote server location 502.

FIG. 6 also depicts another example of a remote server architecture. FIG. 6 shows that some elements of FIG. 2 may be disposed at a remote server location 502 while others may be located elsewhere. By way of example, data store 202 may be disposed at a location separate from location 502 and accessed via the remote server at location 502. Regardless of where the elements are located, the elements can be accessed directly by agricultural harvester 600 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the agricultural harvester 600 comes close to the machine containing the information collection system, such as a fuel truck prior to fueling, the information collection system collects the information from the agricultural harvester 600 using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on the agricultural harvester 600 until the agricultural harvester 600 enters an area having wireless communication coverage. The agricultural harvester 600, itself, may send the information to another network.

It will also be noted that the elements of FIG. 2, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 501 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 7:
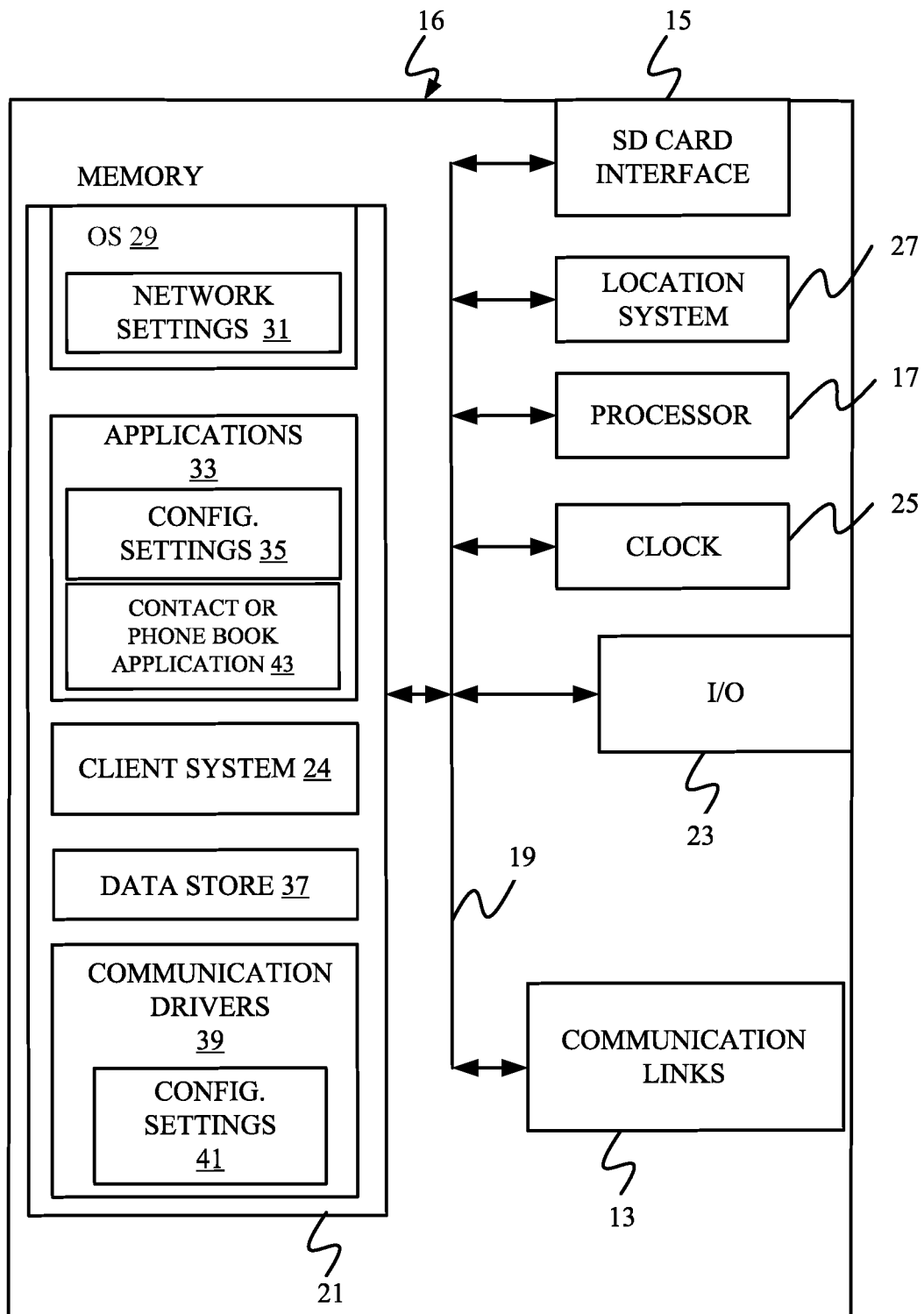
FIGS. 7-9 show examples of mobile devices that can be used in an agricultural system, according to some examples of the present disclosure.
Figure 8:
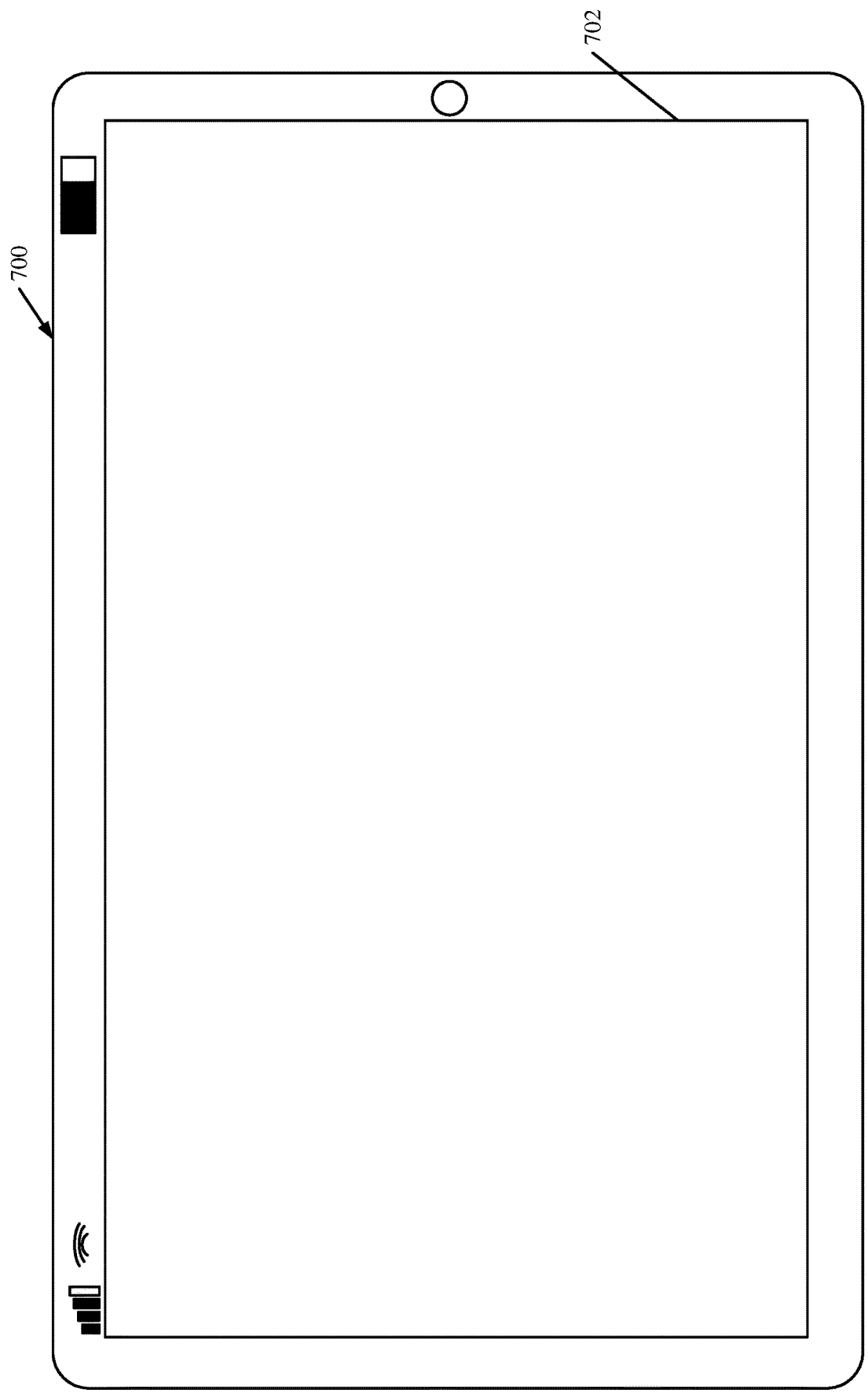
Figure 9:
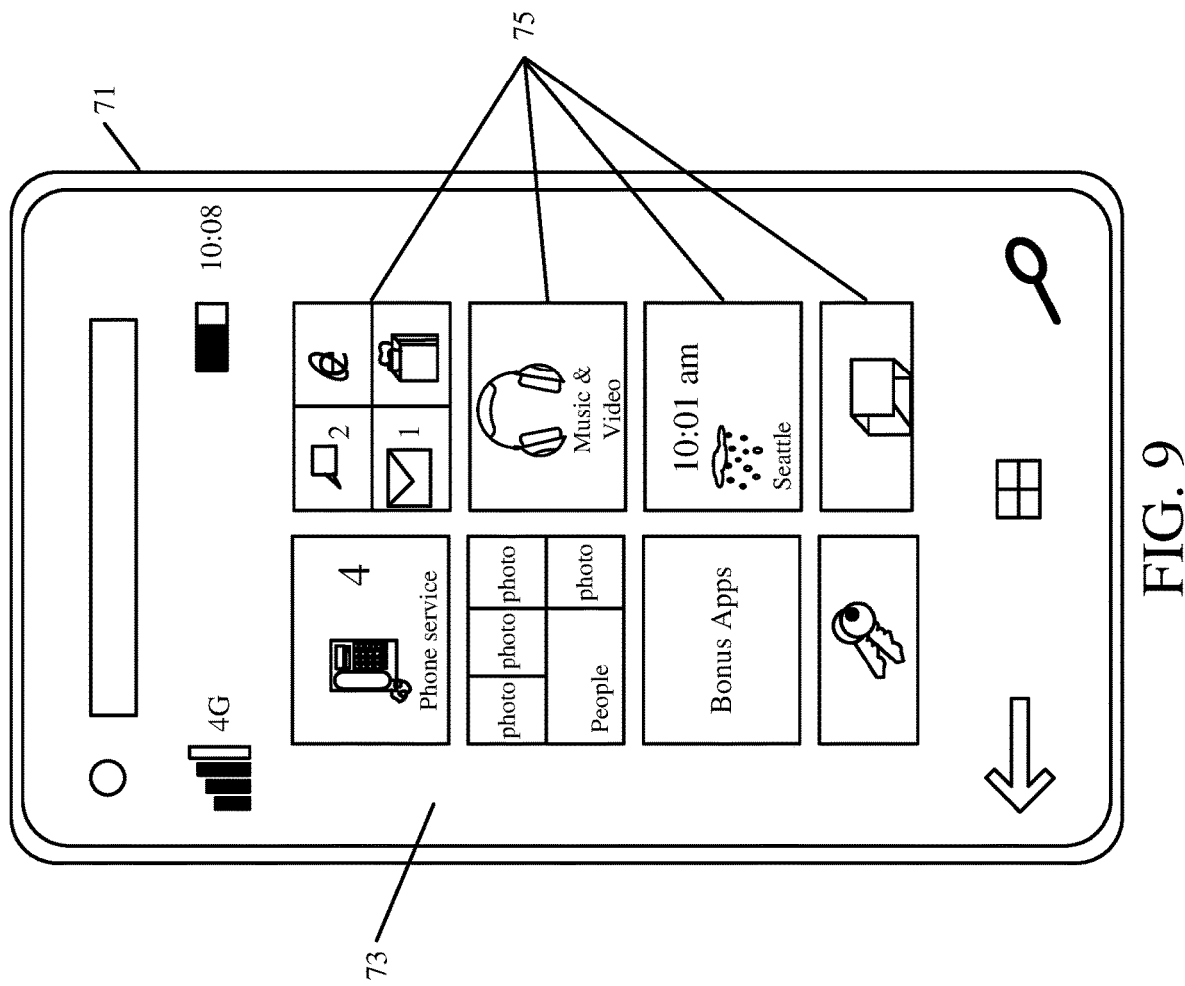

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of agricultural harvester 100 for use in generating, processing, or displaying the maps discussed above. FIGS. 8-9 are examples of handheld or mobile devices.

FIG. 7 provides a general block diagram of the components of a client device 16 that can run some components shown in FIG. 2, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 8 shows one example in which device 16 is a tablet computer 700. In FIG. 8, computer 700 is shown with user interface display screen 702. Screen 702 can be a touch screen or a pen-enabled interface that receives inputs from a pen or stylus. Tablet computer 700 may also use an on-screen virtual keyboard. Of course, computer 700 might also be attached to a keyboard or other user input device through a suitable attachment mechanism, such as a wireless link or USB port, for instance. Computer 700 may also illustratively receive voice inputs as well.

FIG. 9 is similar to FIG. 8 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
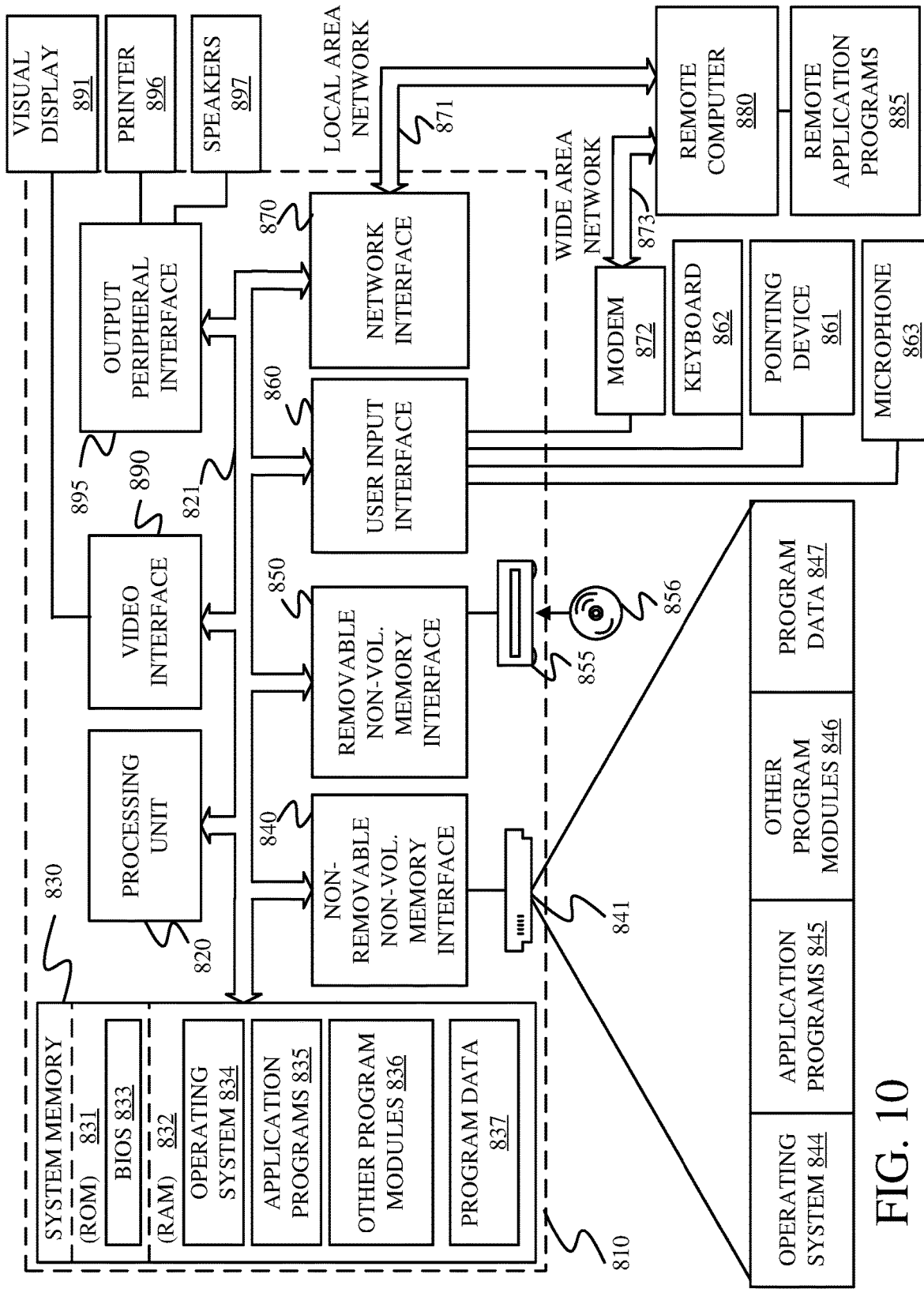
FIG. 10 is a block diagram showing one example of a computing environment that can be used in an agricultural system and the architectures illustrated in previous figures.

FIG. 10 is one example of a computing environment in which elements of FIG. 2 can be deployed. With reference to FIG. 10, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 10.

Computer 810 typically includes a variety of computer readable media. Computer readable media may be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory or both such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data or program modules or both that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:
a communication system that receives a topographic map that maps values of a topographic characteristic to different geographic locations in the field;
a geographic position sensor that detects a geographic location of the agricultural work machine;
an in-situ sensor that detects a value of an environmental characteristic corresponding to the geographic location;
a predictive model generator that generates a predictive environmental characteristic model indicative of a relationship between the topographic characteristic and the environmental characteristic based on the value of the topographic characteristic in the topographic map corresponding to the geographic location and the value of the environmental characteristic sensed by the in-situ sensor corresponding to the geographic location; and
a predictive map generator that generates a functional predictive environmental characteristic map of the field that maps predictive values of the environmental characteristic to the different geographic locations in the field based on the values of the topographic characteristic in the topographic map and based on the predictive environmental characteristic model.

2. The agricultural system of claim 1, wherein the predictive map generator configures the functional predictive environmental characteristic map for consumption by a control system that generates control signals to control a controllable subsystem on the agricultural work machine based on the functional predictive environmental characteristic map.

3. The agricultural system of claim 2, wherein the in-situ sensor detects, as the value of the environmental characteristic, a yield value,
wherein the predictive model generates as the predictive environmental characteristic model, a predictive yield model indicative of a relationship between the topographic characteristic and yield based on the yield value detected by the in-situ sensor corresponding to the geographic location and a value of the topographic characteristic in the topographic map at the geographic location, and
wherein the predictive map generator generates, as the functional predictive environmental characteristic map, a functional predictive yield map that maps predictive yield values to the different geographic locations in the worksite based on the values of the topographic characteristic in the topographic map at those different locations and based on the predictive yield model.

4. The agricultural system of claim 2, wherein the in-situ sensor detects, as the value of the environmental characteristic, a crop moisture value,
wherein the predictive model generates as the predictive environmental characteristic model, a predictive crop moisture model indicative of a relationship between the topographic characteristic and crop moisture based on the crop moisture value detected by the in-situ sensor corresponding to the geographic location and a value of the topographic characteristic in the topographic map at the geographic location, and
wherein the predictive map generator generates, as the functional predictive environmental characteristic map, a functional predictive crop moisture map that maps predictive crop moisture values to the different geographic locations in the worksite based on the values of the topographic characteristic in the topographic map at those different locations and based on the predictive crop moisture model.

5. The agricultural system of claim 2, wherein the in-situ sensor detects, as the value of the environmental characteristic, a soil moisture value,
wherein the predictive model generates as the predictive environmental characteristic model, a predictive soil moisture model indicative of a relationship between the topographic characteristic and soil moisture based on the soil moisture value detected by the in-situ sensor corresponding to the geographic location and a value of the topographic characteristic in the topographic map at the geographic location, and
wherein the predictive map generator generates, as the functional predictive environmental characteristic map, a functional predictive soil moisture map that maps predictive soil moisture values to the different geographic locations in the worksite based on the values of the topographic characteristic in the topographic map at those different locations and based on the predictive soil moisture model.

6. The agricultural system of claim 2, wherein the in-situ sensor detects, as the value of the environmental characteristic, a biomass value,
wherein the predictive model generates as the predictive environmental characteristic model, a predictive biomass model indicative of a relationship between the topographic characteristic and biomass based on the biomass value detected by the in-situ sensor corresponding to the geographic location and a value of the topographic characteristic in the topographic map at the geographic location, and
wherein the predictive map generator generates, as the functional predictive environmental characteristic map, a functional predictive biomass map that maps predictive biomass values to the different geographic locations in the worksite based on the values of the topographic characteristic in the topographic map at those different locations and based on the predictive biomass model.

7. The agricultural system of claim 2, wherein the in-situ sensor detects, as the value of the environmental characteristic, a crop state value,
wherein the predictive model generates as the predictive environmental characteristic model, a predictive crop state model indicative of a relationship between the topographic characteristic and crop state based on the crop state value detected by the in-situ sensor corresponding to the geographic location and a value of the topographic characteristic in the topographic map at the geographic location, and
wherein the predictive map generator generates, as the functional predictive environmental characteristic map, a functional predictive crop state map that maps predictive crop state values to the different geographic locations in the worksite based on the values of the topographic characteristic in the topographic map at those different locations and based on the predictive crop state model.

8. The agricultural system of claim 2, wherein the in-situ sensor detects, as the value of the environmental characteristic, a crop constituent value,
wherein the predictive model generates as the predictive environmental characteristic model, a predictive crop constituent model indicative of a relationship between the topographic characteristic and a crop constituent based on the crop constituent value detected by the in-situ sensor corresponding to the geographic location and a value of the topographic characteristic in the topographic map at the geographic location, and
wherein the predictive map generator generates, as the functional predictive environmental characteristic map, a functional predictive crop constituent map that maps predictive crop constituent values to the different geographic locations in the worksite based on the values of the topographic characteristic in the topographic map at those different locations and based on the predictive crop constituent model.

9. The agricultural system of claim 2, wherein the in-situ sensor detects, as the value of the environmental characteristic, a kernel size value,
wherein the predictive model generates as the predictive environmental characteristic model, a predictive kernel size model indicative of a relationship between the topographic characteristic and kernel size based on the kernel size value detected by the in-situ sensor corresponding to the geographic location and a value of the topographic characteristic in the topographic map at the geographic location, and
wherein the predictive map generator generates, as the functional predictive environmental characteristic map, a functional predictive kernel size map that maps predictive kernel size values to the different geographic locations in the worksite based on the values of the topographic characteristic in the topographic map at those different locations and based on the predictive kernel size model.

10. The agricultural system of claim 2, wherein the in-situ sensor detects, as the value of the environmental characteristic, a stalk size value,
wherein the predictive model generates as the predictive environmental characteristic model, a predictive stalk size model indicative of a relationship between the topographic characteristic and stalk size based on the stalk size value detected by the in-situ sensor corresponding to the geographic location and a value of the topographic characteristic in the topographic map at the geographic location, and
wherein the predictive map generator generates, as the functional predictive environmental characteristic map, a functional predictive stalk size map that maps predictive stalk size values to the different geographic locations in the worksite based on the values of the topographic characteristic in the topographic map at those different locations and based on the predictive stalk size model.

11. The agricultural system of claim 2, wherein the in-situ sensor detects, as the value of the environmental characteristic, an ear size value,
wherein the predictive model generates as the predictive environmental characteristic model, a predictive ear size model indicative of a relationship between the topographic characteristic and ear size based on the ear size value detected by the in-situ sensor corresponding to the geographic location and a value of the topographic characteristic in the topographic map at the geographic location, and
wherein the predictive map generator generates, as the functional predictive environmental characteristic map, a functional predictive ear size map that maps predictive ear size values to the different geographic locations in the worksite based on the values of the topographic characteristic in the topographic map at those different locations and based on the predictive ear size model.

12. The agricultural system of claim 2, wherein the in-situ sensor detects, as the value of the environmental characteristic, a standing water value,
wherein the predictive model generates as the predictive environmental characteristic model, a predictive standing water model indicative of a relationship between the topographic characteristic and standing water based on the standing water value detected by the in-situ sensor corresponding to the geographic location and a value of the topographic characteristic in the topographic map at the geographic location, and
wherein the predictive map generator generates, as the functional predictive environmental characteristic map, a functional predictive standing water map that maps predictive standing water values to the different geographic locations in the worksite based on the values of the topographic characteristic in the topographic map at those different locations and based on the predictive standing water model.

13. The agricultural system of claim 2, wherein the in-situ sensor detects, as the value of the environmental characteristic, an obscurants value,
   wherein the predictive model generates as the predictive environmental characteristic model, a predictive obscurants model indicative of a relationship between the topographic characteristic and obscurants based on the obscurants value detected by the in-situ sensor corresponding to the geographic location and a value of the topographic characteristic in the topographic map at the geographic location, and
   wherein the predictive map generator generates, as the functional predictive environmental characteristic map, a functional predictive obscurants map that maps predictive obscurants values to the different geographic locations in the worksite based on the values of the topographic characteristic in the topographic map at those different locations and based on the predictive obscurants model.

14. The agricultural system of claim 1, wherein the predictive map generator outputs the functional predictive environmental characteristic map for presentation to an operator of the agricultural work machine.

15. A computer implemented method of generating a functional predictive environmental characteristic map, comprising:
   receiving a topographic map that maps values of a topographic characteristic to different geographic locations in a field;
   obtaining in-situ sensor data indicative of a value of an environmental characteristic corresponding to a geographic location at the field;
   generating a predictive environmental characteristic model indicative of a relationship between the topographic characteristic and the environmental characteristic; and
   controlling a predictive map generator to generate the functional predictive environmental characteristic map of the field, that maps predictive values of the environmental characteristic to the different locations in the field based on the values of the topographic characteristic in the topographic map and the predictive environmental characteristic model.

16. The computer implemented method of claim 15 and further comprising:
   configuring the functional predictive environmental characteristic map for a control system that generates control signals to control a controllable subsystem on an agricultural work machine based on the functional predictive environmental characteristic map.

17. The computer implemented method of claim 15 and further comprising:
   controlling a controllable subsystem of an agricultural work machine based on the functional predictive environmental characteristic map.

18. The computer implemented method of claim 15, wherein obtaining in-situ sensor data indicative of the value of an environmental characteristic comprises obtaining in-situ sensor data indicative of two or more of a value of yield, a value of crop moisture, a value of soil moisture, a value of biomass, a value of crop state, a value of a crop constituent, a value of kernel size, a value of stalk size, a value of ear size, a value of standing water, and a value of obscurants.

19. The computer implemented method of claim 18, wherein generating the predictive environmental characteristic model is indicative of a relationship between the topographic characteristic and two or more of yield, crop moisture, soil moisture, biomass, crop state, the crop constituent, kernel size, stalk size, ear size, standing water, and obscurants, and
   wherein the functional predictive environmental map of the field maps predictive values of two or more of yield, crop moisture, soil moisture, biomass, crop state, the crop constituent, kernel size, stalk size, ear size, standing water, and obscurants.

20. An agricultural work machine, comprising:
   a communication system that receives a topographic map that maps values of a topographic characteristic to different geographic locations in a field;
   a geographic position sensor that detects a geographic location of the agricultural work machine;
   an in-situ sensor that detects a value of an environmental characteristic corresponding to a geographic location;
   a predictive model generator that generates a predictive environmental characteristic model indicative of a relationship between values of the topographic characteristic and values of the environmental characteristic based on the value of the environmental characteristic detected by the in-situ sensor corresponding to the geographic location and a value of the topographic characteristic in the topographic map at the geographic location;
   a predictive map generator that generates a functional predictive environmental characteristic map of the field, that maps predictive values of the environmental characteristic to the different locations in the field, based on the topographic values in the topographic map at those different locations and based on the predictive environmental characteristic model; and
   a control system that generates a control system based on the functional predictive environmental characteristic map and based on the geographic location of the agricultural work machine.

* * * * *